(12) United States Patent
Khoshnevisan et al.

(10) Patent No.: US 12,267,177 B2
(45) Date of Patent: Apr. 1, 2025

(54) ACKNOWLEDGMENT FEEDBACK TECHNIQUES IN WIRELESS COMMUNICATIONS

(71) Applicant: Qualcomm Incorporated, San Diego, CA (US)

(72) Inventors: Mostafa Khoshnevisan, San Diego, CA (US); Kapil Bhattad, Bangalore (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/772,533

(22) PCT Filed: Nov. 6, 2020

(86) PCT No.: PCT/US2020/059434
§ 371 (c)(1),
(2) Date: Apr. 28, 2022

(87) PCT Pub. No.: WO2021/092399
PCT Pub. Date: May 14, 2021

(65) Prior Publication Data
US 2022/0407632 A1 Dec. 22, 2022

(30) Foreign Application Priority Data
Nov. 8, 2019 (IN) .............................. 201941045493

(51) Int. Cl.
*H04L 1/1829* (2023.01)
*H04L 1/1607* (2023.01)
*H04L 5/00* (2006.01)

(52) U.S. Cl.
CPC .......... *H04L 1/1861* (2013.01); *H04L 1/1664* (2013.01); *H04L 1/1854* (2013.01);
(Continued)

(58) Field of Classification Search
CPC ... H04L 1/1861; H04L 1/1664; H04L 1/1854; H04L 1/1864; H04L 5/0055; H04L 5/0094; H04L 5/001
See application file for complete search history.

(56) References Cited

U.S. PATENT DOCUMENTS 9,877,203 B2   1/2018  Yoo et al.
2018/0241510 A1*  8/2018  Shen .......................... H04L 1/18
(Continued)

FOREIGN PATENT DOCUMENTS

WO    WO-2016179016 A2    11/2016

OTHER PUBLICATIONS

Intel Corporation: "Enhancements to HARQ for NR-Unlicensed", 3GPP Draft, 3GPP TSG RAN WG1 Meeting #98bis, R1-1910642—Intel—HARQ for NR-U, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051809165, 13 pages, Retrieved from the Internet: URL: https://ftp.3gpp.org/tsg_ran/WG1_RL1/TSGR1_98b/Docs/R1-1910642.zip R1-1910642—Intel—HARQ for NR-U.docx [retrieved on Oct. 8, 2019] the whole document.
(Continued)

*Primary Examiner* — Deepa Belur
(74) *Attorney, Agent, or Firm* — Dalei Dong; Holland & Hart LLP

(57) ABSTRACT

Methods, systems, and devices for wireless communications are described that enable efficient group-based acknowledgment feedback reporting. Techniques are provided for feedback for a number of different downlink transmissions to be reported by a user equipment (UE) using transport block level feedback, code block group level feedback, or combinations thereof. Acknowledgment feedback may be pro-
(Continued)

vided in one or more group-based or enhanced dynamic feedback reports, a one-shot feedback report, or any combinations thereof.

22 Claims, 22 Drawing Sheets

(52) U.S. Cl.
CPC .......... *H04L 1/1864* (2013.01); *H04L 5/0055* (2013.01); *H04L 5/0094* (2013.01)

(56) References Cited

U.S. PATENT DOCUMENTS

2019/0230685 A1* 7/2019 Park .................. H04W 72/20
2020/0344012 A1* 10/2020 Karaki ................ H04L 5/0055
2020/0374045 A1* 11/2020 Yin ...................... H04B 7/0456
2022/0303979 A1* 9/2022 Li ........................ H04L 1/1864

OTHER PUBLICATIONS

International Search Report and Written Opinion—PCT/US2020/059434—ISA/EPO—Feb. 24, 2021.
LG Electronics: "HARQ Procedure for NR-U," 3GPP Draft, 3GPP TSG RAN WG1 #98bis, R1-1910821 NR-U HARQ Final, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 8, 2019 (Oct. 8, 2019), XP051809211, 22 pages, Retrieved from the Internet: URL: https://ftp.3gpp.org/tsg_ran/WG1_RL1/TSGR1_98b/Docs/R1-1910821.zip R1-1910821 NR-U HARQ_Final.doc [retrieved on Oct. 8, 2019], the whole document.

* cited by examiner

ACKNOWLEDGMENT FEEDBACK TECHNIQUES IN WIRELESS COMMUNICATIONS

CROSS REFERENCE TO RELATED APPLICATIONS

The present application is a 371 national stage filing of International PCT Application No. PCT/US2020/059434 by Khoshnevisan et al., entitled "ACKNOWLEDGMENT FEEDBACK TECHNIQUES IN WIRELESS COMMUNICATIONS," filed Nov. 6, 2020; and claims priority to India Provisional Patent Application No. 201941045493 by Khoshnevisan et al., entitled "ACKNOWLEDGMENT FEEDBACK TECHNIQUES IN WIRELESS COMMUNICATIONS," filed Nov. 8, 2019, each of which is assigned to the assignee hereof, and each of which is expressly incorporated by reference in its entirety herein.

FIELD OF DISCLOSURE

The following relates generally to wireless communications, and more specifically to acknowledgment feedback techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support acknowledgment feedback to indicate if a wireless device (e.g., a UE) successfully decodes downlink messages (i.e., data transmissions) where the downlink message decoding is based on one or more detected downlink control messages (e.g., a downlink grant or downlink control information (DCI)). In deployments supporting shared or unlicensed radio frequency spectrums (e.g., unlicensed NR), one or more downlink messages may not be received correctly (e.g., due to a hidden interfering node) and the wireless device may not provide ACK feedback based on all of the downlink control messages. Further, in some cases a wireless device (e.g., a UE) may not be able to transmit ACK feedback when the medium is occupied by another transmitting device (e.g., when a listen-before-talk (LBT) procedure fails). Techniques to enhance system performance in cases where one or more transmissions may not be sent or received are thus desirable.

SUMMARY

The described techniques relate to improved methods, systems, devices, and apparatuses that support acknowledgment feedback techniques in wireless communications. In various aspects, enhanced dynamic or group-based feedback may be provided in which a user equipment (UE) may transmit acknowledgment feedback (e.g., hybrid automatic repeat request (HARQ) feedback) for multiple downlink transmissions of one or more downlink transmission groups (e.g., physical downlink shared channel (PDSCH) groups) in one or more feedback reports. In some cases, a UE may be provided with both a group-based feedback configuration and a one-shot feedback configuration, where the group-based feedback configuration is for acknowledgment feedback of the configured downlink transmission groups and the one-shot feedback is for providing feedback for each configured feedback process (e.g., each of a number of configured HARQ processes) across downlink transmission groups and across two or more component carriers. In some cases, when one-shot feedback is requested, the UE reports one-shot feedback and preempts any group-based feedback reports that were to be transmitted in an acknowledgment feedback occasion (e.g., in an uplink control channel transmission indicated by the DCI)

In some cases, two or more component carriers (CCs) may be configured, in which one CC may be configured for transport block (TB) based feedback and another CC may be configured for code block group (CBG) based feedback. In such cases, if downlink control information (DCI) is received on a CC that requests a feedback report, the feedback report is provided using whichever of TB-based or CBG-based feedback is configured for the CC that carries the DCI. For example, if a first CC is configured for CBG-based feedback and carries DCI requesting acknowledgment feedback for one or more downlink transmission groups, the UE may provide CBG-based feedback in the associated acknowledgment feedback report(s). Likewise, if the first CC is not configured for CBG-based feedback and carries DCI requesting acknowledgment feedback for one or more downlink transmission groups, the UE may provide TB-based feedback in the associated acknowledgment feedback report(s).

Additionally or alternatively, some further aspects of the present disclosure provide techniques in which an uplink DCI that includes information for an uplink transmission that is to include group-based acknowledgment feedback may also provide one or more of a downlink assignment indicator or index (DAI) value or a new acknowledgment feedback indicator (NFI) for one or more of the groups of downlink transmissions. The UE may determine a feedback codebook for providing the acknowledgment feedback based at least in part on the DAI, NFI, or combinations thereof, provided in the uplink DCI. In some cases, the DAI, NFI, or both may not be associated with a fixed downlink transmission group, and may be used for whichever group is to be reported responsive to the uplink DCI. In other cases, DAI, NFI, or both may be provided for each of two or more downlink transmission groups in the uplink DCI, and the DAI, NFI, or both associated with one of the downlink transmission groups may be used to determine acknowledgment feedback report payload and multiplexing for the acknowledgment feedback report.

A method for wireless communications at a user equipment (UE) is described. The method may include receiving configuration information from a base station that configures group-based acknowledgment feedback type for at least two downlink transmission groups of at least two serving cells, and that configures a one-shot acknowledgment feedback type that provides feedback for each of a set of multiple configured feedback processes at the UE upon request, determining that a first acknowledgment feedback report for one or more of the at least two downlink transmission groups is to be provided in a first acknowledgment feedback occasion, receiving a downlink control information transmission from the base station that indicates that the one-shot acknowledgement feedback is to be provided by the UE in the first acknowledgment feedback occasion, and transmitting, responsive to the downlink control information transmission, a one-shot feedback report to the base station instead of the first acknowledgment feedback report in the first acknowledgment feedback occasion, where the one-shot feedback report includes acknowledgment feedback for each of the set of multiple configured feedback processes for each of the configured downlink serving cells.

An apparatus for wireless communications at a UE is described. The apparatus may include a processor, memory in electronic communication with the processor, and instructions stored in the memory. The instructions may be executable by the processor to cause the apparatus to receive configuration information from a base station that configures group-based acknowledgment feedback type for at least two downlink transmission groups of at least two serving cells, and that configures a one-shot acknowledgment feedback type that provides feedback for each of a set of multiple configured feedback processes at the UE upon request, determine that a first acknowledgment feedback report for one or more of the at least two downlink transmission groups is to be provided in a first acknowledgment feedback occasion, receive a downlink control information transmission from the base station that indicates that the one-shot acknowledgement feedback is to be provided by the UE in the first acknowledgment feedback occasion, and transmit, responsive to the downlink control information transmission, a one-shot feedback report to the base station instead of the first acknowledgment feedback report in the first acknowledgment feedback occasion, where the one-shot feedback report includes acknowledgment feedback for each of the set of multiple configured feedback processes for each of the configured downlink serving cells.

Another apparatus for wireless communications at a UE is described. The apparatus may include means for receiving configuration information from a base station that configures group-based acknowledgment feedback type for at least two downlink transmission groups of at least two serving cells, and that configures a one-shot acknowledgment feedback type that provides feedback for each of a set of multiple configured feedback processes at the UE upon request, means for determining that a first acknowledgment feedback report for one or more of the at least two downlink transmission groups is to be provided in a first acknowledgment feedback occasion, means for receiving a downlink control information transmission from the base station that indicates that the one-shot acknowledgement feedback is to be provided by the UE in the first acknowledgment feedback occasion, and means for transmitting, responsive to the downlink control information transmission, a one-shot feedback report to the base station instead of the first acknowledgment feedback report in the first acknowledgment feedback occasion, where the one-shot feedback report includes acknowledgment feedback for each of the set of multiple configured feedback processes for each of the configured downlink serving cells.

A non-transitory computer-readable medium storing code for wireless communications at a UE is described. The code may include instructions executable by a processor to receive configuration information from a base station that configures group-based acknowledgment feedback type for at least two downlink transmission groups of at least two serving cells, and that configures a one-shot acknowledgment feedback type that provides feedback for each of a set of multiple configured feedback processes at the UE upon request, determine that a first acknowledgment feedback report for one or more of the at least two downlink transmission groups is to be provided in a first acknowledgment feedback occasion, receive a downlink control information transmission from the base station that indicates that the one-shot acknowledgement feedback is to be provided by the UE in the first acknowledgment feedback occasion, and transmit, responsive to the downlink control information transmission, a one-shot feedback report to the base station instead of the first acknowledgment feedback report in the first acknowledgment feedback occasion, where the one-shot feedback report includes acknowledgment feedback for each of the set of multiple configured feedback processes for each of the configured downlink serving cells.

In some examples of the method, apparatuses, and non-transitory computer-readable medium described herein, the first acknowledgment feedback report may be preempted by the one-shot feedback report.

In some examples of the method, apparatuses, and non-transitory computer-readable medium described herein, the configuration information further configures one or more of the downlink transmission groups with transport block level acknowledgment feedback or code block group level acknowledgment feedback and where the one-shot feedback report provides transport block level acknowledgment feedback irrespective of whether the associated downlink transmission group may be configured for transport block level acknowledgment feedback or code block group level acknowledgment feedback.

Some examples of the method, apparatuses, and non-transitory computer-readable medium described herein may further include operations, features, means, or instructions for setting a new acknowledgment feedback indicator (NFI) to be toggled after transmitting the one-shot acknowledgment feedback report.

Some examples of the method, apparatuses, and non-transitory computer-readable medium described herein may further include operations, features, means, or instructions for setting a downlink assignment indicator (DAD counter for each of the at least two serving cells to be an initial value based on the NFI being toggled.

Some examples of the method, apparatuses, and non-transitory computer-readable medium described herein may further include operations, features, means, or instructions for maintaining a new acknowledgment feedback indicator (NFI) for each of the at least two serving cells as a prior value after transmitting the one-shot acknowledgment feedback report for comparison with a subsequent NFI indication for the associated downlink transmission group.

A method for wireless communications at a UE is described. The method may include receiving, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level, receiving a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback, formatting the group-based acknowledgment feedback based on which of the first component carrier or the second component carrier provided the downlink control information transmission, and transmitting the group-based acknowledgment feedback report to the base station.

An apparatus for wireless communications at a UE is described. The apparatus may include a processor, memory in electronic communication with the processor, and instructions stored in the memory. The instructions may be executable by the processor to cause the apparatus to receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level, receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback, format the group-based acknowledgment feedback based on which of the first component carrier or the second component carrier provided the downlink control information transmission, and transmit the group-based acknowledgment feedback report to the base station.

Another apparatus for wireless communications at a UE is described. The apparatus may include means for receiving, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level, means for receiving a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback, means for formatting the group-based acknowledgment feedback based on which of the first component carrier or the second component carrier provided the downlink control information transmission, and means for transmitting the group-based acknowledgment feedback report to the base station.

A non-transitory computer-readable medium storing code for wireless communications at a UE is described. The code may include instructions executable by a processor to receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level, receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback, format the group-based acknowledgment feedback based on which of the first component carrier or the second component carrier provided the downlink control information transmission, and transmit the group-based acknowledgment feedback report to the base station.

In some examples of the method, apparatuses, and non-transitory computer-readable medium described herein, the receiving may include operations, features, means, or instructions for receiving the downlink control information transmission from the base station on the second component carrier, where the downlink control information transmission indicates group-based acknowledgment feedback may be to be provided for the first downlink transmission group, the second downlink transmission group, or both and transmitting a code block group level feedback report for the first downlink transmission group, the second downlink transmission group, or both, based on the downlink control information transmission being transmitted on the second component carrier associated with code block group level feedback.

In some examples of the method, apparatuses, and non-transitory computer-readable medium described herein, the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a code block group based acknowledgment feedback codebook for reporting acknowledgment feedback of the first downlink transmission group, the second downlink transmission group, or both.

Some examples of the method, apparatuses, and non-transitory computer-readable medium described herein may further include operations, features, means, or instructions for receiving the downlink control information transmission from the base station on the first component carrier, where the downlink control information transmission indicates group-based acknowledgment feedback may be to be provided for the first downlink transmission group, the second downlink transmission group, or both and transmitting a transport block level feedback report for the first downlink transmission group, the second downlink transmission group, or both based on the downlink control information transmission being transmitted on the first component carrier associated with transport block level feedback.

In some examples of the method, apparatuses, and non-transitory computer-readable medium described herein, the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a transport block based acknowledgment feedback codebook for reporting acknowledgment feedback of the first downlink transmission group, the second downlink transmission group, or both.

A method for wireless communications at a UE is described. The method may include receiving, from a base station, configuration information for group-based acknowledgment feedback for one or more of a first downlink transmission group and a second downlink transmission group, receiving a downlink control information transmission from the base station, where the downlink control information schedules a first uplink transmission in which acknowledgment feedback for one or more of the first downlink transmission group or the second downlink transmission group is to be multiplexed with uplink data in the first uplink transmission, determining, based on the configuration information for the group-based acknowledgment feedback and one or more downlink assignment indicator values, an acknowledgment feedback format for an acknowledgment feedback report associated with at least one of the first downlink transmission group or the second downlink transmission group, and transmitting the acknowledgment feedback report to the base station in the first uplink transmission.

An apparatus for wireless communications at a UE is described. The apparatus may include a processor, memory in electronic communication with the processor, and instructions stored in the memory. The instructions may be executable by the processor to cause the apparatus to receive, from a base station, configuration information for group-based acknowledgment feedback for one or more of a first downlink transmission group and a second downlink transmission group, receive a downlink control information transmission from the base station, where the downlink control information schedules a first uplink transmission in which acknowledgment feedback for one or more of the first downlink transmission group or the second downlink transmission group is to be multiplexed with uplink data in the first uplink transmission, determine, based on the configuration information for the group-based acknowledgment feedback and one or more downlink assignment indicator values, an acknowledgment feedback format for an acknowledgment feedback report associated with at least one of the first downlink transmission group or the second downlink transmission group, and transmit the acknowledgment feedback report to the base station in the first uplink transmission.

Another apparatus for wireless communications at a UE is described. The apparatus may include means for receiving, from a base station, configuration information for group-based acknowledgment feedback for one or more of a first downlink transmission group and a second downlink transmission group, means for receiving a downlink control information transmission from the base station, where the downlink control information schedules a first uplink transmission in which acknowledgment feedback for one or more of the first downlink transmission group or the second downlink transmission group is to be multiplexed with uplink data in the first uplink transmission, means for determining, based on the configuration information for the group-based acknowledgment feedback and one or more downlink assignment indicator values, an acknowledgment feedback format for an acknowledgment feedback report associated with at least one of the first downlink transmission group or the second downlink transmission group, and means for transmitting the acknowledgment feedback report to the base station in the first uplink transmission.

A non-transitory computer-readable medium storing code for wireless communications at a UE is described. The code may include instructions executable by a processor to receive, from a base station, configuration information for group-based acknowledgment feedback for one or more of a first downlink transmission group and a second downlink transmission group, receive a downlink control information transmission from the base station, where the downlink control information schedules a first uplink transmission in which acknowledgment feedback for one or more of the first downlink transmission group or the second downlink transmission group is to be multiplexed with uplink data in the first uplink transmission, determine, based on the configuration information for the group-based acknowledgment feedback and one or more downlink assignment indicator values, an acknowledgment feedback format for an acknowledgment feedback report associated with at least one of the first downlink transmission group or the second downlink transmission group, and transmit the acknowledgment feedback report to the base station in the first uplink transmission.

In some examples of the method, apparatuses, and non-transitory computer-readable medium described herein, the downlink assignment indicator value indicates a number of feedback acknowledgments to be reported in the acknowledgment feedback report, and the downlink control information includes a single downlink assignment indicator value that may be associated with one of the first downlink transmission group or the second downlink transmission group.

Some examples of the method, apparatuses, and non-transitory computer-readable medium described herein may further include operations, features, means, or instructions for determining which of the first downlink transmission group or the second downlink transmission group may be scheduled to may have acknowledgment feedback provided in the first uplink transmission, and where the downlink assignment indicator value may be associated with the determined downlink transmission group.

In some examples of the method, apparatuses, and non-transitory computer-readable medium described herein, the first downlink transmission group includes a group g and the second downlink transmission group includes a group (g+1) mod 2 and the downlink assignment indicator may be associated with the group g and the first uplink transmission does not include hybrid automatic repeat request acknowledgment (HARQ-ACK) information for the group (g+1) mod 2.

In some examples of the method, apparatuses, and non-transitory computer-readable medium described herein, the downlink control information includes a first downlink assignment indicator value that may be associated with the first downlink transmission group and a second downlink assignment indicator value that may be associated with the second downlink transmission group, and and the first downlink assignment indicator value may be used to determine a payload of the acknowledgment feedback report and multiplexing of the acknowledgment feedback report with the first uplink transmission.

In some examples of the method, apparatuses, and non-transitory computer-readable medium described herein, a predetermined value of the second downlink assignment indicator value indicates that acknowledgment feedback information of the second downlink transmission group may be not to be included in the acknowledgment feedback report.

In some examples of the method, apparatuses, and non-transitory computer-readable medium described herein, the predetermined value of the second downlink assignment indicator may be four.

In some examples of the method, apparatuses, and non-transitory computer-readable medium described herein, when the second downlink assignment indicator value may have a value other than the predetermined value, one or more negative acknowledgment indications may be provided in the acknowledgment feedback report to provide a report length that may be based on the second downlink assignment indicator value.

In some examples of the method, apparatuses, and non-transitory computer-readable medium described herein, the determining may include operations, features, means, or instructions for determining that the acknowledgment feedback report may be to include acknowledgment feedback for both the first downlink transmission group and the second downlink transmission group, and that the configuration information further indicates that a single downlink assignment indicator value may be provided in the downlink control information.

Some examples of the method, apparatuses, and non-transitory computer-readable medium described herein may further include operations, features, means, or instructions for determining, based on identifying the error case, to refrain from multiplexing the acknowledgment feedback report in the first uplink transmission, refrain from transmitting the first uplink transmission entirely, or transmit the acknowledgment feedback report with preconfigured feedback information.

Some examples of the method, apparatuses, and non-transitory computer-readable medium described herein may further include operations, features, means, or instructions for formatting the acknowledgment feedback report with an acknowledgment feedback codebook associated with a fixed downlink transmission group associated with the single downlink assignment indicator.

In some examples of the method, apparatuses, and non-transitory computer-readable medium described herein, the first downlink transmission group includes the fixed downlink transmission group associated with the single downlink assignment indicator.

In some examples of the method, apparatuses, and non-transitory computer-readable medium described herein, the determining may include operations, features, means, or instructions for determining that the acknowledgment feedback report may be to include acknowledgment feedback for both the first downlink transmission group and the second downlink transmission group, and that the configuration information further indicates that a first downlink assignment indicator value for the first downlink transmission group and a second downlink assignment indicator value for the second downlink transmission group may be provided in the downlink control information, determining a first acknowledgment feedback codebook for the first downlink transmission group based on the first downlink assignment indicator value, and determining a second acknowledgment feedback codebook for the second downlink transmission group based on the second downlink assignment indicator value.

In some examples of the method, apparatuses, and non-transitory computer-readable medium described herein, the first downlink assignment indicator includes a total downlink assignment indicator.

Some examples of the method, apparatuses, and non-transitory computer-readable medium described herein may further include operations, features, means, or instructions for identifying one or more of a first new acknowledgment feedback indicator (NFI) value of the first downlink transmission group or a second NFI value of the second downlink transmission group in the downlink control information, where each of the first NFI value or the second NFI value indicates whether an associated downlink assignment indicator (DAI) counter may be reset for the first downlink transmission group or the second downlink transmission group.

Some examples of the method, apparatuses, and non-transitory computer-readable medium described herein may further include operations, features, means, or instructions for determining that the first NFI value in the downlink control information transmission may be different than a latest previously received first NFI value and setting one or more bits in the acknowledgment feedback report associated with the first downlink transmission group to indicate negative acknowledgment.

Some examples of the method, apparatuses, and non-transitory computer-readable medium described herein may further include operations, features, means, or instructions for determining that the first NFI value in the downlink control information transmission may be different than a latest previously received first NFI value and that the DAI counter may have a predetermined value and skipping the first downlink transmission group when generating the acknowledgment feedback report.

Some examples of the method, apparatuses, and non-transitory computer-readable medium described herein may further include operations, features, means, or instructions for determining that the first NFI value in the downlink control information transmission may be different than a latest previously received first NFI value and that the DAI counter may have a different value than a predetermined value and setting one or more bits in the acknowledgment feedback report associated with the first downlink transmission group to indicate negative acknowledgment.

In some examples of the method, apparatuses, and non-transitory computer-readable medium described herein, a number of new acknowledgment feedback indicator (NFI) fields in the downlink control information may be configured in radio resource control (RRC) signaling.

Some examples of the method, apparatuses, and non-transitory computer-readable medium described herein may further include operations, features, means, or instructions for determining that the downlink control information includes only a single NFI field and determining to apply the single NFI field to the first downlink transmission group or the second downlink transmission group based on which of the first downlink transmission group or the second downlink transmission group may be scheduled to may have acknowledgment feedback transmitted in the first uplink transmission.

Some examples of the method, apparatuses, and non-transitory computer-readable medium described herein may further include operations, features, means, or instructions for determining that the downlink control information includes a first NFI field and a second NFI field and determining a payload and multiplexing parameters for the acknowledgment feedback report based at least on part of the first NFI field.

Some examples of the method, apparatuses, and non-transitory computer-readable medium described herein may further include operations, features, means, or instructions for ignoring the second NFI field.

Some examples of the method, apparatuses, and non-transitory computer-readable medium described herein may further include operations, features, means, or instructions for generating a set of negative acknowledgments for the second downlink transmission group to be included in the acknowledgment feedback report, where a number of negative acknowledgments may be determined based on the second NFI field and a downlink assignment indicator (DAI) counter value for the second downlink transmission group.

In some examples of the method, apparatuses, and non-transitory computer-readable medium described herein, the UE determines to provide acknowledgment feedback for both the first downlink transmission group and the second downlink transmission group in the acknowledgment feedback report, and where the method further includes, determining that the downlink control information may be configured with only one NFI field, and identifying an error case associated with the acknowledgment feedback report.

In some examples of the method, apparatuses, and non-transitory computer-readable medium described herein, the error case results in one or more of the UE not multiplexing the acknowledgment feedback report on the first uplink transmission, not transmitting the first uplink transmission, or transmitting the acknowledgment feedback report based on a preconfigured implementation at the UE.

In some examples of the method, apparatuses, and non-transitory computer-readable medium described herein, the UE generates the acknowledgment feedback report for a fixed downlink transmission group associated with the downlink control information.

Some examples of the method, apparatuses, and non-transitory computer-readable medium described herein may further include operations, features, means, or instructions for generating an acknowledgment feedback codebook for each downlink transmission group based on an associated NFI value for each downlink transmission group.

A method for wireless communications at a base station is described. The method may include transmitting configuration information to a UE that configures group-based acknowledgment feedback type for at least two downlink transmission groups of at least two serving cells, and that configures one-shot acknowledgment feedback type for providing feedback for each of a set of multiple configured feedback processes at the UE upon request, transmitting a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups, and receiving from the UE, responsive to the downlink control information transmission, a one-shot feedback report instead of the first acknowledgment feedback report in the first acknowledgment feedback occasion, where the one-shot feedback report includes acknowledgment feedback for each of the set of multiple configured feedback processes for each of the serving cells.

An apparatus for wireless communications at a base station is described. The apparatus may include a processor, memory in electronic communication with the processor, and instructions stored in the memory. The instructions may be executable by the processor to cause the apparatus to transmit configuration information to a UE that configures group-based acknowledgment feedback type for at least two downlink transmission groups of at least two serving cells, and that configures one-shot acknowledgment feedback type for providing feedback for each of a set of multiple configured feedback processes at the UE upon request, transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups, and receive from the UE, responsive to the downlink control information transmission, a one-shot feedback report instead of the first acknowledgment feedback report in the first acknowledgment feedback occasion, where the one-shot feedback report includes acknowledgment feedback for each of the set of multiple configured feedback processes for each of the serving cells.

Another apparatus for wireless communications at a base station is described. The apparatus may include means for transmitting configuration information to a UE that configures group-based acknowledgment feedback type for at least two downlink transmission groups of at least two serving cells, and that configures one-shot acknowledgment feedback type for providing feedback for each of a set of multiple configured feedback processes at the UE upon request, means for transmitting a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups, and means for receiving from the UE, responsive to the downlink control information transmission, a one-shot feedback report instead of the first acknowledgment feedback report in the first acknowledgment feedback occasion, where the one-shot feedback report includes acknowledgment feedback for each of the set of multiple configured feedback processes for each of the serving cells.

A non-transitory computer-readable medium storing code for wireless communications at a base station is described. The code may include instructions executable by a processor to transmit configuration information to a UE that configures group-based acknowledgment feedback type for at least two downlink transmission groups of at least two serving cells, and that configures one-shot acknowledgment feedback type for providing feedback for each of a set of multiple configured feedback processes at the UE upon request, transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups, and receive from the UE, responsive to the downlink control information transmission, a one-shot feedback report instead of the first acknowledgment feedback report in the first acknowledgment feedback occasion, where the one-shot feedback report includes acknowledgment feedback for each of the set of multiple configured feedback processes for each of the serving cells.

In some examples of the method, apparatuses, and non-transitory computer-readable medium described herein, the first acknowledgment feedback report may be preempted by the one-shot feedback report.

In some examples of the method, apparatuses, and non-transitory computer-readable medium described herein, the configuration information further configures one or more of the downlink transmission groups with transport block level acknowledgment feedback or code block group level acknowledgment feedback and where the one-shot feedback report provides transport block level acknowledgment feedback irrespective of whether the associated downlink transmission group may be configured for transport block level acknowledgment feedback or code block group level acknowledgment feedback.

Some examples of the method, apparatuses, and non-transitory computer-readable medium described herein may further include operations, features, means, or instructions for setting a new acknowledgment feedback indicator (NFI) to be toggled after transmitting the one-shot acknowledgment feedback report.

Some examples of the method, apparatuses, and non-transitory computer-readable medium described herein may further include operations, features, means, or instructions for setting a downlink assignment indicator (DAD counter for each of the at least two serving cells to be an initial value based on the NFI being toggled.

A method for wireless communications at a base station is described. The method may include transmitting, to a UE, configuration information for group-based acknowledgment feedback for at least a first downlink transmission group and a second downlink transmission group on at least two component carriers, transmitting, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback, and receiving, from the UE, the group-based acknowledgment feedback report based on which of the first component carrier or the second component carrier provided the downlink control information transmission.

An apparatus for wireless communications at a base station is described. The apparatus may include a processor, memory in electronic communication with the processor, and instructions stored in the memory. The instructions may be executable by the processor to cause the apparatus to transmit, to a UE, configuration information for group-based acknowledgment feedback for at least a first downlink transmission group and a second downlink transmission group on at least two component carriers, transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback, and receive, from the UE, the group-based acknowledgment feedback report based on which of the first component carrier or the second component carrier provided the downlink control information transmission.

Another apparatus for wireless communications at a base station is described. The apparatus may include means for transmitting, to a UE, configuration information for group-based acknowledgment feedback for at least a first downlink transmission group and a second downlink transmission group on at least two component carriers, means for transmitting, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback, and means for receiving, from the UE, the group-based acknowledgment feedback report based on which of the first component carrier or the second component carrier provided the downlink control information transmission.

A non-transitory computer-readable medium storing code for wireless communications at a base station is described. The code may include instructions executable by a processor to transmit, to a UE, configuration information for group-based acknowledgment feedback for at least a first downlink transmission group and a second downlink transmission group on at least two component carriers, transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback, and receive, from the UE, the group-based acknowledgment feedback report based on which of the first component carrier or the second component carrier provided the downlink control information transmission.

In some examples of the method, apparatuses, and non-transitory computer-readable medium described herein, the transmitting may include operations, features, means, or instructions for transmitting the downlink control information on the second component carrier, where the downlink control information indicates group-based acknowledgment feedback may be to be provided for the first downlink transmission group, the second downlink transmission group, or both and receiving a code block group level feedback report for the first downlink transmission group, the second downlink transmission group, or both, based on the downlink control information transmission being transmitted on the second component carrier associated with code block group level feedback.

In some examples of the method, apparatuses, and non-transitory computer-readable medium described herein, the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a code block group based acknowledgment feedback codebook for reporting acknowledgment feedback of the first downlink transmission group, the second downlink transmission group, or both.

Some examples of the method, apparatuses, and non-transitory computer-readable medium described herein may further include operations, features, means, or instructions for transmitting the downlink control information on the first component carrier, where the downlink control information transmission indicates group-based acknowledgment feedback may be to be provided for the first downlink transmission group, the second downlink transmission group, or both and receiving a transport block level feedback report for the first downlink transmission group, the second downlink transmission group, or both, based on the downlink control information transmission being transmitted on the first component carrier associated with transport block level feedback.

In some examples of the method, apparatuses, and non-transitory computer-readable medium described herein, the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a transport block based acknowledgment feedback codebook for reporting acknowledgment feedback of the first downlink transmission group, the second downlink transmission group, or both.

A method for wireless communications at base station is described. The method may include transmitting, to a UE, configuration information for group-based acknowledgment feedback for at least a first downlink transmission group and a second downlink transmission group, transmitting a downlink control information transmission to the UE that schedules a first uplink transmission in which acknowledgment feedback for one or more of the first downlink transmission group or the second downlink transmission group is to be multiplexed with uplink data in the first uplink transmission, and receiving an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

An apparatus for wireless communications at base station is described. The apparatus may include a processor, memory in electronic communication with the processor, and instructions stored in the memory. The instructions may be executable by the processor to cause the apparatus to transmit, to a UE, configuration information for group-based acknowledgment feedback for at least a first downlink transmission group and a second downlink transmission group, transmit a downlink control information transmission to the UE that schedules a first uplink transmission in which acknowledgment feedback for one or more of the first downlink transmission group or the second downlink transmission group is to be multiplexed with uplink data in the first uplink transmission, and receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

Another apparatus for wireless communications at base station is described. The apparatus may include means for transmitting, to a UE, configuration information for group-based acknowledgment feedback for at least a first downlink transmission group and a second downlink transmission group, means for transmitting a downlink control information transmission to the UE that schedules a first uplink transmission in which acknowledgment feedback for one or more of the first downlink transmission group or the second downlink transmission group is to be multiplexed with uplink data in the first uplink transmission, and means for receiving an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

A non-transitory computer-readable medium storing code for wireless communications at base station is described. The code may include instructions executable by a processor to transmit, to a UE, configuration information for group-based acknowledgment feedback for at least a first downlink transmission group and a second downlink transmission group, transmit a downlink control information transmission to the UE that schedules a first uplink transmission in which acknowledgment feedback for one or more of the first downlink transmission group or the second downlink transmission group is to be multiplexed with uplink data in the first uplink transmission, and receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

In some examples of the method, apparatuses, and non-transitory computer-readable medium described herein, the downlink assignment indicator value in the downlink control information indicates a number of feedback acknowledgments to be reported in the acknowledgment feedback report, and the downlink control information includes a single downlink assignment indicator value that may be associated with one of the first downlink transmission group or the second downlink transmission group.

Some examples of the method, apparatuses, and non-transitory computer-readable medium described herein may further include operations, features, means, or instructions for determining which of the first downlink transmission group or the second downlink transmission group may be scheduled to may have acknowledgment feedback provided in the first uplink transmission, and where the downlink assignment indicator value may be associated with the determined downlink transmission group.

In some examples of the method, apparatuses, and non-transitory computer-readable medium described herein, the downlink control information includes a first downlink assignment indicator value that may be associated with the first downlink transmission group and a second downlink assignment indicator value that may be associated with the second downlink transmission group, and the first downlink assignment indicator value may be used to determine a payload of the acknowledgment feedback report and multiplexing of the acknowledgment feedback report with the first uplink transmission.

In some examples of the method, apparatuses, and non-transitory computer-readable medium described herein, a predetermined value of the second downlink assignment indicator value indicates that acknowledgment feedback information of the second downlink transmission group may be not to be included in the acknowledgment feedback report.

In some examples of the method, apparatuses, and non-transitory computer-readable medium described herein, when the second downlink assignment indicator value may have a value other than the predetermined value, one or more negative acknowledgment indications may be provided in the acknowledgment feedback report to provide a report length that may be based on the second downlink assignment indicator value.

In some examples of the method, apparatuses, and non-transitory computer-readable medium described herein, the acknowledgment feedback report may be to include acknowledgment feedback for both the first downlink transmission group and the second downlink transmission group, and the configuration information further indicates that a first downlink assignment indicator value for the first downlink transmission group and a second downlink assignment indicator value for the second downlink transmission group may be provided in the downlink control information, a first acknowledgment feedback codebook for the first downlink transmission group based on the first downlink assignment indicator value, and a second acknowledgment feedback codebook for the second downlink transmission group based on the second downlink assignment indicator value.

Some examples of the method, apparatuses, and non-transitory computer-readable medium described herein may further include operations, features, means, or instructions for transmitting one or more of a first new acknowledgment feedback indicator (NFI) value of the first downlink transmission group or a second NFI value of the second downlink transmission group in the downlink control information, where each of the first NFI value or the second NFI value indicates whether an associated downlink assignment indicator (DAD counter may be reset for the first downlink transmission group or the second downlink transmission group.

Some examples of the method, apparatuses, and non-transitory computer-readable medium described herein may further include operations, features, means, or instructions for determining that the UE missed a downlink assignment based on each bit in the acknowledgment feedback report associated with the first downlink transmission group indicating negative acknowledgment.

In some examples of the method, apparatuses, and non-transitory computer-readable medium described herein, the first NFI value in the downlink control information transmission may be set to a predetermined value when acknowledgment feedback for the first downlink transmission group may be to be skipped when generating the acknowledgment feedback report.

In some examples of the method, apparatuses, and non-transitory computer-readable medium described herein, the first NFI value in the downlink control information transmission may be set to a predetermined value when each acknowledgment feedback bit for the first downlink transmission group in the acknowledgment feedback report may be to be set to indicate negative acknowledgment.

In some examples of the method, apparatuses, and non-transitory computer-readable medium described herein, a number of new acknowledgment feedback indicator (NFI) fields in the downlink control information may be configured in RRC signaling.

In some examples of the method, apparatuses, and non-transitory computer-readable medium described herein, the downlink control information includes only a single NFI field, and the single NFI field may be applied to the first downlink transmission group or the second downlink transmission group based on which of the first downlink transmission group or the second downlink transmission group may be scheduled to may have acknowledgment feedback transmitted in the first uplink transmission.

In some examples of the method, apparatuses, and non-transitory computer-readable medium described herein, the downlink control information includes a first NFI field and a second NFI field, and a payload and multiplexing parameters for the acknowledgment feedback report may be based at least on part of the first NFI field.

In some examples of the method, apparatuses, and non-transitory computer-readable medium described herein, the second NFI field may be ignored by the UE when generating the acknowledgment feedback report.

In some examples of the method, apparatuses, and non-transitory computer-readable medium described herein, a set of negative acknowledgments for the second downlink transmission group may be included in the acknowledgment feedback report, and a number of negative acknowledgments may be based on the second NFI field and a downlink assignment indicator (DAI) counter value for the second downlink transmission group.

In some examples of the method, apparatuses, and non-transitory computer-readable medium described herein, an acknowledgment feedback codebook for each downlink transmission group may be based on an associated NFI value for each downlink transmission group.

DETAILED DESCRIPTION

Figure 1:
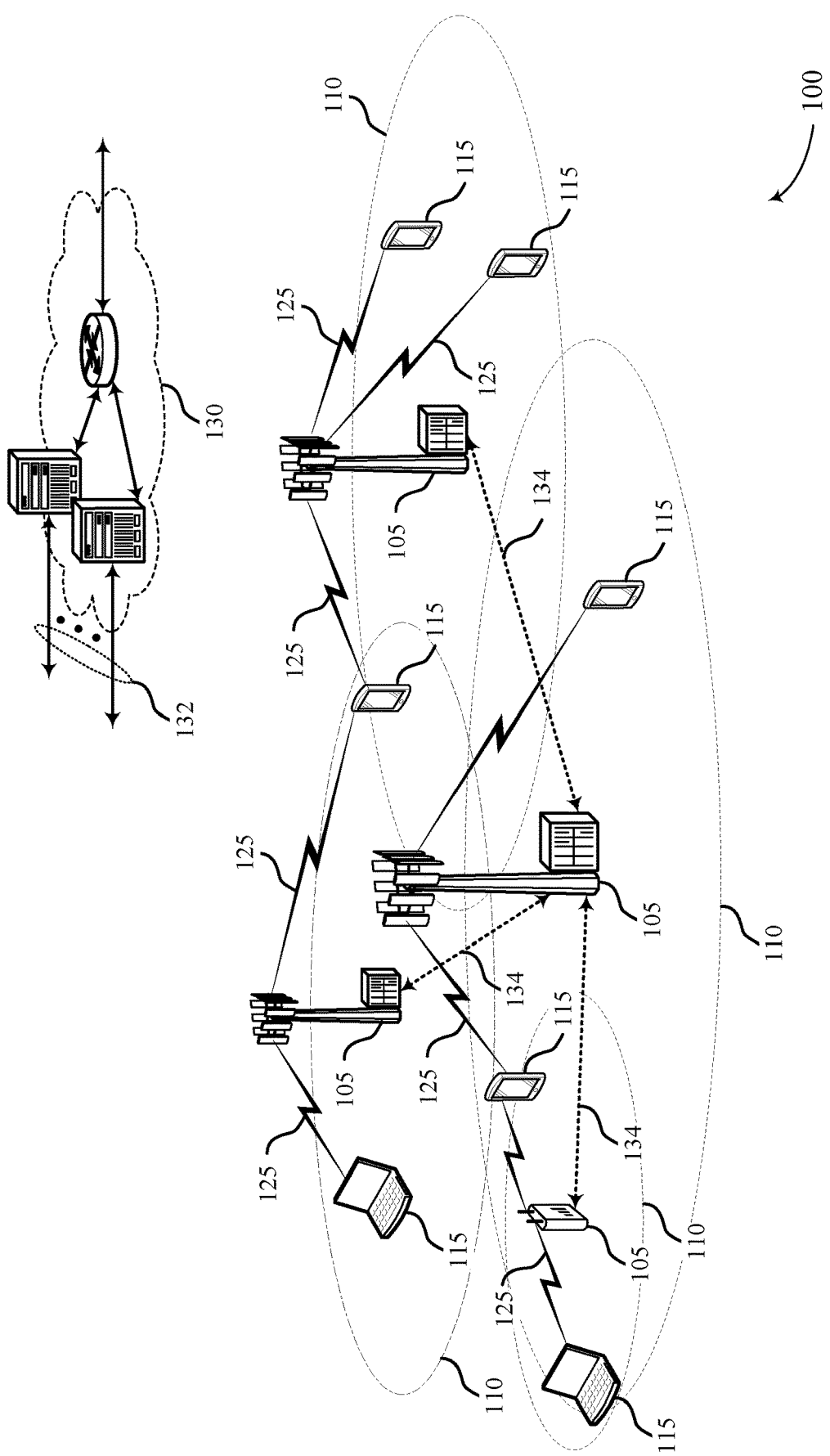
FIG. 1 illustrates an example of a system for wireless communications that supports acknowledgment feedback techniques in wireless communications in accordance with aspects of the present disclosure.

The described aspects of the disclosure relate to improved methods, systems, devices, or apparatuses that facilitate feedback for transmissions or retransmissions, such as hybrid automatic repeat request (HARQ) acknowledgment/negative-acknowledgment (ACK/NACK) feedback reports. In some examples, the techniques described herein enable efficient group-based feedback reporting of code block group (CBG) based feedback, transport block (TB) based feedback, or both, for one or more groups of downlink transmissions (e.g., physical downlink shared channel (PDSCH) groups). In some cases, the one or more groups of downlink transmissions each may include multiple downlink transmissions, and feedback for the different downlink transmissions may be provided by a user equipment (UE) to a base station in a feedback codebook transmitted in an uplink communication. Group-based feedback reporting may also be referred to as enhanced dynamic acknowledgment feedback, and a group-based acknowledgment feedback codebook may be referred to as an enhanced dynamic HARQ-Ack codebook.

In some cases, a UE may be provided with both a group-based feedback configuration and a one-shot feedback configuration, where the group-based feedback configuration provides a group-based acknowledgment feedback codebook for downlink transmissions of one or more PDSCH groups, and the one-shot feedback configuration provides a one-shot acknowledgment feedback codebook for all configured downlink feedback process (e.g., each of a number of configured HARQ process IDs) for all component carriers. In some cases, when one-shot feedback is requested, the UE reports one-shot feedback and preempts any group-based feedback reports that were to be transmitted in an acknowledgment feedback occasion used for the one-shot feedback. In some cases, one or more of a downlink assignment indicator or index (DAD, a new acknowledgment feedback indicator (NFI), or both, may be considered to be reset or toggled, respectively, responsive to the transmission of the one-shot feedback.

Additionally or alternatively, in some cases, two or more component carriers (CCs) may be configured, in which one CC may be configured for transport block (TB) based feedback and another CC may be configured for code block group (CBG) based feedback. In such cases, if downlink control information (DCI) is received on a CC that requests a feedback report, the feedback report is provided using whichever of TB-based or CBG-based feedback is configured for the CC that carries the DCI. For example, if a first CC is configured for CBG-based feedback and carries DCI requesting acknowledgment feedback for one or more downlink transmission groups, the UE may provide CBG-based feedback in the associated acknowledgment feedback report(s). Likewise, if the first CC is not configured for CBG-based feedback and carries DCI requesting acknowledgment feedback for one or more downlink transmission groups, the UE may provide TB-based feedback in the associated acknowledgment feedback report(s).

Additionally or alternatively, some further aspects of the present disclosure provide techniques in which an uplink DCI that includes information for an uplink transmission that is to include group-based acknowledgment feedback may also provide one or more of a DAI value or a NFI for one or more of the groups of downlink transmissions, which may be referred to as UL-DAI or UL-NFI. The UE may determine a feedback codebook for providing the acknowledgment feedback based at least in part on the UL-DAI, UL-NFI, or combinations thereof, provided in the uplink DCI. In some cases, the UL-DAI, UL-NFI, or both may not be associated with a fixed downlink transmission group, and may be used for whichever group is to be reported responsive to the uplink DCI. In other cases, UL-DAI, UL-NFI, or both may be provided for each of two or more downlink transmission groups in the uplink DCI, and the UL-DAI, UL-NFI, or both associated with one of the downlink transmission groups may be used to determine acknowledgment feedback report payload and multiplexing for the acknowledgment feedback report.

Techniques such as discussed herein may be used to efficiently determine acknowledgment feedback that is to be provided from a UE to a base station. Further, various techniques may provide for indications of feedback that is to be provided from a UE with relatively low overhead and no ambiguity. Providing efficient and reliable feedback reports may enhance the efficiency and reduce latency of a wireless communications system, thus enhancing system performance.

Aspects of the disclosure are initially described in the context of a wireless communications system. Additional aspects of the disclosure are then described with respect to several techniques for group-based acknowledgment feedback. Aspects of the disclosure are further illustrated by and described with reference to apparatus diagrams, system diagrams, and flowcharts that relate to acknowledgment feedback techniques in wireless communications.

FIG. 1 illustrates an example of a wireless communications system 100 that supports acknowledgment feedback techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, UEs 115 and base stations 105 may support retransmissions of data to increase the likelihood that data is received successfully. HARQ feedback such as discussed herein is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support group-based acknowledgment feedback in which HARQ feedback for one or more groups of downlink transmissions may be transmitted from a UE 115 to a base station 105 in a single uplink communication.

Various techniques described herein enable efficient group-based acknowledgment feedback reporting, in which feedback for a number of different downlink transmissions may be provided by a UE 115 to a base station 105. Acknowledgment feedback may be provided using TB level feedback, CBG level feedback, or combinations thereof. Acknowledgment feedback may be provided in one or more group-based feedback reports, a one-shot feedback report, or any combinations thereof, based on feedback configurations and one or more parameters indicated to the UE 115 in downlink control information.

Figure 2:
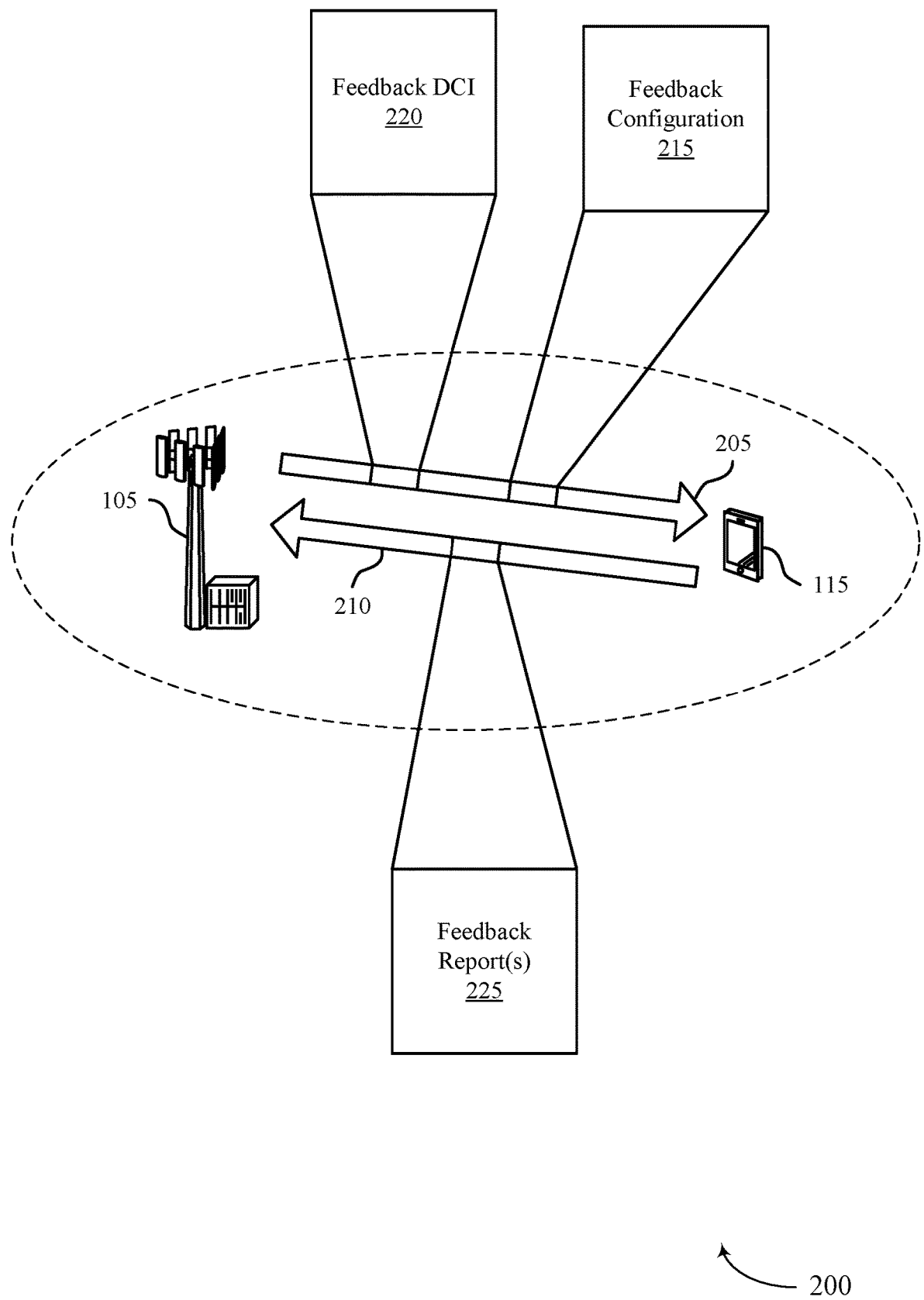
FIG. 2 illustrates an example of a wireless communications system that supports acknowledgment feedback techniques in wireless communications in accordance with aspects of the present disclosure.

FIG. 2 illustrates an example of a wireless communications system 200 that supports acknowledgment feedback techniques in wireless communications in accordance with aspects of the present disclosure. In some examples, wireless communications system 200 may implement aspects of wireless communications system 100. Wireless communications system 200 may include a base station 105 and a UE 115, which may be examples of corresponding base stations 105 and UEs 115 as described with reference to FIG. 1.

As described herein, base station 105 and UE 115 may employ HARQ feedback techniques to indicate whether data has been received correctly at UE 115. For example, base station 105 may transmit one or more downlink messages to UE 115 on resources of a carrier 205. The UE 115 may transmit an indication of whether the one or more downlink messages were received and decoded correctly on resources of a carrier 210. In some cases, carriers 205 and 210 may be the same carrier. In some cases, carriers 205 and 210 may be component carriers (CCs), and a number of different CCs may be used for communications between the UE 115 and the base station 105, such as in the example discussed with reference to FIG. 4 below. In some cases, carriers 205 and 210 may use licensed spectrum, shared or unlicensed spectrum, or combinations thereof. When using unlicensed or shared spectrum, the UE 115 and base station 105 may use a contention-based access technique (e.g., a listen before talk (LBT) procedure) to determine if a channel is available prior to initiating transmissions.

In this example, base station 105 may provide a feedback configuration 215 to the UE 115 that may configure various different acknowledgment feedback reports that are to be provided by the UE 115. For example, the feedback configuration 215 may provide configuration parameters for enhanced dynamic feedback codebooks for providing acknowledgment feedback for one or more PDSCH groups on one or more CCs. Further, the feedback configuration 215 may provide a one-shot feedback configuration that provides feedback codebooks for reporting acknowledgment feedback for each configured feedback process (e.g., each configured HARQ process ID) across all configured CCs. In some cases, feedback configuration 215 may be provided through radio resource control (RRC) signaling. The base station 105 may then transmit one or more downlink transmissions (e.g., one or more PDSCH transmissions for one or more PDSCH groups), and provide a feedback DCI 220 on carrier 205. The UE 115 may then respond with one or more feedback reports 225 on carrier 210.

In some cases, the wireless communications system 200 may operate in a NR system, which may allow for two modes of transmission of a HARQ-ACK codebook, which may include a semi-static (e.g., Type 1) mode, and a dynamic (e.g., Type 2) mode. An enhanced dynamic feedback mode (also referred to as group-based feedback mode) may allow for grouping of multiple downlink transmissions (e.g., PDSCH grouping for one or more PDSCH groups) by signaling feedback parameters that provide a group identification (e.g., a group index may be provided in a DCI scheduling a PDSCH transmission). In some cases, such feedback parameters may include an indication of an uplink transmission timing (e.g., based on a value of K1, which is a PDSCH-to-HARQ_feedback timing indicator field in the DCI), that indicates a number of slots between a downlink transmission and a slot that is to include the feedback report 220. In some cases, a non-numerical value of uplink transmission timing (e.g., a non-numeric K1) that may indicate that the CBG/TB based feedback report 220 is to be transmitted responsive to a trigger event (e.g., a trigger from the base station 105 that provides timing information for an uplink transmission with the acknowledgment feedback report). In cases of numeric or non-numeric uplink transmission timing, a number of feedback bits (e.g., HARQ ACK/NACK indications for downlink TBs/CBGs) can change between successive requests for acknowledgment feedback for the same downlink transmission group. In some cases, the feedback report 220 may carry CBG/TB based feedback in a same uplink transmission (e.g., a same physical uplink control channel (PUCCH) transmission) for each of a number of different downlink transmissions in a downlink transmission group. Further, in some cases, a single feedback DCI 215 may request acknowledgment feedback for one or more downlink transmission groups in a same feedback report 220.

The feedback DCI 220 may be included in a downlink or uplink grant (e.g., downlink message such as a physical downlink control channel (PDCCH) transmission), or UE 115 may be explicitly triggered to transmit feedback report(s) 225 (e.g., triggered in a separate DCI message to transmit a CBG/TB based feedback report or a one-shot feedback report). For feedback DCI 220 that indicates enhanced dynamic feedback is to be reported, UE 115 may be indicated, by base station 105, to provide one or more CBG/TB based feedback reports 220 based on one or more group-based feedback parameters at a TB level, CBG level, or combinations thereof. For example, the base station 105 may configure the UE 115 for group-based feedback, and the UE 115 may prepare and transmit one or more CBG/TB based feedback reports 220 based on the group-based configuration provided in the feedback configuration 215. In some cases, the feedback DCI 220 may indicate that a one-shot feedback transmission is to be provided, and the UE 115 may prepare and transmit a feedback report 225 that includes a one-shot acknowledgment feedback codebook with a feedback indication for each configured feedback process (e.g., for each configured HARQ process ID at the UE 115) across each configured CC.

In some cases, the feedback DCI 215 may include an indication of one or more DAIs that may provide a counter of downlink assignments (e.g., TB or CBG downlink transmissions) that are to be reported in a CBG/TB based feedback. In some cases, the DAIs may include a counter DAI (cDAI) that may indicate an accumulated number of downlink transmissions (e.g., number of TBs, from which a number of CBs may be determined based on a configured number of CBGs in each TB (e.g., 4 CBGs in each TB)) within each downlink transmission group. In some cases, the cDAI may count up using a modulo four operation (i.e., the cDAI value may be provided using two bits, in which the UE 115 and base station 105 may determine the cDAI based on whether the bits have rolled-over due to the modulo operation). In some cases, the DAIs may also include a total DAI (tDAI), that may indicate a total number of DAIs across multiple component carriers for each downlink transmission group separately, which may also use a modulo operation as discussed with the cDAI. The tDAI may thus provide an indication of whether the UE 115 may have missed a DCI for a carrier. In some cases, the feedback parameters may also include a new acknowledgment feedback indicator (NFI) for each downlink transmission group which may operate as a toggle bit that, when toggled, indicates the DAI for the downlink transmission group is to be reset. In some cases, the UE 115 may provide a capability report to the base station 105 that indicates a capability of the UE to support enhanced dynamic acknowledgment feedback.

In some cases, the UE 115 may be configured with both enhanced dynamic acknowledgment feedback and one-shot acknowledgment feedback. In such cases, when one-shot feedback is requested by the feedback DCI 220, the UE 115 may report acknowledgment feedback for all HARQ processes in all CCs configured for the UE 115 independent of any scheduled PDSCH group(s), NFI values for the PDSCH group(s), request of feedback for the other PDSCH groups, or any combinations thereof. The UE 115 may then format a one-shot acknowledgment feedback codebook to be provided in feedback report 225. In cases where an enhanced dynamic codebook is scheduled in a same uplink slot as the one-shot acknowledgment feedback, the enhanced dynamic acknowledgment feedback is preempted and is not reported for that HARQ-Ack occasion. Further, in cases where the UE 115 is also configured with CBG-based acknowledgment feedback and one-shot feedback is requested, the UE 115 may format a TB-based acknowledgment feedback report for that HARQ-Ack occasion. In some cases, after a one-shot acknowledgment feedback report, the UE 115 may assume that NFI of each of the configured PDSCH groups are toggled and that DAI is reset for each group. Thus, future enhanced dynamic acknowledgment feedback may be based on the toggled NFI and reset DAI, and acknowledgment feedback for a PDSCH group after the one-shot acknowledgment feedback will not carry ACK/NACK information from previous HARQ-Ack opportunities for the PDSCH group (as NFI is toggled). In other cases, after a one-shot acknowledgment feedback report, the UE 115 may resume the enhanced dynamic codebook by comparing the NFI of a PDSCH group with the previous value of NFI, and thus the base station 105 makes a choice as to whether to toggle NFI or not. An example of an enhanced dynamic acknowledgment feedback report for the described different options is discussed with reference to FIG. 3.

Figure 3:
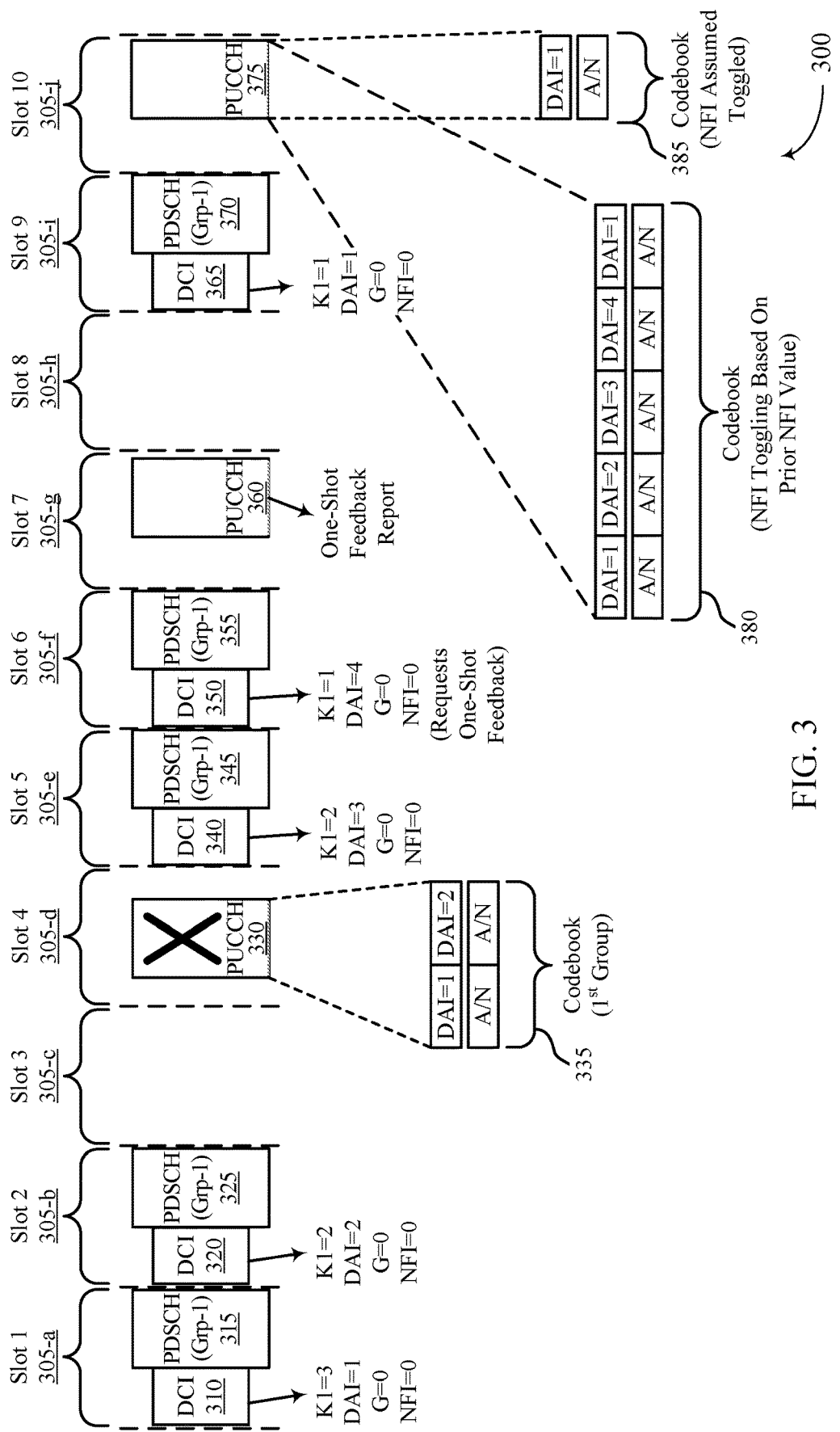
FIG. 3 illustrates an example of a feedback timeline and feedback reports that support acknowledgment feedback techniques in wireless communications in accordance with aspects of the present disclosure.

FIG. 3 illustrates an example of a feedback timeline and feedback reports 300 that support acknowledgment feedback techniques in wireless communications in accordance with aspects of the present disclosure. In some examples, feedback timeline and feedback reports 300 may implement aspects of wireless communications system 100 or 200 as described with reference to FIGS. 1 and 2. In this example, a number of transmission slots 305 are illustrated, including a first transmission slot 305-a through a tenth transmission slot 305-j. In some cases, transmissions using transmission slots 305 may use licensed spectrum, unlicensed spectrum, or combinations thereof.

In this example, a first DCI 310 may be transmitted in the first slot 305-a, that may include downlink scheduling information for an associated first PDSCH transmission 315 of a first group in the first slot 305-a. In this example, the first DCI 310 may include group-based feedback parameters, K1=3 (i.e., that indicates the associated acknowledgment feedback is to be provided in fourth slot 305-d), DAI=1 (i.e., that indicates the DAI is for an initial acknowledgment feedback indicator to be included in an acknowledgment codebook), G=0 (i.e., that identifies first PDSCH group), and NFI=0. In this example, the DAI may indicate TBs for associated TB level feedback. In other cases, one or more PDSCH groups may be configured for CBG level feedback, in which case a maximum number of configured CBGs per TB may be used for determination of ACK/NACK bits.

In the example of FIG. 3, a second DCI 320 may schedule a second PDSCH transmission 325 of the first downlink transmission group in second slot 305-b. In this example, the second DCI 320 includes group-based feedback parameters of K1=2 (i.e., that the associated acknowledgment feedback is to be provided in the fourth slot 305-d), DAI=2 (i.e., the next consecutive DAI count indicating that one or more DAIs have not been missed), G=0 (i.e., for the same group as the first DCI 310 and first PDSCH transmission 315), and NFI=0 (i.e., that the DAI has not been reset based on not being toggled from the prior DCI).

The UE receiving the downlink transmissions may format a feedback codebook 335 for transmission in PUCCH transmission 330 that, in this example, includes bits associated with each TB indicated in DAI of the first group of downlink transmissions as indicated in the received feedback parameters. Thus, in this example, feedback codebook 335 is for the first group, and includes a TB level ACK/NACK bit associated with DAI=1 of the first slot 305-*a*, and a second TB level ACK/NACK bit associated with DAI=2 of the second slot 305-*b*. In this example, the PUCCH transmission 330 may not be successfully received at the base station (e.g., due to interference, failed LBT, etc.).

In this example, the base station may determine that the PUCCH transmission 330 is not successfully received, and may thus maintain DCI parameters of the group-based acknowledgment feedback in order to obtain the feedback associated with the first slot 305-*a* through the third slot 305-*c*. In this example, in fifth slot 305-*e*, associated with the first downlink transmission group, the base station may transmit a third DCI 340 for an associated third PDSCH transmission 345. In this example, the third DCI 340 includes group-based feedback parameters of K1=2 (i.e., that the associated acknowledgment feedback is to be provided in the seventh slot 305-*g*), DAI=3 (i.e., the next consecutive DAI count indicating that one or more DAIs have not been missed), G=0 (i.e., for the same group as the first DCI 310 and first PDSCH transmission 315), and NFI=0 (i.e., that the DAI has not been reset based on not being toggled from the prior DCI).

In this example, in sixth slot 305-*f*, the base station may transmit a fourth DCI 350 for an associated fourth PDSCH transmission 355. In this example, the fourth DCI 350 includes group-based feedback parameters of K1=1 (i.e., that the associated acknowledgment feedback is to be provided in the seventh slot 305-*g*), DAI=2 (i.e., the next consecutive DAI count of the second group indicating that one or more DAIs have not been missed), G=1 (i.e., for the second downlink transmission group), and NFI=0 (i.e., that the DAI has not been reset based on not being toggled from the prior DCI). Additionally, in this example, the fourth DCI 350 may indicate that one-shot feedback is requested. In some examples, the one-shot feedback may be requested by setting a one-bit indicator in the DCI to indicate one-shot feedback (e.g., one bit included in DCI format 1_1 to request one-shot feedback).

The seventh slot 305-*g* may include resources for a second PUCCH transmission 360, for reporting of the acknowledgment feedback. In this case, since the one-shot feedback is requested, the UE may format a one-shot feedback codebook that includes an ACK/NACK indication for each configured HARQ process ID at the UE across each configured downlink CC. In some cases, the one-shot acknowledgment feedback may be TB-based feedback irrespective of whether CBG-based feedback is configured for any CC. Since the seventh slot 305-*g* includes the one-shot acknowledgment feedback, the UE may refrain from transmitting the group-based acknowledgment feedback in the seventh slot 305-*g*.

As discussed with reference to FIG. 2, in some cases, the NFI following the one-shot acknowledgment feedback may be assumed to be toggled, and thus the DAI reset, or may be maintained at a prior value from before the one-shot acknowledgment feedback. In this example, at ninth slot 305-*i*, a fifth DCI 365 may be provided for an associated fifth PDSCH transmission 370. In this example, the fifth DCI 365 includes group-based feedback parameters of K1=1 (i.e., that the associated acknowledgment feedback is to be provided in the tenth slot 305-*j*), DAI=1, G=0, and NFI=0. The tenth slot 305-*j* may include resources for a third PUCCH transmission 375, for reporting of the acknowledgment feedback. In this case, the transmitted acknowledgment feedback codebook depends on how NFI and DAI are treated following a one-shot acknowledgment feedback transmission. In cases where the NFI is maintained from a prior value, and thus DAI is not reset, a first codebook 380 may be transmitted, which includes five elements based on NFI=0 and DAI=1 (i.e., due to the modulo 4 operation for the DAI value which wraps the next consecutive DAI to DAI=1). In other cases, where the UE assumes that NFI is toggled after a one-shot acknowledgment feedback, a second codebook 385 may be transmitted that includes a single element corresponding to the single DCI and PDSCH since the one-shot acknowledgment feedback transmission.

Each of the first codebook 380 and second codebook 385 includes bits associated with each DAI indicated in the received DAI fields for the associated group. Thus, in this example, since the NFI of the fifth DCI 365 is not toggled, the first codebook 380 includes a first ACK/NACK bit associated with first group DAI=1 of the first slot 305-*a*, a second ACK/NACK bit associated with first group DAI=2 of the second slot 305-*b*, a third ACK/NACK bit associated with first group DAI=3 of the fifth slot 305-*e*, a fourth ACK/NACK bit associated with first group DAI=4 of the fifth slot 305-*e*, and a fifth ACK/NACK bit associated with first group DAI=1 of the ninth slot 305-*i*. Alternatively, in cases where the UE assumes NFI is toggled, the second codebook 385 includes a single ACK/NACK bit associated with first group DAI=1 of the ninth slot 305-*i*.

As discussed herein, in some cases one or more configured CCs may be configured for CBG level feedback. An example of a wireless communications system with different serving cells or different CCs configured with CBG-based on TB-based acknowledgment feedback is discussed with respect to the example of FIG. 4.

Figure 4:
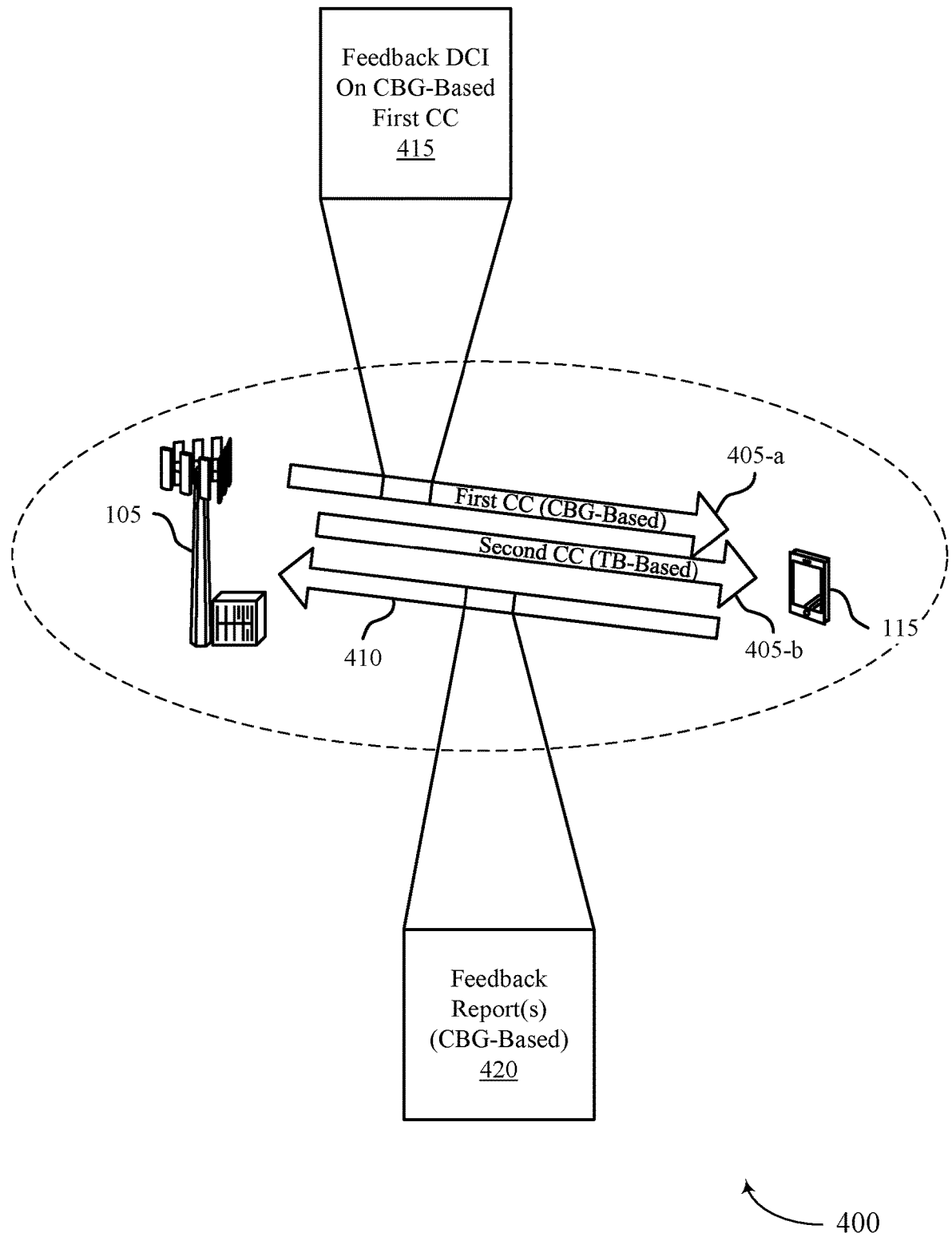
FIG. 4 illustrates an example of a wireless communications system that supports acknowledgment feedback techniques in wireless communications in accordance with aspects of the present disclosure.

FIG. 4 illustrates an example of a wireless communications system 400 that supports acknowledgment feedback techniques in wireless communications in accordance with aspects of the present disclosure. In some examples, wireless communications system 400 may implement aspects of wireless communications system 100 or 200 as described with reference to FIGS. 1 and 2. Wireless communications system 400 may include a base station 105 and a UE 115, which may be examples of corresponding base stations 105 and UEs 115 as described with reference to FIGS. 1 and 2.

As described herein, base station 105 and UE 115 may employ HARQ feedback techniques to indicate whether data has been received correctly at UE 115. For example, base station 105 may transmit one or more downlink messages to UE 115 on resources of a first CC 405-*a* and a second CC 405-*b*. In this example, the first CC 405-*a* may be configured for CBG-based feedback, and the second CC 405-*b* may be configured for TB-based feedback. The UE 115 may transmit an indication of whether the one or more downlink messages were received and decoded correctly in one or more feedback reports 420 on resources of an uplink CC 410. In some cases, CCs 405 and 410 may use licensed spectrum, shared or unlicensed spectrum, or combinations thereof. When using unlicensed or shared spectrum, the UE 115 and base station 105 may use a contention-based access technique (e.g., a listen before talk (LBT) procedure) to determine if a channel is available prior to initiating transmissions.

In this example, base station 105 may provide a feedback configuration to the UE 115 that may configure various different acknowledgment feedback reports that are to be provided by the UE 115, as discussed with reference to FIG. 2. The base station 105 may then transmit one or more downlink transmissions (e.g., one or more PDSCH transmissions for one or more PDSCH groups) via one or both CCs 405, and provide a feedback DCI 415 on the first CC 405-a, namely the CBG-based CC. In some cases, the UE 115 may then respond with one or more feedback reports 420 on CC 410. In some cases, the feedback DCI 415 may have ambiguity on whether TB-based or CBG-based feedback is to be provided, such as if feedback is requested for transmissions on the second CC 405-b, which are TB-based in this example. For example, when a downlink DCI format 1_1 is received scheduling a PDSCH for a first PDSCH group in first CC 405-a that is configured with PDSCH-CodeBlockGroupTransmission and requests feedback for the second PDSCH group, then the DCI may be ambiguous because it may indicate that both TB-based and CBG-based sub-codebooks are requested for the second group or it may indicate that only CBG-based sub-cookbook is requested. In the former case, additional tDAI and NFI fields are needed in the DCI, which increases the DCI overhead.

Thus, in accordance with some techniques provided herein, when the UE 115 is configured with enhanced dynamic codebook acknowledgment feedback and is provided with PDSCH-CodeBlockGroupTransmission in at least one CC (e.g., first CC 405-a in this example) in a PUCCH group, a DCI format 1_1 scheduling PDSCH in a CC that is configured with PDSCH-CodeBlockGroupTransmission (e.g., feedback DCI 415 in the example of FIG. 4) can only request acknowledgment feedback for CBG-based sub-codebook (for the scheduling group or the other group). In such cases, if the feedback DCI 415 is configured to include the tDAI for the other group, it corresponds to the CBG-based sub-codebook of the other PDSCH group. Note that in this case if the feedback DCI 415 is configured to include the NFI for the other group, two options may be considered. In a first option, similar to the treatment of the tDAI of the other group discussed above, NFI corresponds to the CBG-based sub-codebook. This option assumes that the CBG-based sub-codebook and TB-based sub-codebook have separate NFI values (i.e., their DAIs can be reset independently based on corresponding NFI being toggled). In a second option, the NFI may correspond to both the CBG-based sub-codebook and TB-based sub-codebook. This option assumes that the CBG-based sub-codebook and TB-based sub-codebook share the same NFI value (i.e., their DAIs are reset together based on NFI being toggled). Likewise, a DCI format 1_1 scheduling PDSCH in a CC that is not configured with PDSCH-CodeBlockGroupTransmission can only request acknowledgment feedback for TB-based sub-codebook (for the scheduling group or the other group). If configured to include the tDAI for the other group in the feedback DCI, such values may correspond to the TB-based sub-codebook of the other PDSCH group. Similarly as above, one of the described two options may be used for the NFI indication.

In some aspects, a DCI that provides an uplink grant for reporting acknowledgment feedback, which may be referred to as an uplink DCI, may be used when physical uplink shared channel (PUSCH) is scheduled and an acknowledgment feedback codebook is multiplexed in PUSCH, rather than being sent on PUCCH. In such cases, the uplink DCI may include acknowledgment feedback parameters, such as an uplink DAI and an uplink NFI, which may avoid ambiguity in the size of acknowledgment feedback that is to be reported in the uplink acknowledgment feedback transmission. In such cases, the uplink DAI and uplink NFI may be used to provide an indication of acknowledgment feedback codebook size when acknowledgment feedback is sent on PUSCH, instead of the indication of tDAI in the downlink DCI. Uplink tDAI is used for PUSCH protection, because if the acknowledgment feedback codebook size is wrong then neither acknowledgment feedback nor PUSCH can be decoded, since acknowledgment feedback is multiplexed on PUSCH. Thus, if enhanced dynamic codebook is configured, the presence of uplink DAI for an additional PDSCH group in the DCI can be configured for a UE 115 (e.g., by RRC signaling).

In some cases, the UE 115 is to report acknowledgment feedback on PUCCH for only one PDSCH group, referred to as PDSCH group x (and the other PDSCH group as y), by enhanced dynamic acknowledgment feedback codebook techniques, and uplink DCI schedules PUSCH overlapping with PUCCH (i.e., acknowledgment feedback will be multiplexed with PUSCH). In such cases, if uplink DAI is configured to be present in the uplink DCI for only one PDSCH group, the uplink DAI value is used for acknowledgment feedback codebook generation for the PDSCH group x. Thus, in such cases, PDSCH group x is not fixed, and it can be the first group (G=0) or the second group (G=1) depending on which PDSCH group the acknowledgment feedback is initially scheduled to be sent on PUCCH. That is, the uplink DAI field in the uplink DCI (scheduling PUSCH) is not associated with a fixed group. Further, if uplink DAI is configured to be present in the uplink DCI for both PDSCH groups (i.e., one uplink DAI field for PDSCH group x, another for PDSCH group y), then the uplink DAI field corresponding to PDSCH group x may be used for acknowledgment feedback payload determination and multiplexing on PUSCH. In some cases, if the value of the uplink DAI corresponding to PDSCH group y is a predetermined value (e.g., 4) and the UE 115 is to report acknowledgment feedback for only PDSCH group x, the UE does not multiplex acknowledgment feedback information for that PDSCH group. If the value of the uplink DAI corresponding to PDSCH group y is not the predetermined number (e.g., has a value other than 4) and the UE 115 is to report acknowledgment feedback for only PDSCH group x, the UE may generates NACKs (i.e., dummy NACKs) with the length equal to the value of the uplink DAI field for group y. Such a case may occur, for example, if the UE 115 missed all the downlink DCI before the uplink DCI that request acknowledgment feedback for PDSCH group y on that PUCCH.

In other cases, the UE 115 may report acknowledgment feedback on PUCCH for both PDSCH groups (e.g., groups x and y) using enhanced dynamic acknowledgment feedback codebook techniques, and uplink DCI schedules PUSCH overlapping with PUCCH such that acknowledgment feedback will be multiplexed with PUSCH. In such cases, if the uplink DAI is configured to be present in the uplink DCI for only one PDSCH group (e.g., RRC signaling configures only one uplink DAI in the uplink DCI configuration), the UE 115 may treat it as an error case, or may assign the uplink DAI to a predefined fixed PDSCH group (e.g., the uplink DAI is always assigned to group 0). In cases where such a configuration is an error case, the UE 115 does not expect this scenario to occur and may not multiplex acknowledgment feedback on PUSCH, may not transmit the PUSCH, or behave according to a preconfigured UE 115 implementation. In other cases, if uplink DAI is configured to be present in the uplink DCI for both PDSCH groups, the corresponding uplink DAI may be used for acknowledgment feedback codebook generation for that PDSCH group.

Figure 5:
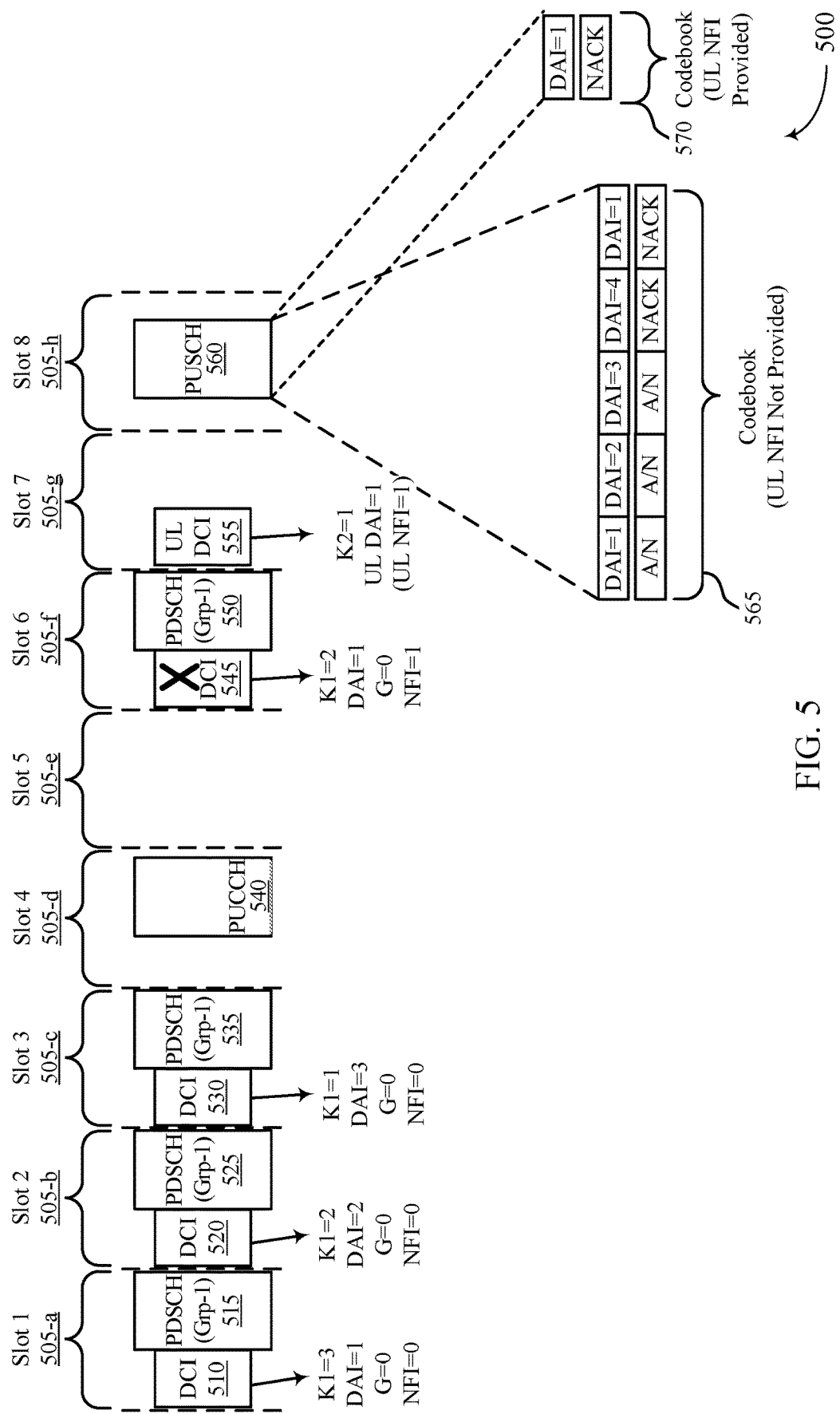
FIG. 5 illustrates an example of a feedback timeline and feedback report that supports acknowledgment feedback techniques in wireless communications in accordance with aspects of the present disclosure.

In addition to uplink DAI, it may be useful for the UE 115 to also know the NFI of a PDSCH group when acknowledgment feedback is to be multiplexed on PUSCH. In some aspects of the disclosure, the uplink DCI (e.g., uplink DCI format 0_1) may also indicate the NFI of a PDSCH group in order to remove potential ambiguity related to acknowledgment feedback codebook size. For example, if NFI is not provided, the acknowledgment feedback codebook size may not be correct (e.g., if a downlink DCI that toggles NFI is missed) and this not only results in the base station 105 not being able to decode the acknowledgment feedback and other uplink control information, but also impacts the PUSCH. For example, when the last downlink DCI is missed, and NFI is toggled in that DCI, then the acknowledgment feedback codebook size determined by the UE 115 will be incorrect, as illustrated in FIG. 5. Thus, when the UE 115 is configured with the enhanced dynamic acknowledgment feedback codebook, to protect PUSCH against a last downlink DCI being missing, NFI of a PDSCH group may be included in addition to the tDAI.

FIG. 5 illustrates an example of a feedback timeline and feedback reports 500 that support acknowledgment feedback techniques in wireless communications in accordance with aspects of the present disclosure. In some examples, feedback timeline and feedback reports 500 may implement aspects of wireless communications system 100, 200, or 400 as described with reference to FIGS. 1, 2, and 4. In this example, a number of transmission slots 505 are illustrated, including a first transmission slot 505-*a* through an eighth transmission slot 505-*h*. In some cases, transmissions using transmission slots 505 may use licensed spectrum, unlicensed spectrum, or combinations thereof.

In this example, a first DCI 510 may be transmitted in the first slot 505-*a*, that may include downlink scheduling information for an associated first PDSCH transmission 515 of a first group in the first slot 505-*a*. In this example, the first DCI 510 may include group-based feedback parameters, K1=3 (i.e., that indicates the associated acknowledgment feedback is to be provided in fourth slot 505-*d*), DAI=1 (i.e., that indicates the DAI is for an initial acknowledgment feedback indicator to be included in an acknowledgment codebook), G=0 (i.e., that identifies first PDSCH group), and NFI=0. In this example, the DAI may indicate TBs for associated TB level feedback. In other cases, one or more PDSCH groups may be configured for CBG level feedback, in which case a maximum number of configured CBGs per TB may be used to determine ACK/NACK bits.

In the example of FIG. 5, a second DCI 520 may schedule a second PDSCH transmission 525 of the first downlink transmission group in second slot 505-*b*. In this example, the second DCI 520 includes group-based feedback parameters of K1=2 (i.e., that the associated acknowledgment feedback is to be provided in the fourth slot 505-*d*), DAI=2 (i.e., the next consecutive DAI count indicating that one or more DAIs have not been missed), G=0 (i.e., for the same group as the first DCI 510 and first PDSCH transmission 515), and NFI=0 (i.e., that the DAI has not been reset based on not being toggled from the prior DCI). A third DCI 530 may schedule a third PDSCH transmission 535 of the first downlink transmission group in third slot 505-*c*. In this example, the third DCI 530 includes group-based feedback parameters of K1=1 (i.e., that the associated acknowledgment feedback is to be provided in the fourth slot 505-*d*), DAI=3 (i.e., the next consecutive DAI count indicating that one or more DAIs have not been missed), G=0 (i.e., for the same group as the first two DCIs and PDSCH transmissions), and NFI=0 (i.e., that the DAI has not been reset based on not being toggled from the prior DCI).

The UE receiving the downlink transmissions may format an acknowledgment feedback codebook for transmission in PUCCH transmission 540 that, in this example, includes bits associated with each TB indicated in DAI of the first group of downlink transmissions as indicated in the received feedback parameters. In this example, the acknowledgment feedback codebook in PUCCH transmission 540 may be successfully received at the base station, and a fourth DCI 545 scheduling a fourth PDSCH 550 in the sixth slot 505-*f* may toggle the NFI and reset the DAI. However, in this example, the UE may not receive the fourth DCI 545. Subsequently, in the seventh slot 505-*g*, the base station transmit an uplink DCI 555 that indicates that acknowledgment feedback is to be multiplexed with PUSCH 560 in the eighth slot 505-*h*.

In this example, the uplink DCI 555 may include parameters K2=1 (e.g., indicating that the acknowledgment feedback is to be transmitted in eighth slot 505-*h*), and uplink DAI=1. In this example, the uplink DCI 555 may also include an indication of uplink NFI=1. However, if the uplink NFI is not indicated, and since the UE missed the fourth DCI 545, the UE would assume that the NFI is not toggled and thus report codebook 565, which includes five bits of ACK/NACK indications, based on the uplink DAI=1 (e.g., that five feedback bits are to be provided based on the modulo 4 operation of the DAI). Because the base station only expects a single acknowledgment feedback bit, as indicated in codebook 570 based on the NFI being toggled, the acknowledgment feedback and the PUSCH 560 may not be properly decoded. Accordingly, in various aspects, the uplink DCI 555 is also configured to provide an uplink NFI indication.

Accordingly, in addition to uplink DAI field(s) in the uplink DCI, in some cases, NFI is also included in the uplink DCI for one PDSCH group or both PDSCH groups. If the indicated NFI in the uplink DCI is not the same as the latest NFI for a PDSCH group (as indicated in the downlink DCIS), the UE sets to NACK the acknowledgment feedback bits for that PDSCH group before multiplexing on PUSCH. In some cases, the number of NACKs is determined by the uplink DAI for that PDSCH group. Further, if the uplink NFI is not the same as the prior downlink NFI, if the value of the uplink DAI for that PDSCH group is a predetermined value (e.g., if the uplink DAI is 4) and NFI does not match, the UE may not multiplex acknowledgment feedback information for that PDSCH group, or the UE may generate four dummy NACKs for that PDSCH group. In some cases, the number of uplink NFI fields in uplink DCI can be RRC configured (similar to the uplink DAI fields).

In some cases, similar to uplink DAI, the uplink DCI may include uplink NFI for only a single PDSCH group. In such cases, when the UE reports acknowledgment feedback on PUCCH for only one PDSCH group (call this PDSCH group x, and the other PDSCH group as y) by enhanced dynamic acknowledgment feedback codebook techniques, and uplink DCI schedules PUSCH overlapping with PUCCH (i.e., acknowledgment feedback will be multiplexed with PUSCH), if only one uplink NFI field exists in uplink DCI, it is used for acknowledgment feedback codebook generation for the PDSCH group x. Thus, in such cases, PDSCH group x is not fixed (i.e., it can be the first group (G=0) or the second group (G=1) depending on which PDSCH group acknowledgment feedback is initially scheduled to be sent on PUCCH). That is, the uplink NFI field in the uplink DCI (scheduling PUSCH) is not associated to a fixed group.

In some cases, if two uplink NFI fields exist in uplink DCI, the uplink NFI field corresponding to PDSCH group x is used for acknowledgment feedback payload determination and multiplexing on PUSCH. For the other NFI field (for group y), the UE may ignore that NFI field, or may generate dummy NACKs for the other PDSCH group based on the value of NFI and the associated uplink DAI, in addition to using UL DAI field for group y. In some cases, if the UE reports acknowledgment feedback on PUCCH for both PDSCH groups (groups x and y) by enhanced dynamic acknowledgment feedback codebook techniques, and uplink DCI schedules PUSCH overlapping with PUCCH (i.e., acknowledgment feedback will be multiplexed with PUSCH), only one uplink NFI field may be configured to be present in the uplink DCI. In such cases, the UE may treat is as an error case (e.g., the UE does not expect this scenario to occur, does not multiplex acknowledgment feedback on PUSCH in this case, does not transmit the PUSCH in this case, or the behavior is up to UE implementation), or the uplink NFI may be set to correspond to a fixed PDSCH group (e.g., always group 0).

In cases where two uplink NFI fields are configured in the uplink DCI, the corresponding uplink NFI may be used for acknowledgment feedback sub-codebook generation for that PDSCH group. Similar to tDAI, each sub-codebook (TB-based or CBG-based) for a PDSCH group may maintain its own NFI and when NFI is toggled for that sub-codebook, DAI is reset (i.e., if NFI is toggled for CBG-based sub-codebook, it does not mean that it is also toggled for TB-based sub-codebook), or NFI may be common to both CBG-based sub-codebook and TB-based sub-codebook (i.e., UE maintains one NFI, and when toggled, DAI is reset for both). In such a case, the two sub-codebooks have separate DAI counting but they are both reset when NFI is toggled.

Figure 6:
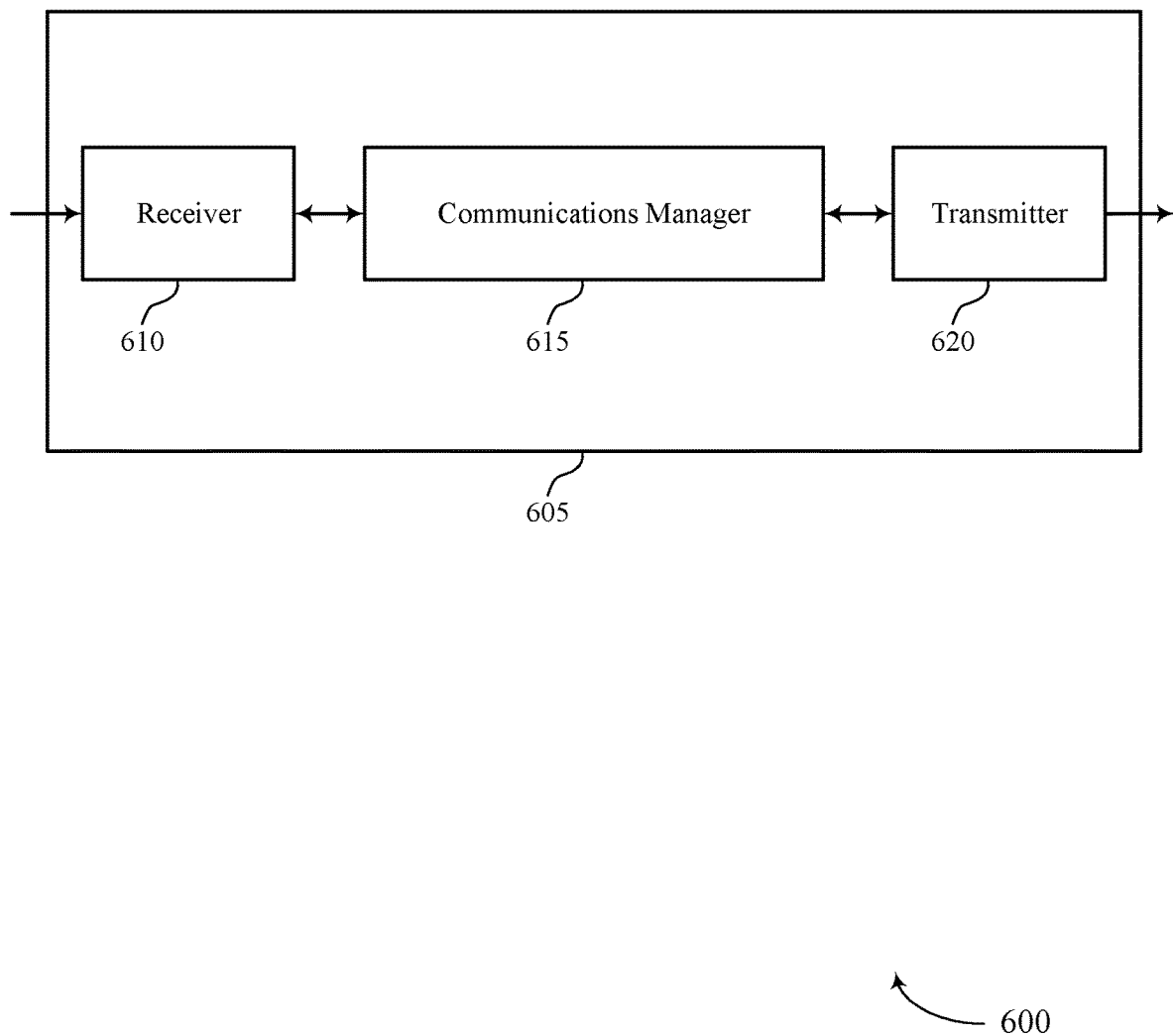
FIGS. 6 and 7 show block diagrams of devices that support acknowledgment feedback techniques in wireless communications in accordance with aspects of the present disclosure.

FIG. 6 shows a block diagram 600 of a device 605 that supports acknowledgment feedback techniques in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to acknowledgment feedback techniques in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive configuration information from a base station that configures group-based acknowledgment feedback type for at least two downlink transmission groups of at least two serving cells, and that configures a one-shot acknowledgment feedback type that provides feedback for each of a set of configured feedback processes at the UE upon request, determine that a first acknowledgment feedback report for one or more of the at least two downlink transmission groups is to be provided in a first acknowledgment feedback occasion, transmit, responsive to the downlink control information transmission, a one-shot feedback report to the base station instead of the first acknowledgment feedback report in the first acknowledgment feedback occasion, where the one-shot feedback report includes acknowledgment feedback for each of the set of configured feedback processes for each of the configured downlink serving cells, and receive a downlink control information transmission from the base station that indicates that the one-shot acknowledgement feedback is to be provided by the UE in the first acknowledgment feedback occasion.

The communications manager 615 may also receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level, receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback, format the group-based acknowledgment feedback based on which of the first component carrier or the second component carrier provided the downlink control information transmission, and transmit the group-based acknowledgment feedback report to the base station.

The communications manager 615 may also receive, from a base station, configuration information for group-based acknowledgment feedback for at least a first downlink transmission group and a second downlink transmission group, receive a downlink control information transmission from the base station that schedules a first uplink transmission in which acknowledgment feedback for one or more of the first downlink transmission group or the second downlink transmission group is to be multiplexed with uplink data in the first uplink transmission, determine, based on the configuration information for the group-based acknowledgment feedback and one or more of a downlink assignment indicator value or a new acknowledgment feedback indicator provided in the downlink control information, an acknowledgment feedback format for an acknowledgment feedback report associated with at least one of the first downlink transmission group or the second downlink transmission group, and transmit the acknowledgment feedback report to the base station in the first uplink transmission. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 may be implemented to realize one or more potential advantages. One implementation may allow the device 605 to efficiently determine acknowledgment feedback to provide to a base station. Based on the techniques for efficiently determining acknowledgment feedback, the device 605 may support providing efficient and reliable feedback reports and may exhibit an increased efficiency, or a reduced latency, among other benefits.

Figure 7:
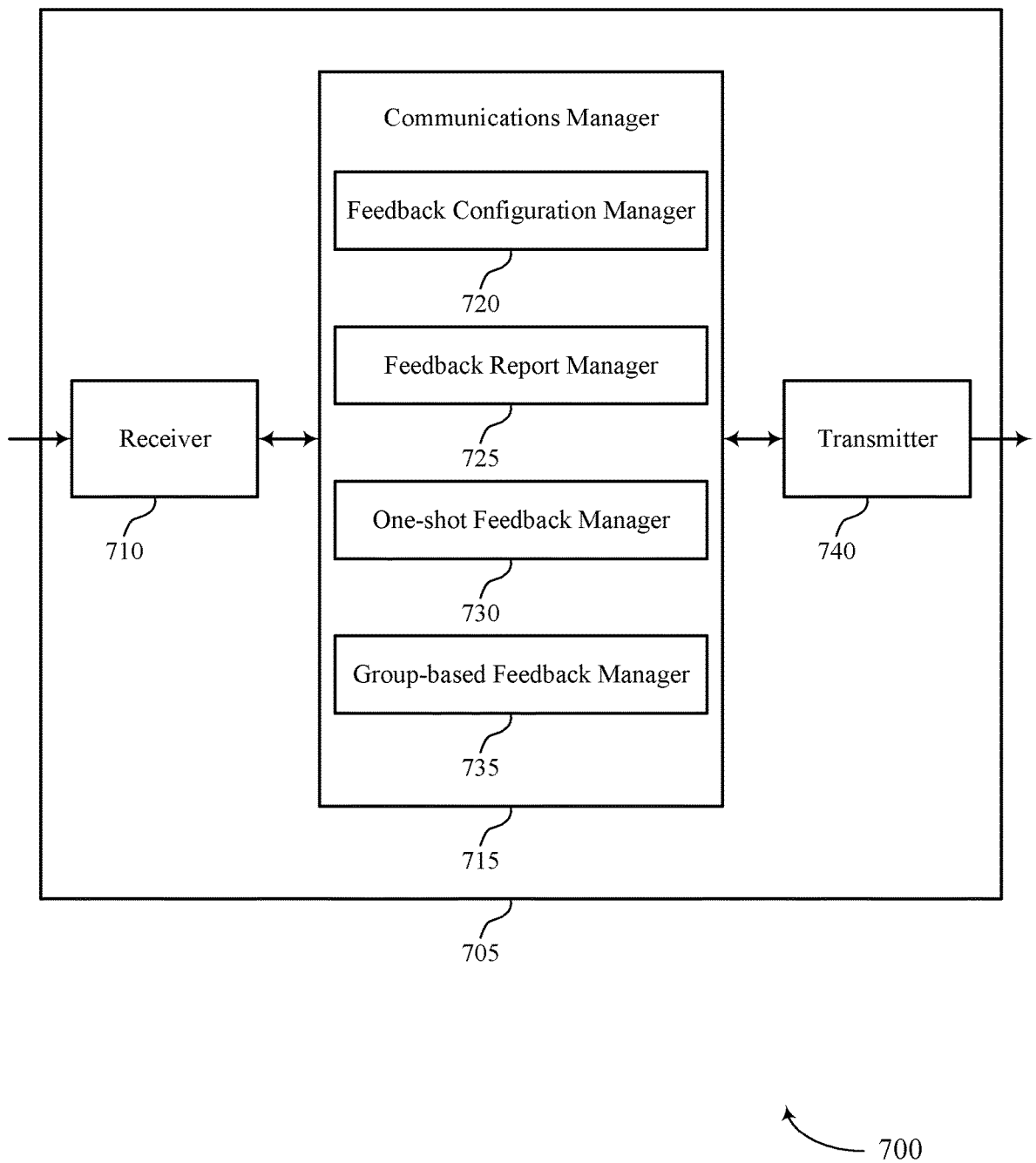

FIG. 7 shows a block diagram 700 of a device 705 that supports acknowledgment feedback techniques in wireless communications in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to acknowledgment feedback techniques in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a feedback configuration manager 720, a feedback report manager 725, an one-shot feedback manager 730, and a group-based feedback manager 735. The communications manager 715 may be an example of aspects of the communications manager 910 described herein.

In some cases, the feedback configuration manager 720 may receive configuration information from a base station that configures group-based acknowledgment feedback type for at least two downlink transmission groups of at least two serving cells, and that configures a one-shot acknowledgment feedback type that provides feedback for each of a set of configured feedback processes at the UE upon request. The feedback report manager 725 may determine that a first acknowledgment feedback report for one or more of the at least two downlink transmission groups is to be provided in a first acknowledgment feedback occasion and transmit, responsive to the downlink control information transmission, a one-shot feedback report to the base station instead of the first acknowledgment feedback report in the first acknowledgment feedback occasion, where the one-shot feedback report includes acknowledgment feedback for each of the set of configured feedback processes for each of the configured downlink serving cells. The one-shot feedback manager 730 may receive a downlink control information transmission from the base station that indicates that the one-shot acknowledgement feedback is to be provided by the UE in the first acknowledgment feedback occasion.

In some cases, the feedback configuration manager 720 may receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level. The group-based feedback manager 735 may receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback. The feedback report manager 725 may format the group-based acknowledgment feedback based on which of the first component carrier or the second component carrier provided the downlink control information transmission and transmit the group-based acknowledgment feedback report to the base station.

In some cases, the feedback configuration manager 720 may receive, from a base station, configuration information for group-based acknowledgment feedback for one or more of a first downlink transmission group or a second downlink transmission group. The group-based feedback manager 735 may receive a downlink control information transmission from the base station, where the downlink control information schedules a first uplink transmission in which acknowledgment feedback for one or more of the first downlink transmission group or the second downlink transmission group is to be multiplexed with uplink data in the first uplink transmission. The feedback report manager 725 may determine, based on the configuration information for the group-based acknowledgment feedback and one or more downlink assignment indicator values, an acknowledgment feedback format for an acknowledgment feedback report associated with at least one of the first downlink transmission group or the second downlink transmission group and transmit the acknowledgment feedback report to the base station in the first uplink transmission.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

Figure 8:
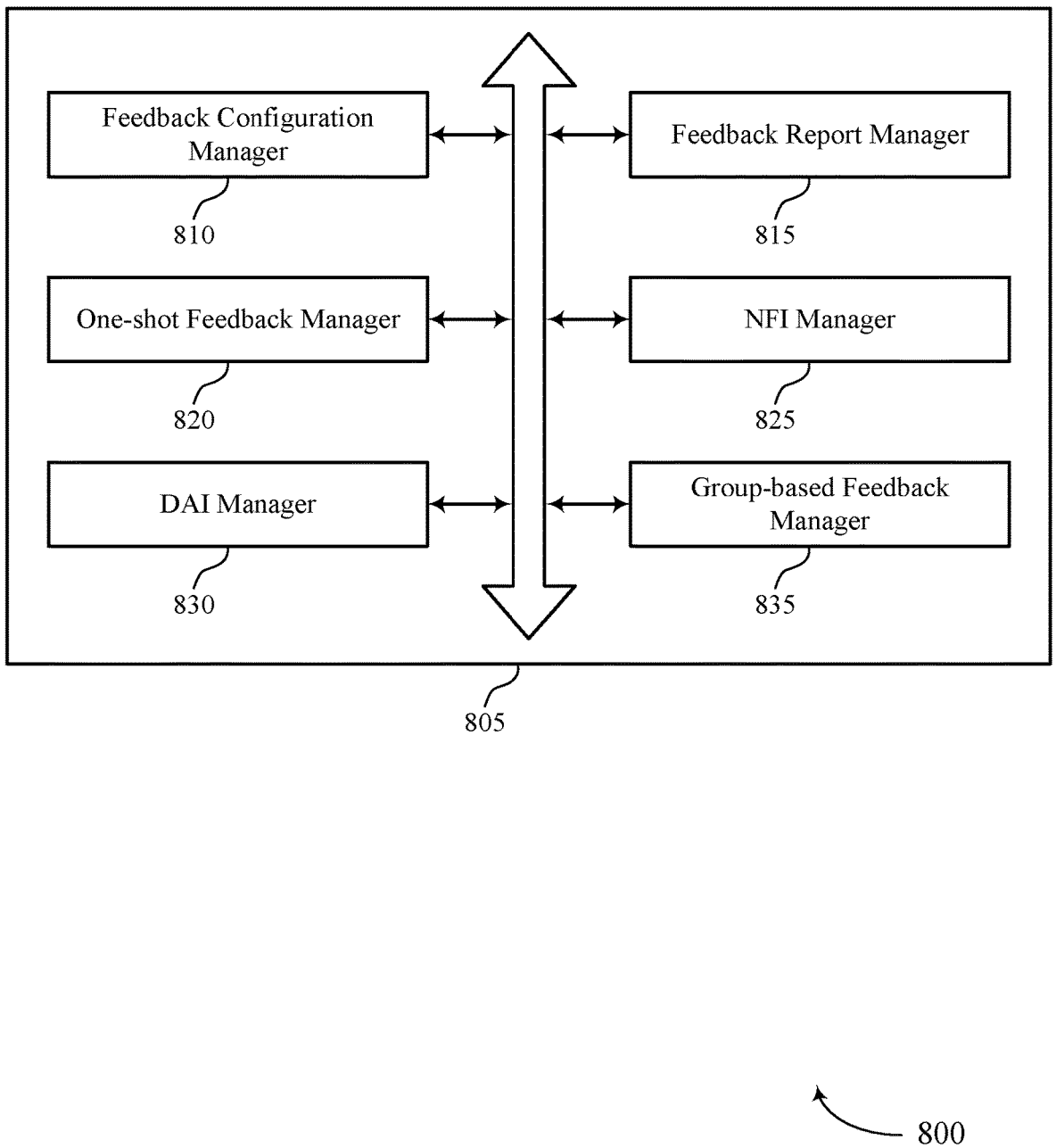
FIG. 8 shows a block diagram of a communications manager that supports acknowledgment feedback techniques in wireless communications in accordance with aspects of the present disclosure.

FIG. 8 shows a block diagram 800 of a communications manager 805 that supports acknowledgment feedback techniques in wireless communications in accordance with aspects of the present disclosure. The communications manager 805 may be an example of aspects of a communications manager 615, a communications manager 715, or a communications manager 910 described herein. The communications manager 805 may include a feedback configuration manager 810, a feedback report manager 815, an one-shot feedback manager 820, a NFI manager 825, a DAI manager 830, and a group-based feedback manager 835. Each of these components may communicate, directly or indirectly, with one another (e.g., via one or more buses).

The feedback configuration manager 810 may receive configuration information from a base station that configures group-based acknowledgment feedback type for at least two downlink transmission groups of at least two serving cells, and that configures a one-shot acknowledgment feedback type that provides feedback for each of a set of configured feedback processes at the UE upon request.

In some examples, the feedback configuration manager 810 may receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level.

In some examples, the feedback configuration manager 810 may receive, from a base station, configuration information for group-based acknowledgment feedback for at least a first downlink transmission group and a second downlink transmission group. In some cases, the configuration information further configures one or more of the downlink transmission groups with transport block level acknowledgment feedback or code block group level acknowledgment feedback. In some cases, a number of new acknowledgment feedback indicator (NFI) fields in the downlink control information is configured in RRC signaling.

The feedback report manager 815 may determine that a first acknowledgment feedback report for one or more of the at least two downlink transmission groups is to be provided in a first acknowledgment feedback occasion. In some examples, the feedback report manager 815 may transmit, responsive to the downlink control information transmission, a one-shot feedback report to the base station instead of the first acknowledgment feedback report in the first acknowledgment feedback occasion, where the one-shot feedback report includes acknowledgment feedback for each of the set of configured feedback processes for each of the configured downlink serving cells.

In some examples, the feedback report manager 815 may format the group-based acknowledgment feedback based on which of the first component carrier or the second component carrier provided the downlink control information transmission.

In some examples, the feedback report manager 815 may determine, based on the configuration information for the group-based acknowledgment feedback and one or more downlink assignment indicator values, an acknowledgment feedback format for an acknowledgment feedback report associated with at least one of the first downlink transmission group or the second downlink transmission group. In some examples, the feedback report manager 815 may transmit the acknowledgment feedback report to the base station in the first uplink transmission.

In some examples, the feedback report manager 815 may determine that the acknowledgment feedback report is to include acknowledgment feedback for both the first downlink transmission group and the second downlink transmission group, and that the configuration information further indicates that a single downlink assignment indicator value is provided in the downlink control information.

In some examples, the feedback report manager 815 may identify that the downlink control information is an error case. In some examples, the feedback report manager 815 may determine, based on identifying the error case, to refrain from multiplexing the acknowledgment feedback report in the first uplink transmission, refrain from transmitting the first uplink transmission entirely, or transmit the acknowledgment feedback report with preconfigured feedback information. In some examples, the feedback report manager 815 may format the acknowledgment feedback report with an acknowledgment feedback codebook associated with a fixed downlink transmission group associated with the single downlink assignment indicator. In some cases, the first downlink transmission group may include the fixed downlink transmission group.

In some examples, the feedback report manager 815 may determine that the acknowledgment feedback report is to include acknowledgment feedback for both the first downlink transmission group and the second downlink transmission group, and that the configuration information further indicates that a first downlink assignment indicator value for the first downlink transmission group and a second downlink assignment indicator value for the second downlink transmission group are provided in the downlink control information.

In some examples, the feedback report manager 815 may determine a first acknowledgment feedback codebook for the first downlink transmission group based on the first downlink assignment indicator value. In some cases, the first downlink assignment indicator value may be a total downlink assignment indicator value. In some examples, the feedback report manager 815 may determine a second acknowledgment feedback codebook for the second downlink transmission group based on the second downlink assignment indicator value.

In some examples, the feedback report manager 815 may determine that the downlink control information includes only a single NFI field. In some examples, the feedback report manager 815 may determine to apply the single NFI field to the first downlink transmission group or the second downlink transmission group based on which of the first downlink transmission group or the second downlink transmission group is scheduled to have acknowledgment feedback transmitted in the first uplink transmission.

The one-shot feedback manager 820 may receive a downlink control information transmission from the base station that indicates that the one-shot acknowledgement feedback is to be provided by the UE in the first acknowledgment feedback occasion. In some examples, the one-shot feedback report provides transport block level acknowledgment feedback irrespective of whether the associated downlink transmission group is configured for transport block level acknowledgment feedback or code block group level acknowledgment feedback.

The group-based feedback manager 835 may receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback.

In some examples, the group-based feedback manager 835 may receive a downlink control information transmission from the base station that schedules a first uplink transmission in which acknowledgment feedback for one or more of the first downlink transmission group or the second downlink transmission group is to be multiplexed with uplink data in the first uplink transmission. In some examples, the group-based feedback manager 835 may receive the downlink control information transmission from the base station on the second component carrier, where the downlink control information transmission indicates group-based acknowledgment feedback is to be provided for the first downlink transmission group, the second downlink transmission group, or both.

In some examples, the group-based feedback manager 835 may transmit a code block group level feedback report for the first downlink transmission group, the second downlink transmission group, or both, based on the downlink control information transmission being transmitted on the second component carrier associated with code block group level feedback. In some examples, the group-based feedback manager 835 may receive the downlink control information transmission from the base station on the first component carrier, where the downlink control information transmission indicates group-based acknowledgment feedback is to be provided for the first downlink transmission group, the second downlink transmission group, or both. In some examples, the group-based feedback manager 835 may transmit a transport block level feedback report for the first downlink transmission group, the second downlink transmission group, or both based on the downlink control information transmission being transmitted on the first component carrier associated with transport block level feedback.

In some cases, the downlink control information transmission includes a total downlink assignment indicator (tDAI) value and a new acknowledgment feedback indicator (NFI) for the first downlink transmission group, the second downlink transmission group, or both, and where the tDAI value and the NFI correspond to a code block group based acknowledgment feedback codebook for reporting acknowledgment feedback of the first downlink transmission group, the second downlink transmission group, or both.

The NFI manager 825 may set a new acknowledgment feedback indicator (NFI) to be toggled after transmitting the one-shot acknowledgment feedback report. In some examples, the NFI manager 825 may maintain a new acknowledgment feedback indicator (NFI) for each of the at least two serving cells as a prior value after transmitting the one-shot acknowledgment feedback report for comparison with a subsequent NFI indication for the associated downlink transmission group.

In some examples, the NFI manager 825 may identify one or more of a first new acknowledgment feedback indicator (NFI) value of the first downlink transmission group or a second NFI value of the second downlink transmission group in the downlink control information, where each of the first NFI value or the second NFI value indicates whether an associated downlink assignment indicator (DAI) counter is reset for the first downlink transmission group or the second downlink transmission group.

In some examples, the NFI manager 825 may determine that the first NFI value in the downlink control information transmission is different than a latest previously received first NFI value. In some examples, the NFI manager 825 may set one or more bits in the acknowledgment feedback report associated with the first downlink transmission group to indicate negative acknowledgment. In some examples, the NFI manager 825 may determine that the first NFI value in the downlink control information transmission is different than a latest previously received first NFI value and that the DAI counter has a predetermined value. In some examples, the NFI manager 825 may skip the first downlink transmission group when generating the acknowledgment feedback report.

In some examples, the NFI manager 825 may determine that the first NFI value in the downlink control information transmission is different than a latest previously received first NFI value and that the DAI counter has a different value than a predetermined value. In some examples, the NFI manager 825 may determine that the downlink control information includes a first NFI field and a second NFI field. In some examples, the NFI manager 825 may determine a payload and multiplexing parameters for the acknowledgment feedback report based at least on part of the first NFI field. In some examples, the NFI manager 825 may ignore the second NFI field. In some examples, the NFI manager 825 may generate a set of negative acknowledgments for the second downlink transmission group to be included in the acknowledgment feedback report, where a number of negative acknowledgments is determined based on the second NFI field and a downlink assignment indicator (DAI) counter value for the second downlink transmission group. In some examples, the NFI manager 825 may generate an acknowledgment feedback codebook for each downlink transmission group based on an associated NFI value for each downlink transmission group.

The DAI manager 830 may set a downlink assignment indicator (DAI) counter for each of the at least two serving cells to be an initial value based on the NFI being toggled. In some examples, the DAI manager 830 may determine which of the first downlink transmission group or the second downlink transmission group is scheduled to have acknowledgment feedback provided in the first uplink transmission, and where the downlink assignment indicator value is associated with the determined downlink transmission group.

In some examples, when the second downlink assignment indicator value has a value other than the predetermined value, one or more negative acknowledgment indications are provided in the acknowledgment feedback report to provide a report length that is based on the second downlink assignment indicator value. In some cases, the downlink assignment indicator value indicates a number of feedback acknowledgments to be reported in the acknowledgment feedback report, and the downlink control information includes a single downlink assignment indicator value that is associated with one of the first downlink transmission group or the second downlink transmission group. In some cases, the first downlink transmission group may include a group g and the second downlink transmission group may include a group (g+1)mod 2 where the downlink assignment indicator is associated with the group g and the first uplink transmission does not include HARQ-ACK information for the group (g+1)mod 2. In some cases, the downlink control information includes a first downlink assignment indicator value that is associated with the first downlink transmission group and a second downlink assignment indicator value that is associated with the second downlink transmission group, and where the first downlink assignment indicator value is used to determine a payload of the acknowledgment feedback report and multiplexing of the acknowledgment feedback report with the first uplink transmission. In some cases, a predetermined value of the second downlink assignment indicator value indicates that acknowledgment feedback information of the second downlink transmission group is not to be included in the acknowledgment feedback report. In some cases, the predetermined value of the second downlink assignment indicator is four.

Figure 9:
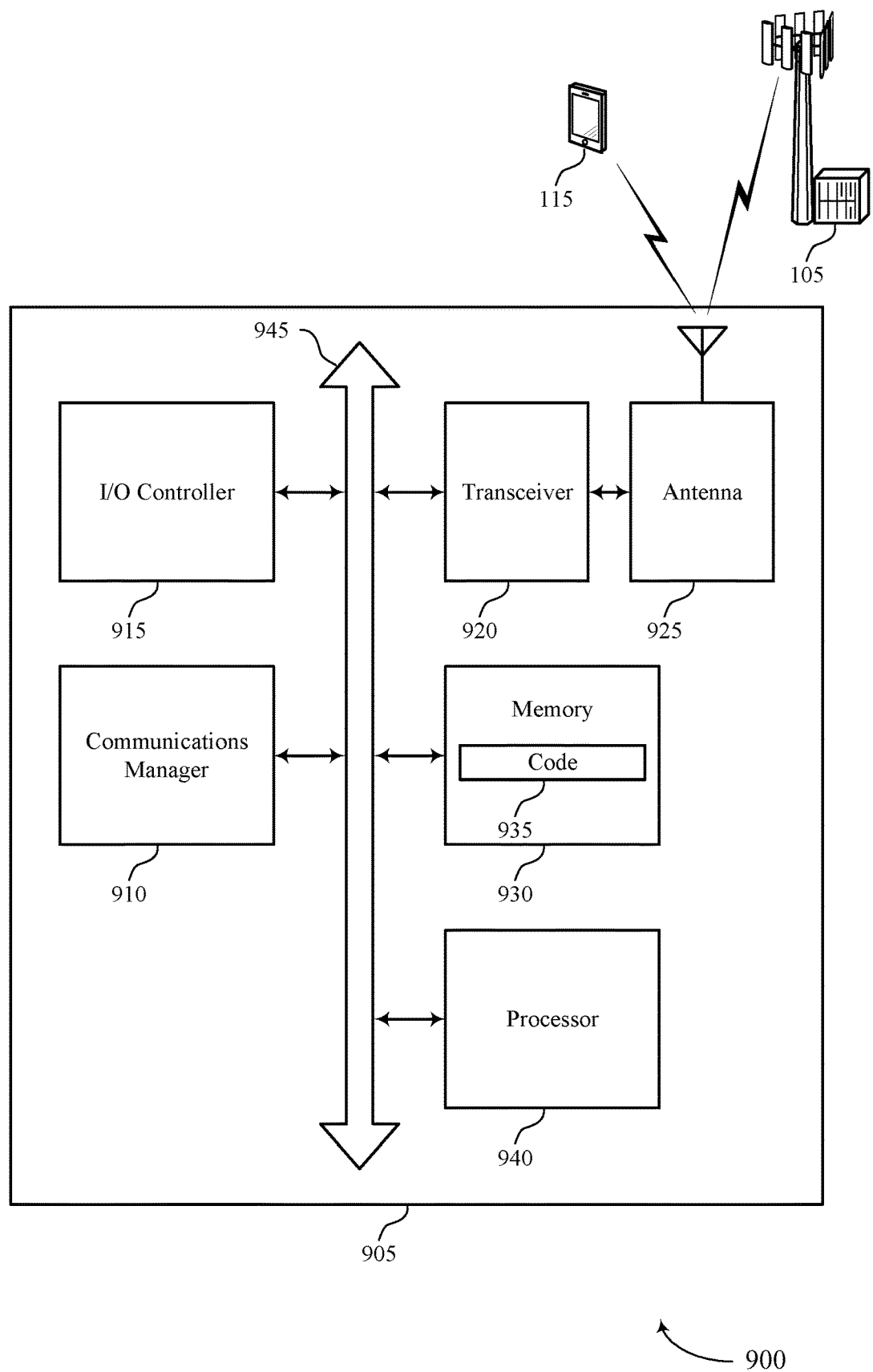
FIG. 9 shows a diagram of a system including a device that supports acknowledgment feedback techniques in wireless communications in accordance with aspects of the present disclosure.

FIG. 9 shows a diagram of a system 900 including a device 905 that supports acknowledgment feedback techniques in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive configuration information from a base station that configures group-based acknowledgment feedback type for at least two downlink transmission groups of at least two serving cells, and that configures a one-shot acknowledgment feedback type that provides feedback for each of a set of configured feedback processes at the UE upon request, determine that a first acknowledgment feedback report for one or more of the at least two downlink transmission groups is to be provided in a first acknowledgment feedback occasion, transmit, responsive to the downlink control information transmission, a one-shot feedback report to the base station instead of the first acknowledgment feedback report in the first acknowledgment feedback occasion, where the one-shot feedback report includes acknowledgment feedback for each of the set of configured feedback processes for each of the configured downlink serving cells, and receive a downlink control information transmission from the base station that indicates that the one-shot acknowledgement feedback is to be provided by the UE in the first acknowledgment feedback occasion.

The communications manager 910 may also receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level, receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback, format the group-based acknowledgment feedback based on which of the first component carrier or the second component carrier provided the downlink control information transmission, and transmit the group-based acknowledgment feedback report to the base station.

The communications manager 910 may also receive, from a base station, configuration information for group-based acknowledgment feedback for at least a first downlink transmission group and a second downlink transmission group, receive a downlink control information transmission from the base station that schedules a first uplink transmission in which acknowledgment feedback for one or more of the first downlink transmission group or the second downlink transmission group is to be multiplexed with uplink data in the first uplink transmission, determine, based on the configuration information for the group-based acknowledgment feedback and one or more of a downlink assignment indicator value or a new acknowledgment feedback indicator provided in the downlink control information, an acknowledgment feedback format for an acknowledgment feedback report associated with at least one of the first downlink transmission group or the second downlink transmission group, and transmit the acknowledgment feedback report to the base station in the first uplink transmission.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting acknowledgment feedback techniques in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
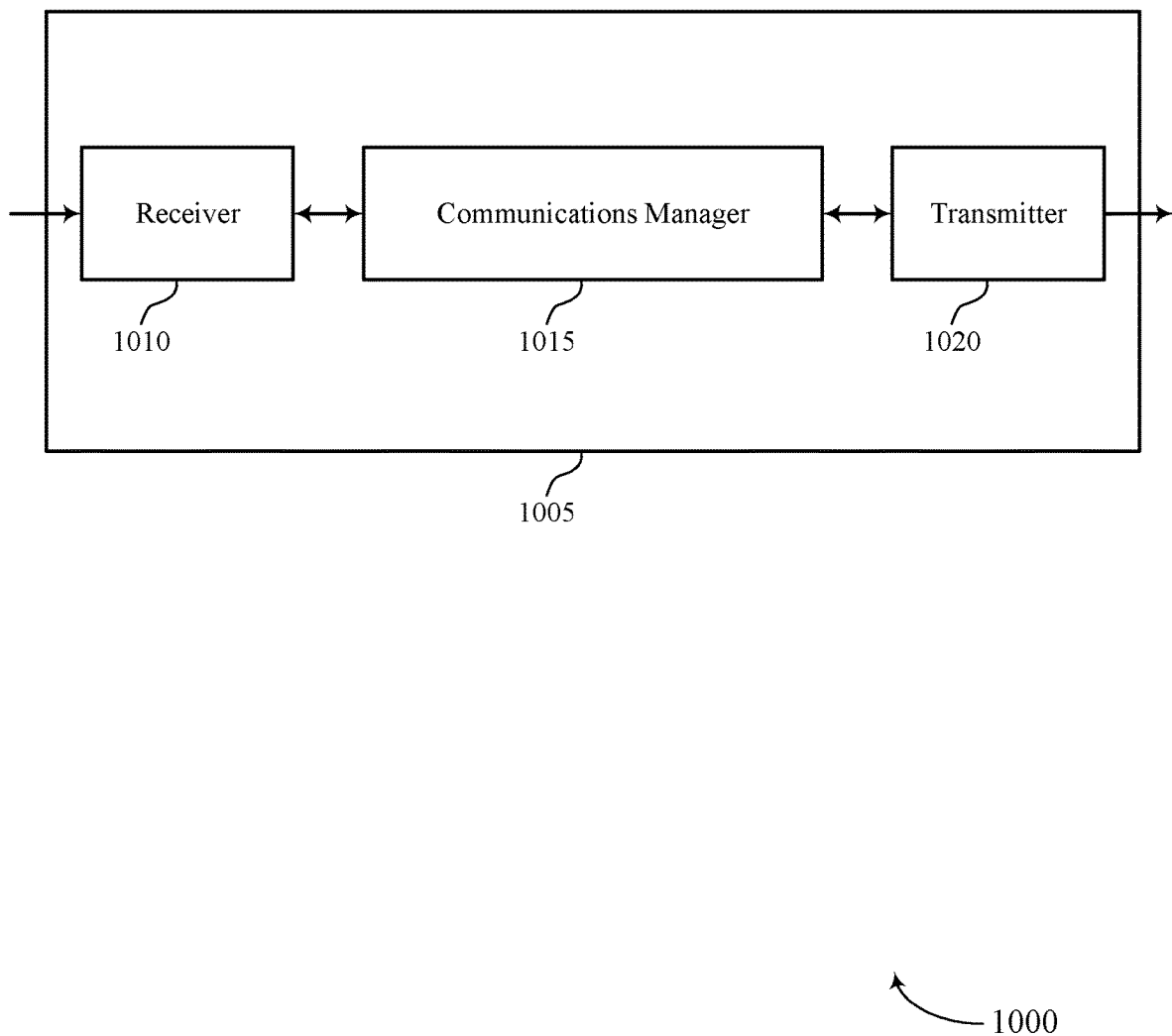
FIGS. 10 and 11 show block diagrams of devices that support acknowledgment feedback techniques in wireless communications in accordance with aspects of the present disclosure.

FIG. 10 shows a block diagram 1000 of a device 1005 that supports acknowledgment feedback techniques in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgment feedback techniques in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit configuration information to a UE that configures group-based acknowledgment feedback type for at least two downlink transmission groups of at least two serving cells, and that configures one-shot acknowledgment feedback type for providing feedback for each of a set of configured feedback processes at the UE upon request, transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups, and receive from the UE, responsive to the downlink control information transmission, a one-shot feedback report instead of the first acknowledgment feedback report in the first acknowledgment feedback occasion, where the one-shot feedback report includes acknowledgment feedback for each of the set of configured feedback processes for each of the serving cells.

The communications manager 1015 may also transmit, to a UE, configuration information for group-based acknowledgment feedback for at least a first downlink transmission group and a second downlink transmission group on at least two component carriers, transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback, and receive, from the UE, the group-based acknowledgment feedback report based on which of the first component carrier or the second component carrier provided the downlink control information transmission.

The communications manager 1015 may also transmit, to a UE, configuration information for group-based acknowledgment feedback for at least a first downlink transmission group and a second downlink transmission group, transmit a downlink control information transmission to the UE that schedules a first uplink transmission in which acknowledgment feedback for one or more of the first downlink transmission group or the second downlink transmission group is to be multiplexed with uplink data in the first uplink transmission, and receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
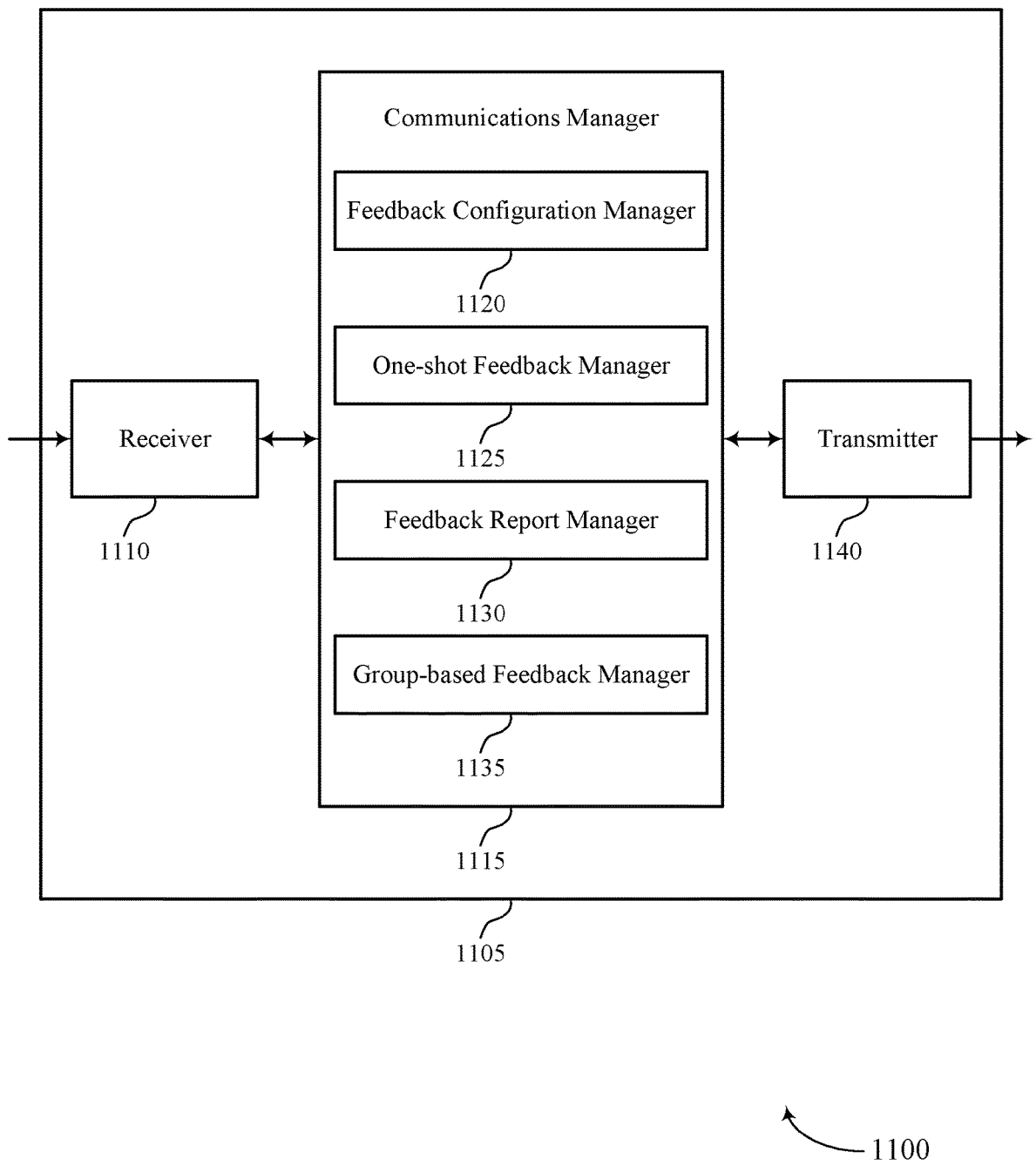

FIG. 11 shows a block diagram 1100 of a device 1105 that supports acknowledgment feedback techniques in wireless communications in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to acknowledgment feedback techniques in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a feedback configuration manager 1120, an one-shot feedback manager 1125, a feedback report manager 1130, and a group-based feedback manager 1135. The communications manager 1115 may be an example of aspects of the communications manager 1310 described herein.

In some cases, the feedback configuration manager 1120 may transmit configuration information to a UE that configures group-based acknowledgment feedback type for at least two downlink transmission groups of at least two serving cells, and that configures one-shot acknowledgment feedback type for providing feedback for each of a set of configured feedback processes at the UE upon request. The one-shot feedback manager 1125 may transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups. The feedback report manager 1130 may receive from the UE, responsive to the downlink control information transmission, a one-shot feedback report instead of the first acknowledgment feedback report in the first acknowledgment feedback occasion, where the one-shot feedback report includes acknowledgment feedback for each of the set of configured feedback processes for each of the serving cells.

In some cases, the feedback configuration manager 1120 may transmit, to a UE, configuration information for group-based acknowledgment feedback for at least a first downlink transmission group and a second downlink transmission group on at least two component carriers. The group-based feedback manager 1135 may transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback. The feedback report manager 1130 may receive, from the UE, the group-based acknowledgment feedback report based on which of the first component carrier or the second component carrier provided the downlink control information transmission.

In some cases, the feedback configuration manager 1120 may transmit, to a UE, configuration information for group-based acknowledgment feedback for at least a first downlink transmission group and a second downlink transmission group. The group-based feedback manager 1135 may transmit a downlink control information transmission to the UE that schedules a first uplink transmission in which acknowledgment feedback for one or more of the first downlink transmission group or the second downlink transmission group is to be multiplexed with uplink data in the first uplink transmission. The feedback report manager 1130 may receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

The transmitter 1140 may transmit signals generated by other components of the device 1105. In some examples, the transmitter 1140 may be collocated with a receiver 1110 in a transceiver component. For example, the transmitter 1140 may be an example of aspects of the transceiver 1320 described with reference to FIG. 13. The transmitter 1140 may utilize a single antenna or a set of antennas.

Figure 12:
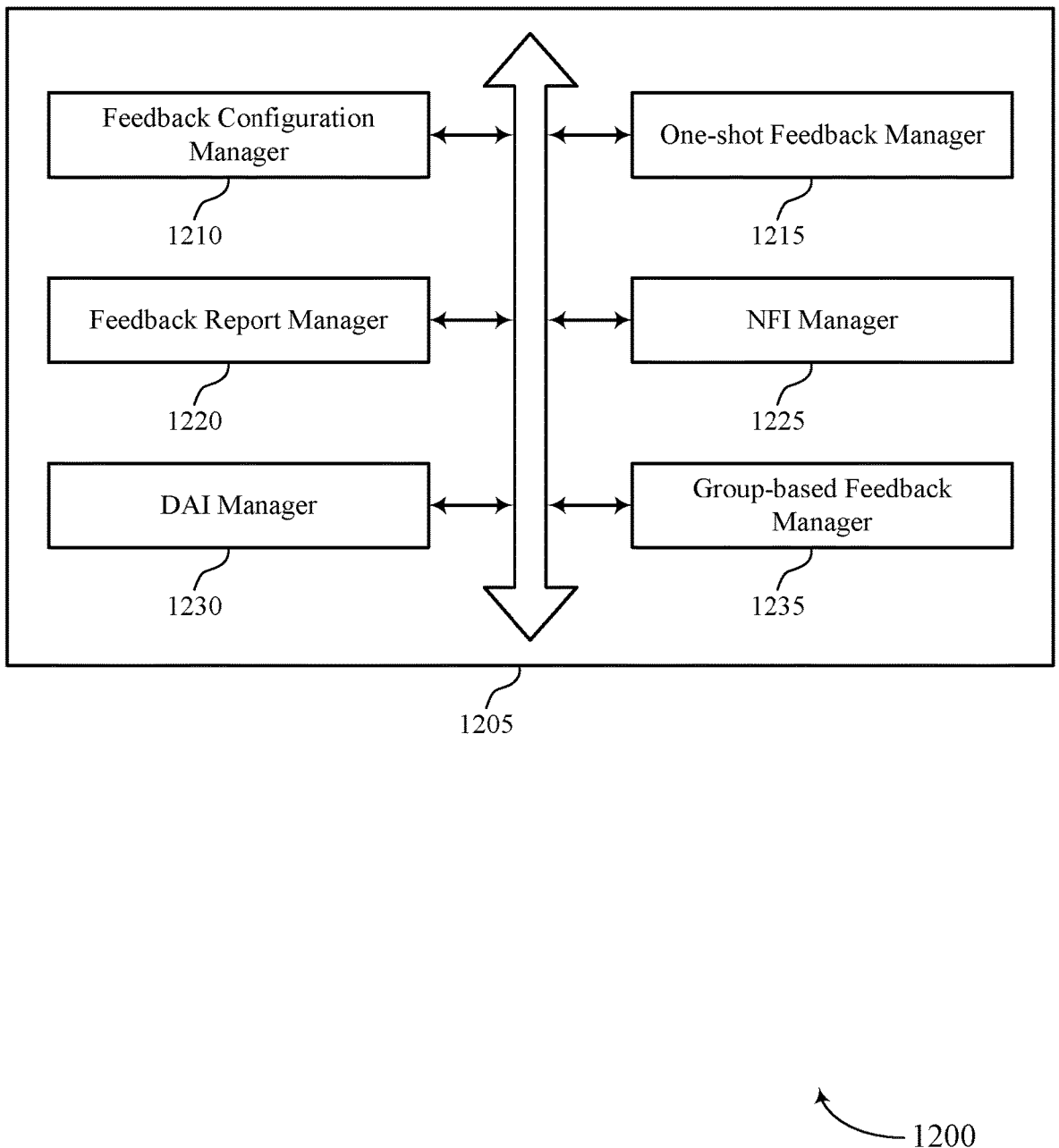
FIG. 12 shows a block diagram of a communications manager that supports acknowledgment feedback techniques in wireless communications in accordance with aspects of the present disclosure.

FIG. 12 shows a block diagram 1200 of a communications manager 1205 that supports acknowledgment feedback techniques in wireless communications in accordance with aspects of the present disclosure. The communications manager 1205 may be an example of aspects of a communications manager 1015, a communications manager 1115, or a communications manager 1310 described herein. The communications manager 1205 may include a feedback configuration manager 1210, an one-shot feedback manager 1215, a feedback report manager 1220, a NFI manager 1225, a DAT manager 1230, and a group-based feedback manager 1235. Each of these components may communicate, directly or indirectly, with one another (e.g., via one or more buses).

The feedback configuration manager 1210 may transmit configuration information to a UE that configures group-based acknowledgment feedback type for at least two downlink transmission groups of at least two serving cells, and that configures one-shot acknowledgment feedback type for providing feedback for each of a set of configured feedback processes at the UE upon request. In some examples, the feedback configuration manager 1210 may transmit, to a UE, configuration information for group-based acknowledgment feedback for at least a first downlink transmission group and a second downlink transmission group on at least two component carriers. In some examples, the feedback configuration manager 1210 may transmit, to a UE, configuration information for group-based acknowledgment feedback for at least a first downlink transmission group and a second downlink transmission group.

In some examples, the one-shot feedback report provides transport block level acknowledgment feedback irrespective of whether the associated downlink transmission group is configured for transport block level acknowledgment feedback or code block group level acknowledgment feedback. In some cases, the configuration information further configures one or more of the downlink transmission groups with transport block level acknowledgment feedback or code block group level acknowledgment feedback.

The one-shot feedback manager 1215 may transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups. In some cases, the first acknowledgment feedback report is preempted by the one-shot feedback report.

The feedback report manager 1220 may receive from the UE, responsive to the downlink control information transmission, a one-shot feedback report instead of the first acknowledgment feedback report in the first acknowledgment feedback occasion, where the one-shot feedback report includes acknowledgment feedback for each of the set of configured feedback processes for each of the serving cells.

In some examples, the feedback report manager 1220 may receive, from the UE, the group-based acknowledgment feedback report based on which of the first component carrier or the second component carrier provided the downlink control information transmission. In some examples, the feedback report manager 1220 may receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

In some cases, a set of negative acknowledgments for the second downlink transmission group is included in the acknowledgment feedback report, and where a number of negative acknowledgments is based on the second NFI field and a downlink assignment indicator (DAD counter value for the second downlink transmission group. In some cases, an acknowledgment feedback codebook for each downlink transmission group is based on an associated NFI value for each downlink transmission group.

The group-based feedback manager 1235 may transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback. In some examples, the group-based feedback manager 1235 may transmit a downlink control information transmission to the UE that schedules a first uplink transmission in which acknowledgment feedback for one or more of the first downlink transmission group or the second downlink transmission group is to be multiplexed with uplink data in the first uplink transmission. In some examples, the group-based feedback manager 1235 may transmit the downlink control information on the second component carrier, where the downlink control information indicates group-based acknowledgment feedback is to be provided for the first downlink transmission group, the second downlink transmission group, or both.

In some examples, the group-based feedback manager 1235 may receive a code block group level feedback report for the first downlink transmission group, the second downlink transmission group, or both, based on the downlink control information transmission being transmitted on the second component carrier associated with code block group level feedback. In some examples, the group-based feedback manager 1235 may transmit the downlink control information on the first component carrier, where the downlink control information transmission indicates group-based acknowledgment feedback is to be provided for the first downlink transmission group, the second downlink transmission group, or both. In some examples, the group-based feedback manager 1235 may receive a transport block level feedback report for the first downlink transmission group, the second downlink transmission group, or both, based on the downlink control information transmission being transmitted on the first component carrier associated with transport block level feedback.

In some cases, the downlink control information transmission includes a total downlink assignment indicator (tDAI) value and a new acknowledgment feedback indicator (NFI) for the first downlink transmission group, the second downlink transmission group, or both, and where the tDAI value and the NFI correspond to a code block group based acknowledgment feedback codebook for reporting acknowledgment feedback of the first downlink transmission group, the second downlink transmission group, or both.

In some cases, the acknowledgment feedback report is to include acknowledgment feedback for both the first downlink transmission group and the second downlink transmission group, and the configuration information further indicates that a first downlink assignment indicator value for the first downlink transmission group and a second downlink assignment indicator value for the second downlink transmission group are provided in the downlink control information. In some cases, a first acknowledgment feedback codebook for the first downlink transmission group based on the first downlink assignment indicator value. In some cases, a second acknowledgment feedback codebook for the second downlink transmission group based on the second downlink assignment indicator value.

The NFI manager 1225 may set a new acknowledgment feedback indicator (NFI) to be toggled after transmitting the one-shot acknowledgment feedback report. In some examples, the NFI manager 1225 may transmit one or more of a first new acknowledgment feedback indicator (NFI) value of the first downlink transmission group or a second NFI value of the second downlink transmission group in the downlink control information, where each of the first NFI value or the second NFI value indicates whether an associated downlink assignment indicator (DAI) counter is reset for the first downlink transmission group or the second downlink transmission group. In some examples, the NFI manager 1225 may determine that the UE missed a downlink assignment based on each bit in the acknowledgment feedback report associated with the first downlink transmission group indicating negative acknowledgment.

In some cases, the first NFI value in the downlink control information transmission is set to a predetermined value when acknowledgment feedback for the first downlink transmission group is to be skipped when generating the acknowledgment feedback report.

In some cases, a number of new acknowledgment feedback indicator (NFI) fields in the downlink control information is configured in RRC signaling. In some cases, the downlink control information includes only a single NFI field, and the single NFI field is applied to the first downlink transmission group or the second downlink transmission group based on which of the first downlink transmission group or the second downlink transmission group is scheduled to have acknowledgment feedback transmitted in the first uplink transmission. In some cases, the downlink control information includes a first NFI field and a second NFI field, and a payload and multiplexing parameters for the acknowledgment feedback report are based at least on part of the first NFI field. In some cases, the second NFI field is ignored by the UE when generating the acknowledgment feedback report.

The DAI manager 1230 may set a downlink assignment indicator (DAI) counter for each of the at least two serving cells to be an initial value based on the NFI being toggled. In some examples, the DAI manager 1230 may determine which of the first downlink transmission group or the second downlink transmission group is scheduled to have acknowledgment feedback provided in the first uplink transmission, and where the downlink assignment indicator value is associated with the determined downlink transmission group. In some examples, when the second downlink assignment indicator value has a value other than the predetermined value, one or more negative acknowledgment indications are provided in the acknowledgment feedback report to provide a report length that is based on the second downlink assignment indicator value.

In some cases, the downlink assignment indicator value in the downlink control information indicates a number of feedback acknowledgments to be reported in the acknowledgment feedback report, and where the downlink control information includes a single downlink assignment indicator value that is associated with one of the first downlink transmission group or the second downlink transmission group. In some cases, the downlink control information includes a first downlink assignment indicator value that is associated with the first downlink transmission group and a second downlink assignment indicator value that is associated with the second downlink transmission group, and where the first downlink assignment indicator value is used to determine a payload of the acknowledgment feedback report and multiplexing of the acknowledgment feedback report with the first uplink transmission. In some cases, a predetermined value of the second downlink assignment indicator value indicates that acknowledgment feedback information of the second downlink transmission group is not to be included in the acknowledgment feedback report.

Figure 13:
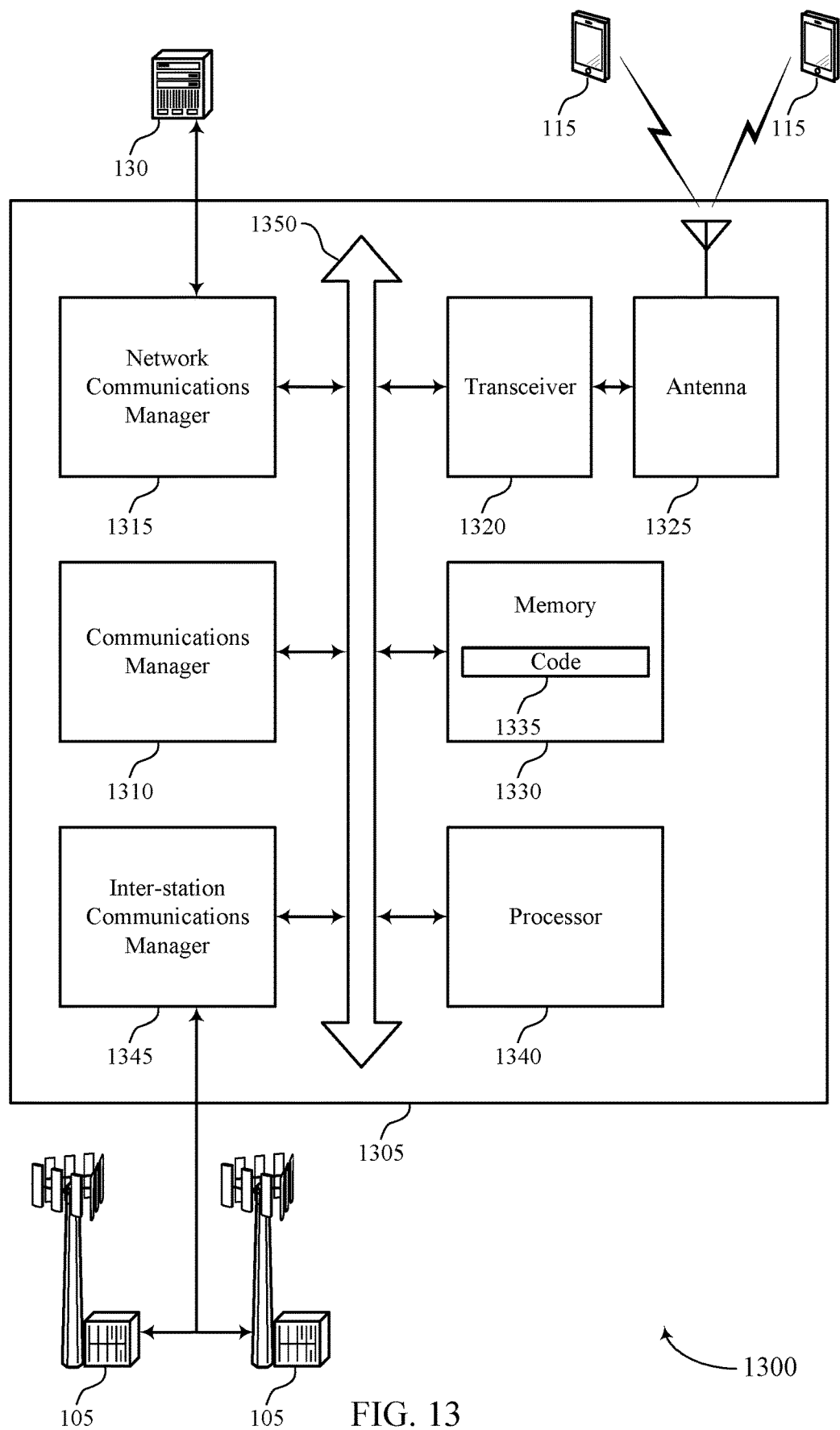
FIG. 13 shows a diagram of a system including a device that supports acknowledgment feedback techniques in wireless communications in accordance with aspects of the present disclosure.

FIG. 13 shows a diagram of a system 1300 including a device 1305 that supports acknowledgment feedback techniques in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit configuration information to a UE that configures group-based acknowledgment feedback type for at least two downlink transmission groups of at least two serving cells, and that configures one-shot acknowledgment feedback type for providing feedback for each of a set of configured feedback processes at the UE upon request, transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups, and receive from the UE, responsive to the downlink control information transmission, a one-shot feedback report instead of the first acknowledgment feedback report in the first acknowledgment feedback occasion, where the one-shot feedback report includes acknowledgment feedback for each of the set of configured feedback processes for each of the serving cells.

The communications manager 1310 may also transmit, to a UE, configuration information for group-based acknowledgment feedback for at least a first downlink transmission group and a second downlink transmission group on at least two component carriers, transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback, and receive, from the UE, the group-based acknowledgment feedback report based on which of the first component carrier or the second component carrier provided the downlink control information transmission.

The communications manager 1310 may also transmit, to a UE, configuration information for group-based acknowledgment feedback for at least a first downlink transmission group and a second downlink transmission group, transmit a downlink control information transmission to the UE that schedules a first uplink transmission in which acknowledgment feedback for one or more of the first downlink transmission group or the second downlink transmission group is to be multiplexed with uplink data in the first uplink transmission, and receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting acknowledgment feedback techniques in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
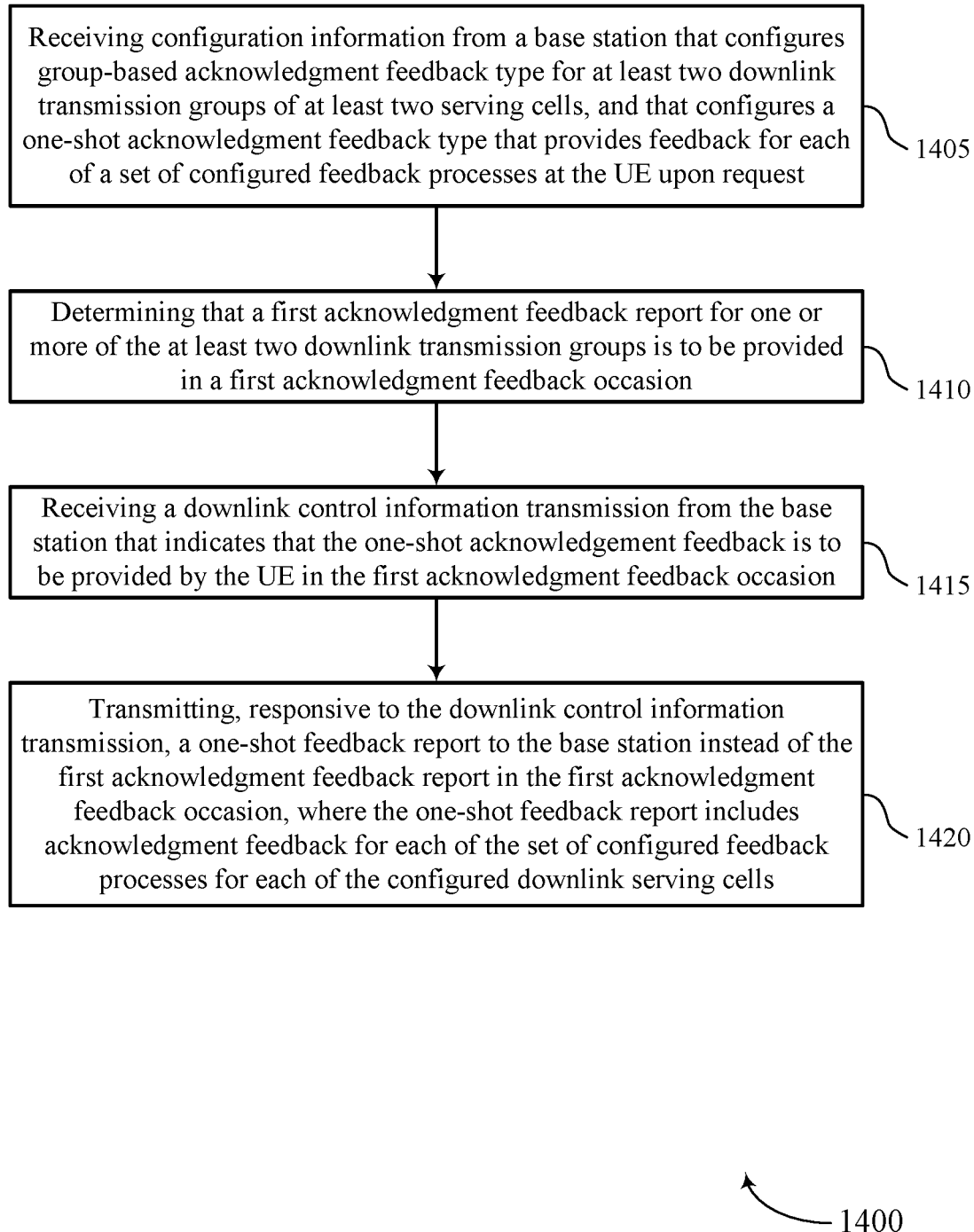
FIGS. 14 through 22 show flowcharts illustrating methods that support acknowledgment feedback techniques in wireless communications in accordance with aspects of the present disclosure.

FIG. 14 shows a flowchart illustrating a method 1400 that supports acknowledgment feedback techniques in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive configuration information from a base station that configures group-based acknowledgment feedback type for at least two downlink transmission groups of at least two serving cells, and that configures a one-shot acknowledgment feedback type that provides feedback for each of a set of configured feedback processes at the UE upon request. The operations of 1405 may be performed according to the methods described herein. In some examples, aspects of the operations of 1405 may be performed by a feedback configuration manager as described with reference to FIGS. 6 through 9.

At 1410, the UE may determine that a first acknowledgment feedback report for one or more of the at least two downlink transmission groups is to be provided in a first acknowledgment feedback occasion. The operations of 1410 may be performed according to the methods described herein. In some examples, aspects of the operations of 1410 may be performed by a feedback report manager as described with reference to FIGS. 6 through 9.

At 1415, the UE may receive a downlink control information transmission from the base station that indicates that the one-shot acknowledgement feedback is to be provided by the UE in the first acknowledgment feedback occasion. The operations of 1415 may be performed according to the methods described herein. In some examples, aspects of the operations of 1415 may be performed by an one-shot feedback manager as described with reference to FIGS. 6 through 9.

At 1420, the UE may transmit, responsive to the downlink control information transmission, a one-shot feedback report to the base station instead of the first acknowledgment feedback report in the first acknowledgment feedback occasion, where the one-shot feedback report includes acknowledgment feedback for each of the set of configured feedback processes for each of the configured downlink serving cells. The operations of 1420 may be performed according to the methods described herein. In some examples, aspects of the operations of 1420 may be performed by a feedback report manager as described with reference to FIGS. 6 through 9.

Figure 15:
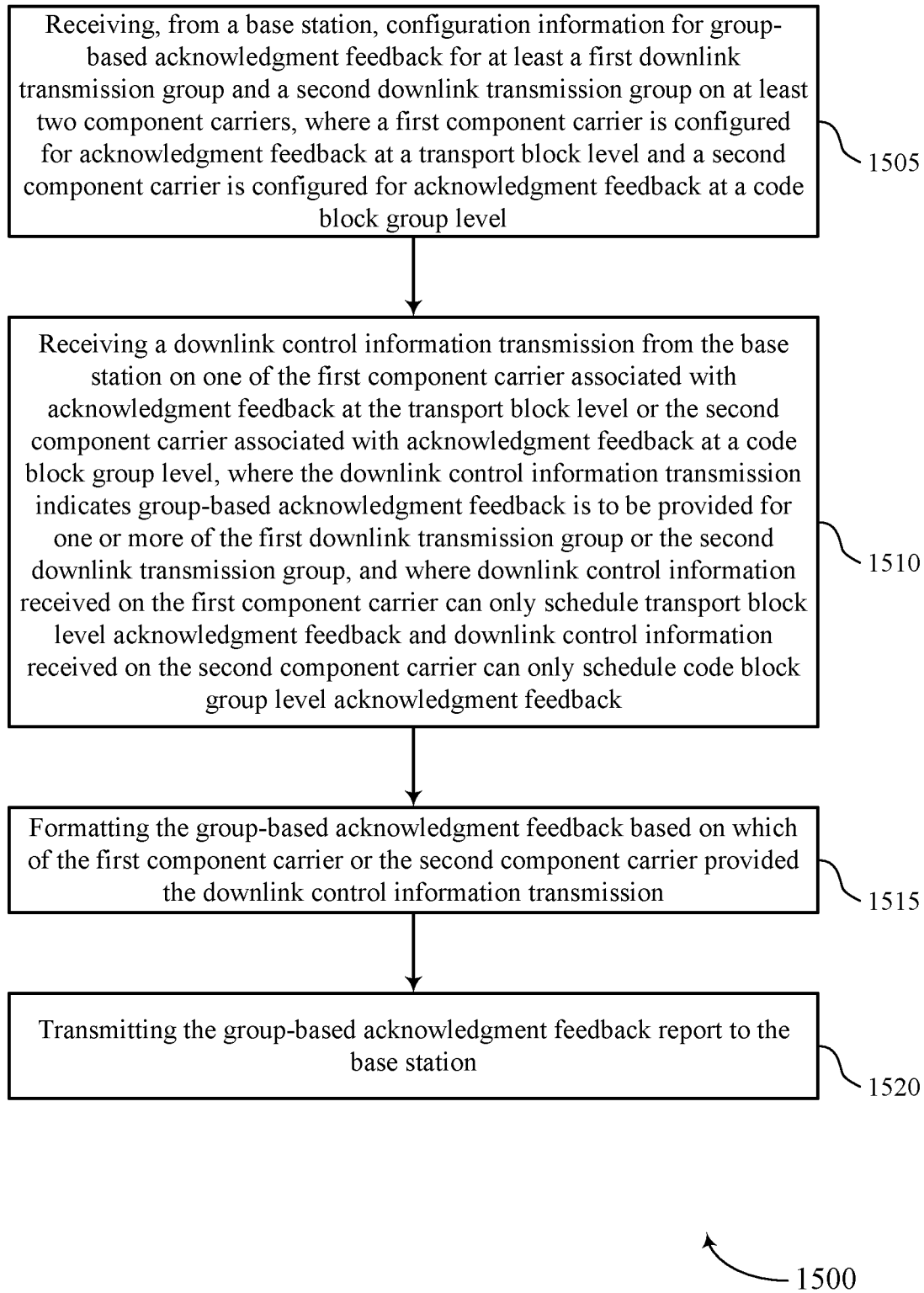

FIG. 15 shows a flowchart illustrating a method 1500 that supports acknowledgment feedback techniques in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, configuration information for group-based acknowledgment feedback for at least a first downlink transmission group and a second downlink transmission group on at least two component carriers, where a first component carrier is configured for acknowledgment feedback at a transport block level and a second component carrier is configured for acknowledgment feedback at a code block group level. The operations of 1505 may be performed according to the methods described herein. In some examples, aspects of the operations of 1505 may be performed by a feedback configuration manager as described with reference to FIGS. 6 through 9.

At 1510, the UE may receive a downlink control information transmission from the base station on one of the first component carrier associated with acknowledgment feedback at the transport block level or the second component carrier associated with acknowledgment feedback at a code block group level, where the downlink control information transmission indicates group-based acknowledgment feedback is to be provided for one or more of the first downlink transmission group or the second downlink transmission group, and where downlink control information received on the first component carrier can only schedule transport block level acknowledgment feedback and downlink control information received on the second component carrier can only schedule code block group level acknowledgment feedback. The operations of 1510 may be performed according to the methods described herein. In some examples, aspects of the operations of 1510 may be performed by a group-based feedback manager as described with reference to FIGS. 6 through 9.

At 1515, the UE may format the group-based acknowledgment feedback based on which of the first component carrier or the second component carrier provided the downlink control information transmission. The operations of 1515 may be performed according to the methods described herein. In some examples, aspects of the operations of 1515 may be performed by a feedback report manager as described with reference to FIGS. 6 through 9.

At 1520, the UE may transmit the group-based acknowledgment feedback report to the base station. The operations of 1520 may be performed according to the methods described herein. In some examples, aspects of the operations of 1520 may be performed by a feedback report manager as described with reference to FIGS. 6 through 9.

Figure 16:
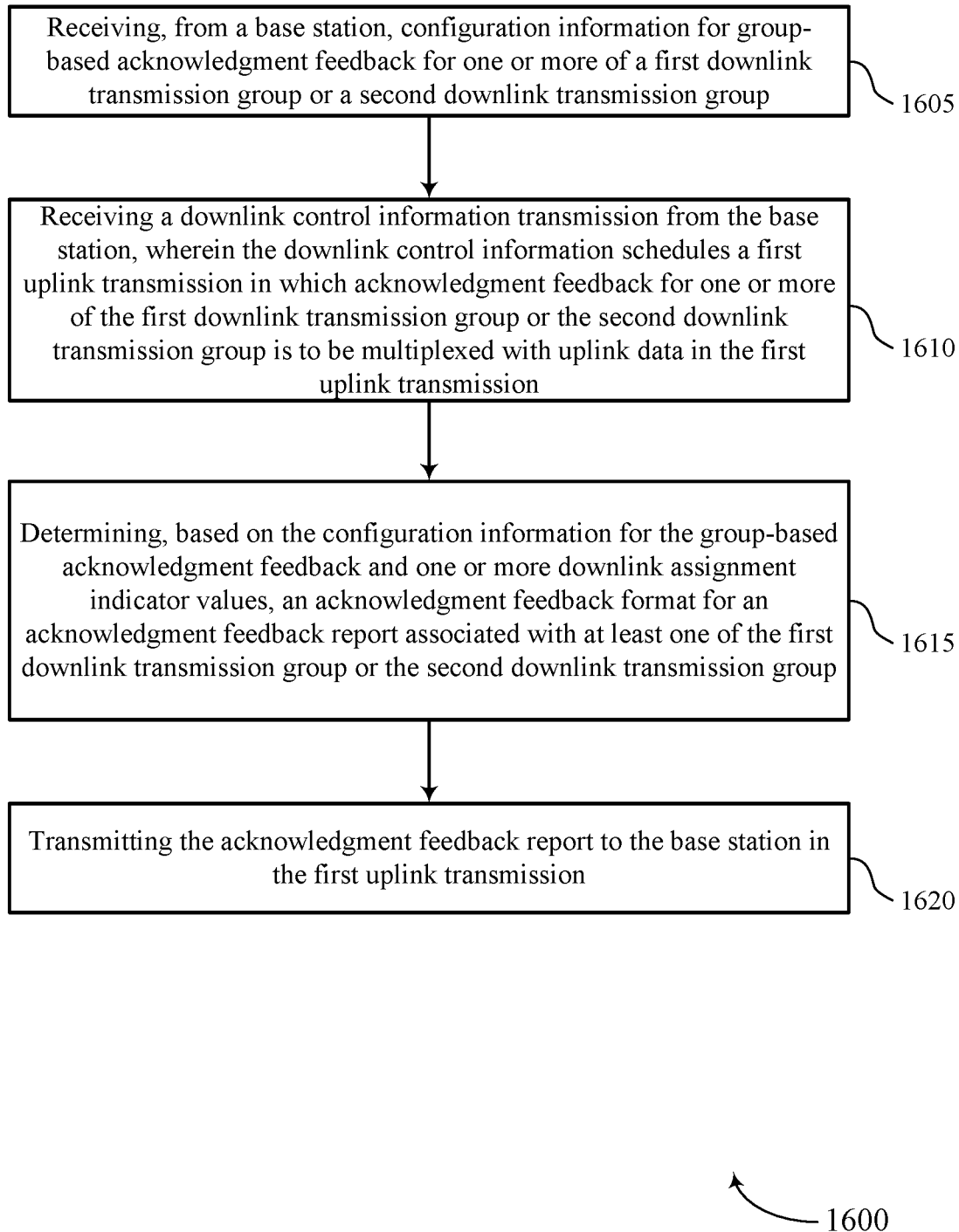

FIG. 16 shows a flowchart illustrating a method 1600 that supports acknowledgment feedback techniques in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information for group-based acknowledgment feedback for one or more of a first downlink transmission group or a second downlink transmission group. The operations of 1605 may be performed according to the methods described herein. In some examples, aspects of the operations of 1605 may be performed by a feedback configuration manager as described with reference to FIGS. 6 through 9.

At 1610, the UE may receive a downlink control information transmission from the base station, where the downlink control information schedules a first uplink transmission in which acknowledgment feedback for one or more of the first downlink transmission group or the second downlink transmission group is to be multiplexed with uplink data in the first uplink transmission. The operations of 1610 may be performed according to the methods described herein. In some examples, aspects of the operations of 1610 may be performed by a group-based feedback manager as described with reference to FIGS. 6 through 9.

At 1615, the UE may determine, based on the configuration information for the group-based acknowledgment feedback and one or more downlink assignment indicator values, an acknowledgment feedback format for an acknowledgment feedback report associated with at least one of the first downlink transmission group or the second downlink transmission group. The operations of 1615 may be performed according to the methods described herein. In some examples, aspects of the operations of 1615 may be performed by a feedback report manager as described with reference to FIGS. 6 through 9.

At 1620, the UE may transmit the acknowledgment feedback report to the base station in the first uplink transmission. The operations of 1620 may be performed according to the methods described herein. In some examples, aspects of the operations of 1620 may be performed by a feedback report manager as described with reference to FIGS. 6 through 9.

Figure 17:
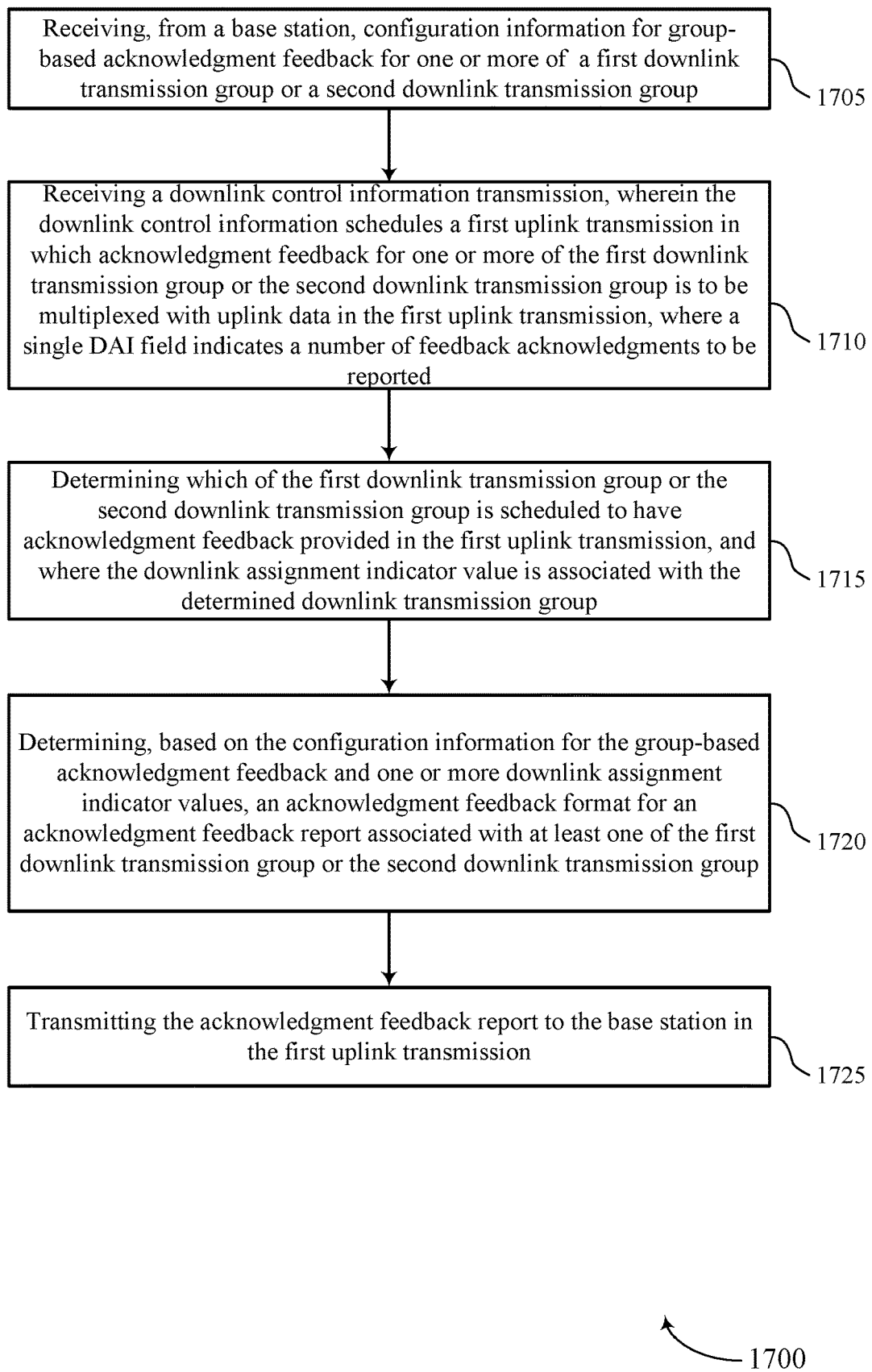

FIG. 17 shows a flowchart illustrating a method 1700 that supports acknowledgment feedback techniques in wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, configuration information for group-based acknowledgment feedback for one or more of a first downlink transmission group or a second downlink transmission group. The operations of 1705 may be performed according to the methods described herein. In some examples, aspects of the operations of 1705 may be performed by a feedback configuration manager as described with reference to FIGS. 6 through 9.

At 1710, the UE may receive a downlink control information transmission, where the downlink control information schedules a first uplink transmission in which acknowledgment feedback for one or more of the first downlink transmission group or the second downlink transmission group is to be multiplexed with uplink data in the first uplink transmission, where a single DAI field indicates a number of feedback acknowledgments to be reported. The operations of 1710 may be performed according to the methods described herein. In some examples, aspects of the operations of 1710 may be performed by a group-based feedback manager as described with reference to FIGS. 6 through 9.

At 1715, the UE may determine which of the first downlink transmission group or the second downlink transmission group is scheduled to have acknowledgment feedback provided in the first uplink transmission, and where the downlink assignment indicator value is associated with the determined downlink transmission group. The operations of 1715 may be performed according to the methods described herein. In some examples, aspects of the operations of 1715 may be performed by a DAI manager as described with reference to FIGS. 6 through 9.

At 1720, the UE may determine, based on the configuration information for the group-based acknowledgment feedback and one or more of the downlink assignment indicator value or a new acknowledgment feedback indicator provided in the downlink control information, an acknowledgment feedback format for an acknowledgment feedback report associated with at least one of the first downlink transmission group or the second downlink transmission group. The operations of 1720 may be performed according to the methods described herein. In some examples, aspects of the operations of 1720 may be performed by a feedback report manager as described with reference to FIGS. 6 through 9.

At 1725, the UE may transmit the acknowledgment feedback report to the base station in the first uplink transmission. The operations of 1725 may be performed according to the methods described herein. In some examples, aspects of the operations of 1725 may be performed by a feedback report manager as described with reference to FIGS. 6 through 9.

Figure 18:
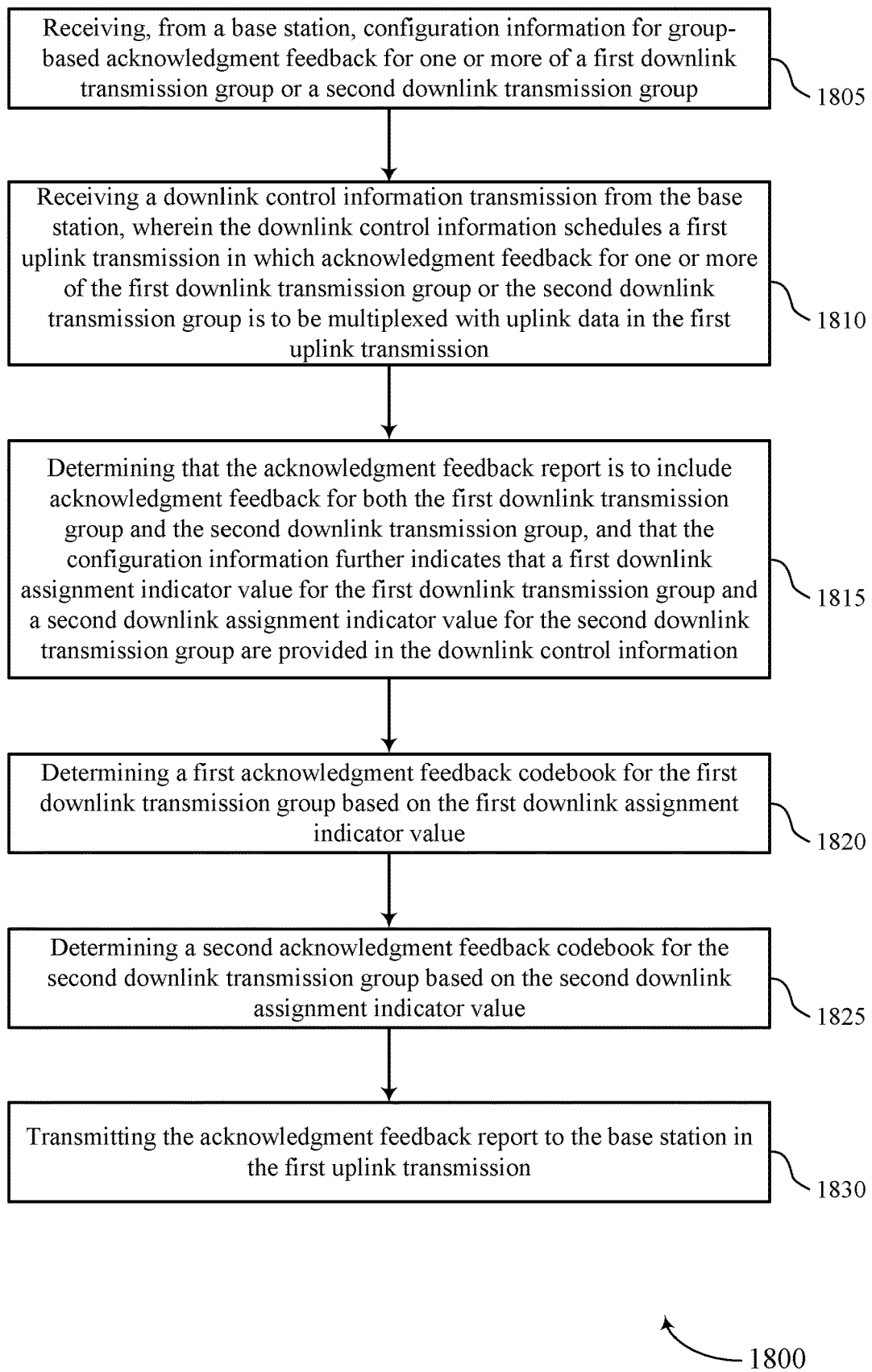

FIG. 18 shows a flowchart illustrating a method 1800 that supports acknowledgment feedback techniques in wireless communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, configuration information for group-based acknowledgment feedback for one or more of a first downlink transmission group and a second downlink transmission group. The operations of 1805 may be performed according to the methods described herein. In some examples, aspects of the operations of 1805 may be performed by a feedback configuration manager as described with reference to FIGS. 6 through 9.

At 1810, the UE may receive a downlink control information transmission from the base station that schedules a first uplink transmission in which acknowledgment feedback for one or more of the first downlink transmission group or the second downlink transmission group is to be multiplexed with uplink data in the first uplink transmission. The operations of 1810 may be performed according to the methods described herein. In some examples, aspects of the operations of 1810 may be performed by a group-based feedback manager as described with reference to FIGS. 6 through 9.

At 1815, the UE may determine that the acknowledgment feedback report is to include acknowledgment feedback for both the first downlink transmission group and the second downlink transmission group, and that the configuration information further indicates that a first downlink assignment indicator value for the first downlink transmission group and a second downlink assignment indicator value for the second downlink transmission group are provided in the downlink control information. The operations of 1815 may be performed according to the methods described herein. In some examples, aspects of the operations of 1815 may be performed by a feedback report manager as described with reference to FIGS. 6 through 9.

At 1820, the UE may determine a first acknowledgment feedback codebook for the first downlink transmission group based on the first downlink assignment indicator value. The operations of 1820 may be performed according to the methods described herein. In some examples, aspects of the operations of 1820 may be performed by a feedback report manager as described with reference to FIGS. 6 through 9.

At 1825, the UE may determine a second acknowledgment feedback codebook for the second downlink transmission group based on the second downlink assignment indicator value. The operations of 1825 may be performed according to the methods described herein. In some examples, aspects of the operations of 1825 may be performed by a feedback report manager as described with reference to FIGS. 6 through 9.

At 1830, the UE may transmit the acknowledgment feedback report to the base station in the first uplink transmission. The operations of 1830 may be performed according to the methods described herein. In some examples, aspects of the operations of 1830 may be performed by a feedback report manager as described with reference to FIGS. 6 through 9.

Figure 19:
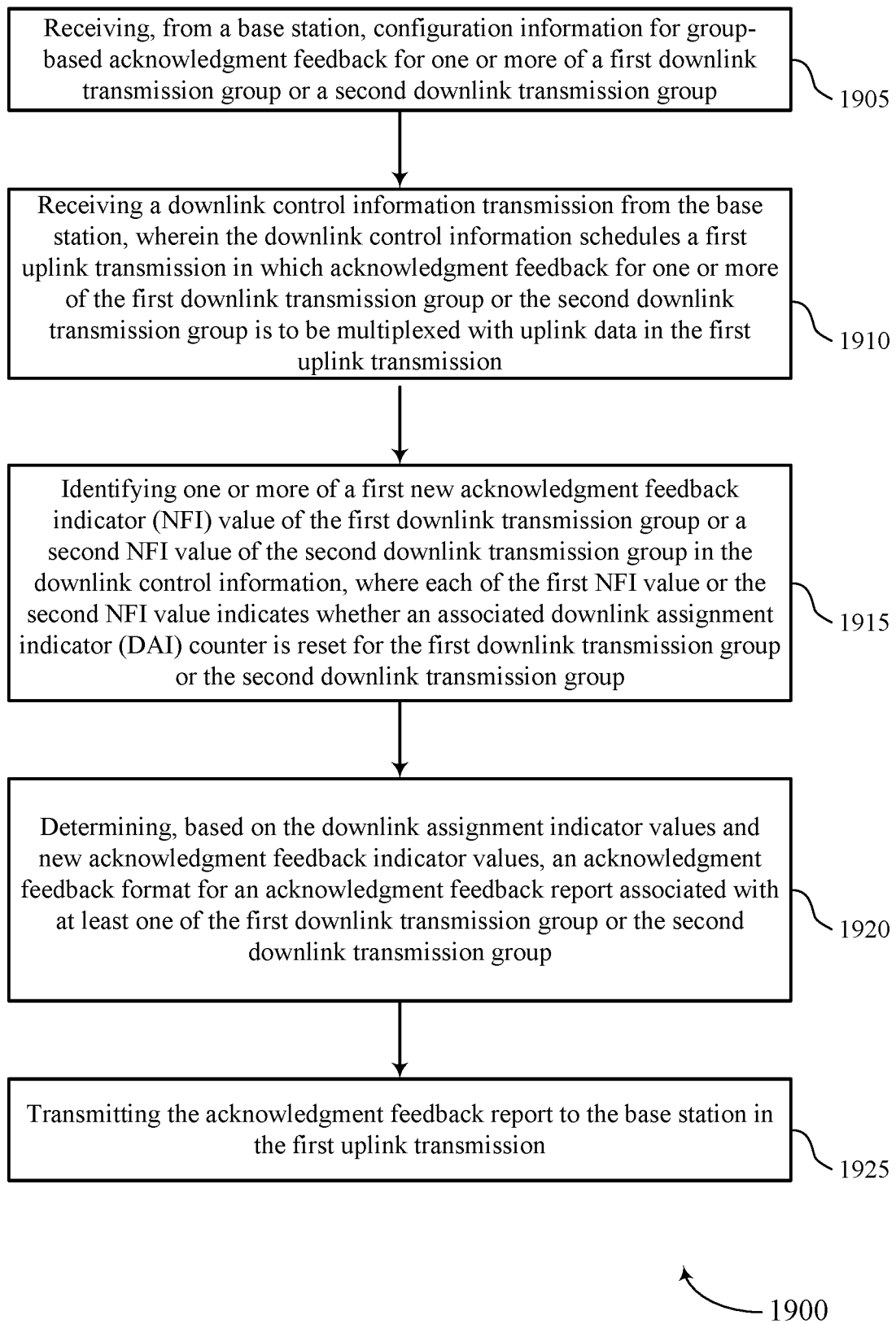

FIG. 19 shows a flowchart illustrating a method 1900 that supports acknowledgment feedback techniques in wireless communications in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, configuration information for group-based acknowledgment feedback for one or more of a first downlink transmission group and a second downlink transmission group. The operations of 1905 may be performed according to the methods described herein. In some examples, aspects of the operations of 1905 may be performed by a feedback configuration manager as described with reference to FIGS. 6 through 9.

At 1910, the UE may receive a downlink control information transmission from the base station that schedules a first uplink transmission in which acknowledgment feedback for one or more of the first downlink transmission group or the second downlink transmission group is to be multiplexed with uplink data in the first uplink transmission. The operations of 1910 may be performed according to the methods described herein. In some examples, aspects of the operations of 1910 may be performed by a group-based feedback manager as described with reference to FIGS. 6 through 9.

At 1915, the UE may identify one or more of a first new acknowledgment feedback indicator (NFI) value of the first downlink transmission group or a second NFI value of the second downlink transmission group in the downlink control information, where each of the first NFI value or the second NFI value indicates whether an associated downlink assignment indicator (DAI) counter is reset for the first downlink transmission group or the second downlink transmission group. The operations of 1915 may be performed according to the methods described herein. In some examples, aspects of the operations of 1915 may be performed by a NFI manager as described with reference to FIGS. 6 through 9.

At 1920, the UE may determine, based on the downlink assignment indicator values and new acknowledgment feedback indicator values, an acknowledgment feedback format for an acknowledgment feedback report associated with at least one of the first downlink transmission group or the second downlink transmission group. The operations of 1920 may be performed according to the methods described herein. In some examples, aspects of the operations of 1920 may be performed by a feedback report manager as described with reference to FIGS. 6 through 9.

At 1925, the UE may transmit the acknowledgment feedback report to the base station in the first uplink transmission. The operations of 1925 may be performed according to the methods described herein. In some examples, aspects of the operations of 1925 may be performed by a feedback report manager as described with reference to FIGS. 6 through 9.

Figure 20:
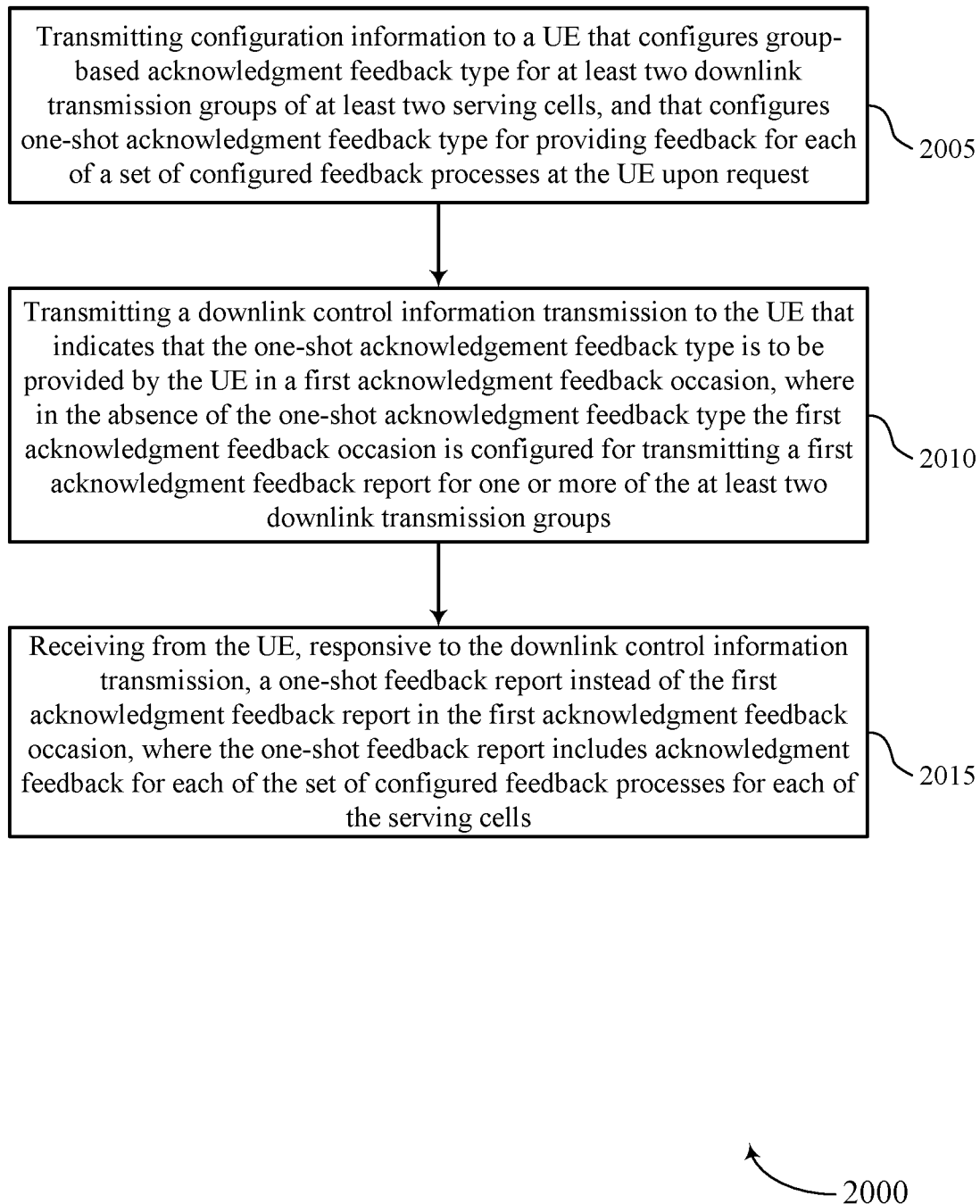

FIG. 20 shows a flowchart illustrating a method 2000 that supports acknowledgment feedback techniques in wireless communications in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit configuration information to a UE that configures group-based acknowledgment feedback type for at least two downlink transmission groups of at least two serving cells, and that configures one-shot acknowledgment feedback type for providing feedback for each of a set of configured feedback processes at the UE upon request. The operations of 2005 may be performed according to the methods described herein. In some examples, aspects of the operations of 2005 may be performed by a feedback configuration manager as described with reference to FIGS. 10 through 13.

At 2010, the base station may transmit a downlink control information transmission to the UE that indicates that the one-shot acknowledgement feedback type is to be provided by the UE in a first acknowledgment feedback occasion, where in the absence of the one-shot acknowledgment feedback type the first acknowledgment feedback occasion is configured for transmitting a first acknowledgment feedback report for one or more of the at least two downlink transmission groups. The operations of 2010 may be performed according to the methods described herein. In some examples, aspects of the operations of 2010 may be performed by an one-shot feedback manager as described with reference to FIGS. 10 through 13.

At 2015, the base station may receive from the UE, responsive to the downlink control information transmission, a one-shot feedback report instead of the first acknowledgment feedback report in the first acknowledgment feedback occasion, where the one-shot feedback report includes acknowledgment feedback for each of the set of configured feedback processes for each of the serving cells. The operations of 2015 may be performed according to the methods described herein. In some examples, aspects of the operations of 2015 may be performed by a feedback report manager as described with reference to FIGS. 10 through 13.

Figure 21:
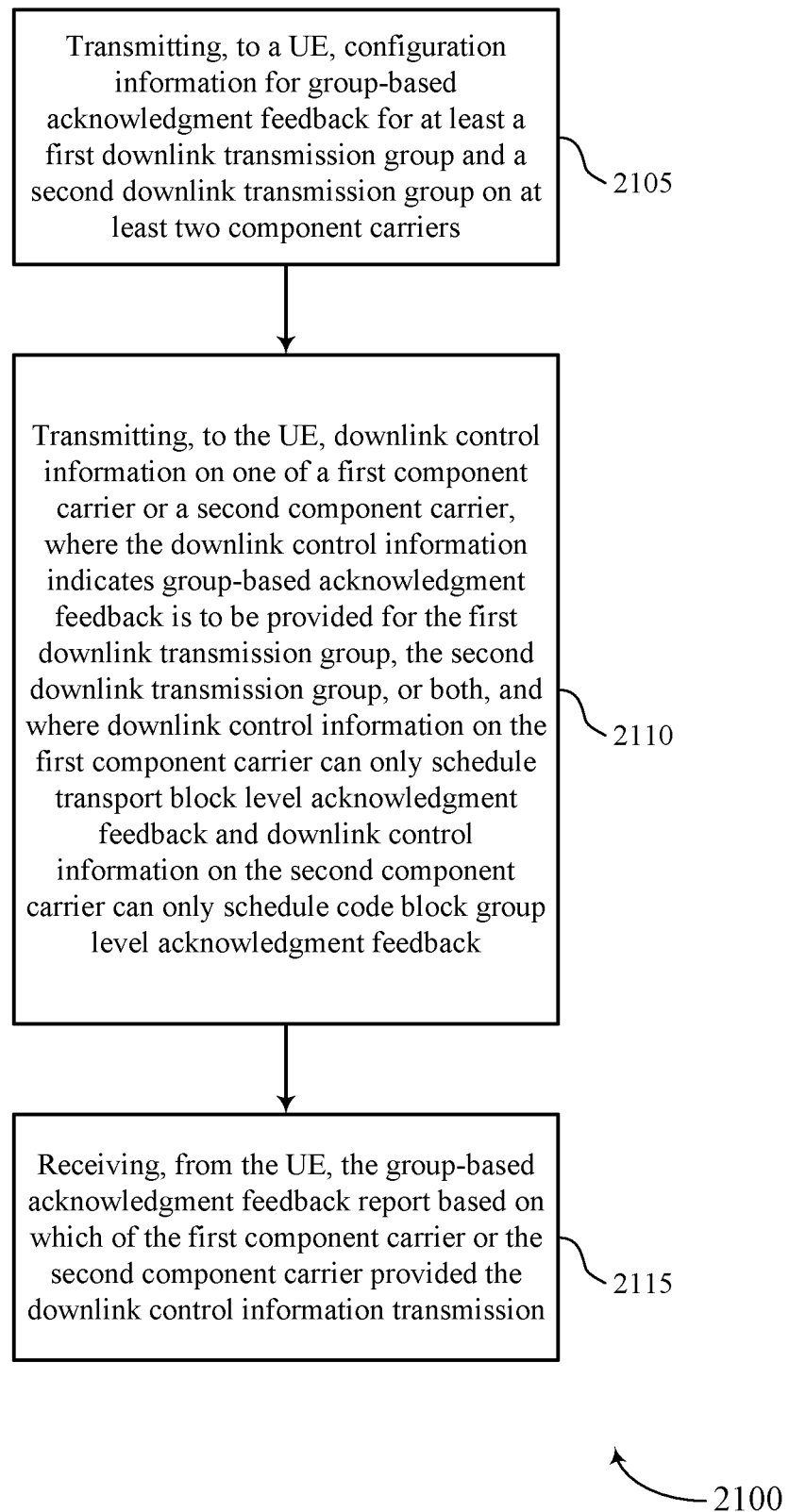

FIG. 21 shows a flowchart illustrating a method 2100 that supports acknowledgment feedback techniques in wireless communications in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, configuration information for group-based acknowledgment feedback for at least a first downlink transmission group and a second downlink transmission group on at least two component carriers. The operations of 2105 may be performed according to the methods described herein. In some examples, aspects of the operations of 2105 may be performed by a feedback configuration manager as described with reference to FIGS. 10 through 13.

At 2110, the base station may transmit, to the UE, downlink control information on one of a first component carrier or a second component carrier, where the downlink control information indicates group-based acknowledgment feedback is to be provided for the first downlink transmission group, the second downlink transmission group, or both, and where downlink control information on the first component carrier can only schedule transport block level acknowledgment feedback and downlink control information on the second component carrier can only schedule code block group level acknowledgment feedback. The operations of 2110 may be performed according to the methods described herein. In some examples, aspects of the operations of 2110 may be performed by a group-based feedback manager as described with reference to FIGS. 10 through 13.

At 2115, the base station may receive, from the UE, the group-based acknowledgment feedback report based on which of the first component carrier or the second component carrier provided the downlink control information transmission. The operations of 2115 may be performed according to the methods described herein. In some examples, aspects of the operations of 2115 may be performed by a feedback report manager as described with reference to FIGS. 10 through 13.

Figure 22:
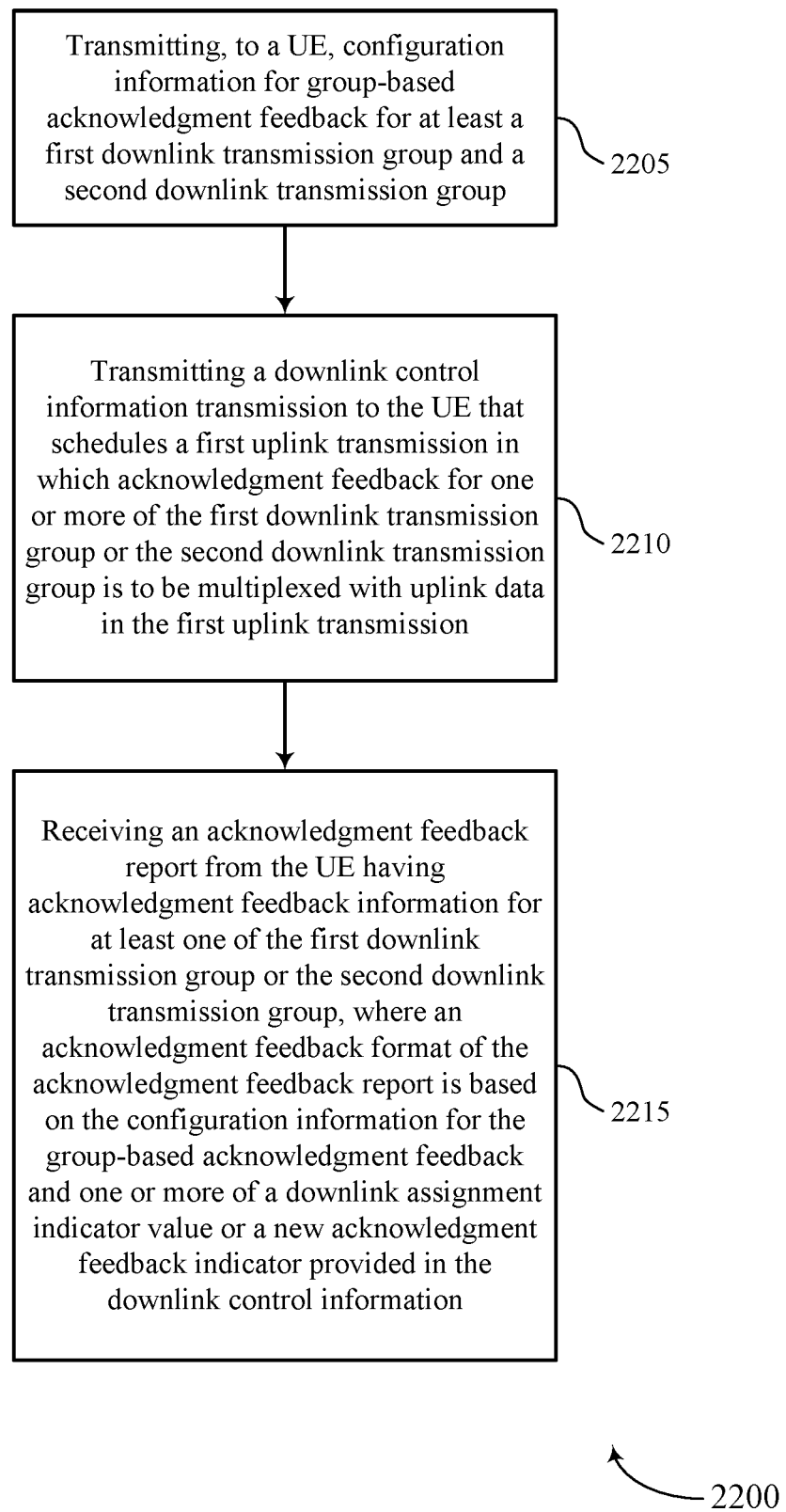

FIG. 22 shows a flowchart illustrating a method 2200 that supports acknowledgment feedback techniques in wireless communications in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, configuration information for group-based acknowledgment feedback for at least a first downlink transmission group and a second downlink transmission group. The operations of 2205 may be performed according to the methods described herein. In some examples, aspects of the operations of 2205 may be performed by a feedback configuration manager as described with reference to FIGS. 10 through 13.

At 2210, the base station may transmit a downlink control information transmission to the UE that schedules a first uplink transmission in which acknowledgment feedback for one or more of the first downlink transmission group or the second downlink transmission group is to be multiplexed with uplink data in the first uplink transmission. The operations of 2210 may be performed according to the methods described herein. In some examples, aspects of the operations of 2210 may be performed by a group-based feedback manager as described with reference to FIGS. 10 through 13.

At 2215, the base station may receive an acknowledgment feedback report from the UE having acknowledgment feedback information for at least one of the first downlink transmission group or the second downlink transmission group, where an acknowledgment feedback format of the acknowledgment feedback report is based on the configuration information for the group-based acknowledgment feedback and one or more of a downlink assignment indicator value or a new acknowledgment feedback indicator provided in the downlink control information. The operations of 2215 may be performed according to the methods described herein. In some examples, aspects of the operations of 2215 may be performed by a feedback report manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving configuration information from a base station that configures group-based acknowledgment feedback type for at least two downlink transmission groups of at least two serving cells, and that configures a one-shot acknowledgment feedback type that provides feedback for each of a plurality of configured feedback processes at the UE upon request; determining that a first acknowledgment feedback report for one or more of the at least two downlink transmission groups is to be provided in a first acknowledgment feedback occasion; receiving a downlink control information transmission from the base station that indicates that the one-shot acknowledgement feedback is to be provided by the UE in the first acknowledgment feedback occasion; and transmitting, responsive to the downlink control information transmission, a one-shot feedback report to the base station instead of the first acknowledgment feedback report in the first acknowledgment feedback occasion, wherein the one-shot feedback report includes acknowledgment feedback for each of the plurality of configured feedback processes for each of the configured downlink serving cells.

Aspect 2: The method of aspect 1, wherein the first acknowledgment feedback report is preempted by the one-shot feedback report.

Aspect 3: The method of any of aspects 1 through 2, wherein the configuration information further configures one or more of the downlink transmission groups with transport block level acknowledgment feedback or code block group level acknowledgment feedback; and wherein the one-shot feedback report provides transport block level acknowledgment feedback irrespective of whether the associated downlink transmission group is configured for transport block level acknowledgment feedback or code block group level acknowledgment feedback.

Aspect 4: The method of any of aspects 1 through 3, further comprising: setting a new acknowledgment feedback indicator (NFI) to be toggled after transmitting the one-shot acknowledgment feedback report.

Aspect 5: The method of aspect 4, further comprising: setting a downlink assignment indicator (DAI) counter for each of the at least two serving cells to be an initial value based at least in part on the NFI being toggled.

Aspect 6: The method of any of aspects 1 through 5, further comprising: maintaining a new acknowledgment feedback indicator (NFI) for each of the at least two serving cells as a prior value after transmitting the one-shot acknowledgment feedback report for comparison with a subsequent NFI indication for the associated downlink transmission group.

Aspect 7: A method for wireless communications at a UE, comprising: receiving, from a base station, configuration information for group-based acknowledgment feedback for at least a first downlink transmission group and a second downlink transmission group on at least two component carriers, wherein a first component carrier is configured for acknowledgment feedback at a transport block level and a second component carrier is configured for acknowledgment feedback at a code block group level; receiving a downlink control information transmission from the base station on one of the first component carrier associated with acknowledgment feedback at the transport block level or the second component carrier associated with acknowledgment feedback at a code block group level, wherein the downlink control information transmission indicates group-based acknowledgment feedback is to be provided for one or more of the first downlink transmission group or the second downlink transmission group, and wherein downlink control information received on the first component carrier can only schedule transport block level acknowledgment feedback and downlink control information received on the second component carrier can only schedule code block group level acknowledgment feedback; formatting the group-based acknowledgment feedback based at least in part on which of the first component carrier or the second component carrier provided the downlink control information transmission; and transmitting the group-based acknowledgment feedback report to the base station.

Aspect 8: The method of aspect 7, wherein the receiving comprises: receiving the downlink control information transmission from the base station on the second component carrier, wherein the downlink control information transmission indicates group-based acknowledgment feedback is to be provided for the first downlink transmission group, the second downlink transmission group, or both; and transmitting a code block group level feedback report for the first downlink transmission group, the second downlink transmission group, or both, based at least in part on the downlink control information transmission being transmitted on the second component carrier associated with code block group level feedback.

Aspect 9: The method of aspect 8, wherein the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a code block group based acknowledgment feedback codebook for reporting acknowledgment feedback of the first downlink transmission group, the second downlink transmission group, or both.

Aspect 10: The method of any of aspects 7 through 9, further comprising: receiving the downlink control information transmission from the base station on the first component carrier, wherein the downlink control information transmission indicates group-based acknowledgment feedback is to be provided for the first downlink transmission group, the second downlink transmission group, or both; and transmitting a transport block level feedback report for the first downlink transmission group, the second downlink transmission group, or both based at least in part on the downlink control information transmission being transmitted on the first component carrier associated with transport block level feedback.

Aspect 11: The method of aspect 10, wherein the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a transport block based acknowledgment feedback codebook for reporting acknowledgment feedback of the first downlink transmission group, the second downlink transmission group, or both.

Aspect 12: A method for wireless communications at a UE, comprising: receiving, from a base station, configuration information for group-based acknowledgment feedback for one or more of a first downlink transmission group and a second downlink transmission group; receiving a downlink control information transmission from the base station, wherein the downlink control information schedules a first uplink transmission in which acknowledgment feedback for one or more of the first downlink transmission group or the second downlink transmission group is to be multiplexed with uplink data in the first uplink transmission; determining, based at least in part on the configuration information for the group-based acknowledgment feedback and one or more downlink assignment indicator values, an acknowledgment feedback format for an acknowledgment feedback report associated with at least one of the first downlink transmission group or the second downlink transmission group; and transmitting the acknowledgment feedback report to the base station in the first uplink transmission.

Aspect 13: The method of aspect 12, wherein the downlink assignment indicator value indicates a number of feedback acknowledgments to be reported in the acknowledgment feedback report, and the downlink control information includes a single downlink assignment indicator value that is associated with one of the first downlink transmission group or the second downlink transmission group.

Aspect 14: The method of aspect 13, further comprising: determining which of the first downlink transmission group or the second downlink transmission group is scheduled to have acknowledgment feedback provided in the first uplink transmission, and wherein the downlink assignment indicator value is associated with the determined downlink transmission group.

Aspect 15: The method of any of aspects 13 through 14, wherein the first downlink transmission group comprises a group g and the second downlink transmission group comprises a group (g+1)mod 2; and the downlink assignment indicator is associated with the group g and the first uplink transmission does not include hybrid automatic repeat request acknowledgment (HARQ-ACK) information for the group (g+1)mod 2

Aspect 16: The method of any of aspects 12 through 15, wherein the downlink control information includes a first downlink assignment indicator value that is associated with the first downlink transmission group and a second downlink assignment indicator value that is associated with the second downlink transmission group, and the first downlink assignment indicator value is used to determine a payload of the acknowledgment feedback report and multiplexing of the acknowledgment feedback report with the first uplink transmission.

Aspect 17: The method of aspect 16, wherein a predetermined value of the second downlink assignment indicator value indicates that acknowledgment feedback information of the second downlink transmission group is not to be included in the acknowledgment feedback report.

Aspect 18: The method of aspect 17, wherein the predetermined value of the second downlink assignment indicator is four.

Aspect 19: The method of any of aspects 17 through 18, wherein when the second downlink assignment indicator value has a value other than the predetermined value, one or more negative acknowledgment indications are provided in the acknowledgment feedback report to provide a report length that is based at least in part on the second downlink assignment indicator value.

Aspect 20: The method of any of aspects 12 through 19, wherein the determining further comprises: determining that the acknowledgment feedback report is to include acknowledgment feedback for both the first downlink transmission group and the second downlink transmission group, and that the configuration information further indicates that a single downlink assignment indicator value is provided in the downlink control information.

Aspect 21: The method of aspect 20, further comprising: determining, based at least in part on identifying the error case, to refrain from multiplexing the acknowledgment feedback report in the first uplink transmission, refrain from transmitting the first uplink transmission entirely, or transmit the acknowledgment feedback report with preconfigured feedback information.

Aspect 22: The method of any of aspects 20 through 21, further comprising: formatting the acknowledgment feedback report with an acknowledgment feedback codebook associated with a fixed downlink transmission group associated with the single downlink assignment indicator.

Aspect 23: The method of aspect 22, wherein the first downlink transmission group comprises the fixed downlink transmission group associated with the single downlink assignment indicator.

Aspect 24: The method of any of aspects 12 through 23, wherein the determining further comprises: determining that the acknowledgment feedback report is to include acknowledgment feedback for both the first downlink transmission group and the second downlink transmission group, and that the configuration information further indicates that a first downlink assignment indicator value for the first downlink transmission group and a second downlink assignment indicator value for the second downlink transmission group are provided in the downlink control information; determining a first acknowledgment feedback codebook for the first downlink transmission group based at least in part on the first downlink assignment indicator value; and determining a second acknowledgment feedback codebook for the second downlink transmission group based at least in part on the second downlink assignment indicator value.

Aspect 25: The method of aspect 24, wherein the first downlink assignment indicator comprises a total downlink assignment indicator.

Aspect 26: The method of any of aspects 12 through 25, further comprising: identifying one or more of a first new acknowledgment feedback indicator (NFI) value of the first downlink transmission group or a second NFI value of the second downlink transmission group in the downlink control information, wherein each of the first NFI value or the second NFI value indicates whether an associated downlink assignment indicator (DAI) counter is reset for the first downlink transmission group or the second downlink transmission group.

Aspect 27: The method of aspect 26, further comprising: determining that the first NFI value in the downlink control information transmission is different than a latest previously received first NFI value; and setting one or more bits in the acknowledgment feedback report associated with the first downlink transmission group to indicate negative acknowledgment.

Aspect 28: The method of any of aspects 26 through 27, further comprising: determining that the first NFI value in the downlink control information transmission is different than a latest previously received first NFI value and that the DAI counter has a predetermined value; and skipping the first downlink transmission group when generating the acknowledgment feedback report.

Aspect 29: The method of any of aspects 26 through 28, further comprising: determining that the first NFI value in the downlink control information transmission is different than a latest previously received first NFI value and that the DAI counter has a different value than a predetermined value; and setting one or more bits in the acknowledgment feedback report associated with the first downlink transmission group to indicate negative acknowledgment.

Aspect 30: The method of any of aspects 12 through 29, wherein a number of new acknowledgment feedback indicator (NFI) fields in the downlink control information is configured in RRC signaling.

Aspect 31: The method of aspect 30, further comprising: determining that the downlink control information includes only a single NFI field; and determining to apply the single NFI field to the first downlink transmission group or the second downlink transmission group based at least in part on which of the first downlink transmission group or the second downlink transmission group is scheduled to have acknowledgment feedback transmitted in the first uplink transmission.

Aspect 32: The method of any of aspects 30 through 31, further comprising: determining that the downlink control information includes a first NFI field and a second NFI field; and determining a payload and multiplexing parameters for the acknowledgment feedback report based at least on part of the first NFI field.

Aspect 33: The method of aspect 32, further comprising: ignoring the second NFI field.

Aspect 34: The method of any of aspects 32 through 33, further comprising: generating a set of negative acknowledgments for the second downlink transmission group to be included in the acknowledgment feedback report, wherein a number of negative acknowledgments is determined based at least in part on the second NFI field and a downlink assignment indicator (DAI) counter value for the second downlink transmission group.

Aspect 35: The method of any of aspects 30 through 34, wherein the UE determines to provide acknowledgment feedback for both the first downlink transmission group and the second downlink transmission group in the acknowledgment feedback report, and wherein the method further comprises; determining that the downlink control information is configured with only one NFI field; and identifying an error case associated with the acknowledgment feedback report.

Aspect 36: The method of aspect 35, wherein the error case results in one or more of the UE not multiplexing the acknowledgment feedback report on the first uplink transmission, not transmitting the first uplink transmission, or transmitting the acknowledgment feedback report based on a preconfigured implementation at the UE.

Aspect 37: The method of any of aspects 35 through 36, wherein the UE generates the acknowledgment feedback report for a fixed downlink transmission group associated with the downlink control information.

Aspect 38: The method of any of aspects 30 through 37, further comprising: generating an acknowledgment feedback codebook for each downlink transmission group based at least in part on an associated NFI value for each downlink transmission group.

Aspect 39: A method for wireless communications at a base station, comprising: transmitting configuration information to a UE that configures group-based acknowledgment feedback type for at least two downlink transmission groups of at least two serving cells, and that configures one-shot acknowledgment feedback type for providing feedback for each of a plurality of configured feedback processes at the UE upon request; transmitting a downlink control information transmission to the UE that indicates that the one-shot acknowledgement feedback type is to be provided by the UE in a first acknowledgment feedback occasion, wherein in the absence of the one-shot acknowledgment feedback type the first acknowledgment feedback occasion is configured for transmitting a first acknowledgment feedback report for one or more of the at least two downlink transmission groups; and receiving from the UE, responsive to the downlink control information transmission, a one-shot feedback report instead of the first acknowledgment feedback report in the first acknowledgment feedback occasion, wherein the one-shot feedback report includes acknowledgment feedback for each of the plurality of configured feedback processes for each of the serving cells.

Aspect 40: The method of aspect 39, wherein the first acknowledgment feedback report is preempted by the one-shot feedback report.

Aspect 41: The method of any of aspects 39 through 40, wherein the configuration information further configures one or more of the downlink transmission groups with transport block level acknowledgment feedback or code block group level acknowledgment feedback; and wherein the one-shot feedback report provides transport block level acknowledgment feedback irrespective of whether the associated downlink transmission group is configured for transport block level acknowledgment feedback or code block group level acknowledgment feedback.

Aspect 42: The method of any of aspects 39 through 41, further comprising: setting a new acknowledgment feedback indicator (NFI) to be toggled after transmitting the one-shot acknowledgment feedback report.

Aspect 43: The method of aspect 42, further comprising: setting a downlink assignment indicator (DAI) counter for each of the at least two serving cells to be an initial value based at least in part on the NFI being toggled.

Aspect 44: A method for wireless communications at a base station, comprising: transmitting, to a UE, configuration information for group-based acknowledgment feedback for at least a first downlink transmission group and a second downlink transmission group on at least two component carriers; transmitting, to the UE, downlink control information on one of a first component carrier or a second component carrier, wherein the downlink control information indicates group-based acknowledgment feedback is to be provided for the first downlink transmission group, the second downlink transmission group, or both, and wherein downlink control information on the first component carrier can only schedule transport block level acknowledgment feedback and downlink control information on the second component carrier can only schedule code block group level acknowledgment feedback; and receiving, from the UE, the group-based acknowledgment feedback report based at least in part on which of the first component carrier or the second component carrier provided the downlink control information transmission.

Aspect 45: The method of aspect 44, wherein the transmitting comprises: transmitting the downlink control information on the second component carrier, wherein the downlink control information indicates group-based acknowledgment feedback is to be provided for the first downlink transmission group, the second downlink transmission group, or both; and receiving a code block group level feedback report for the first downlink transmission group, the second downlink transmission group, or both, based at least in part on the downlink control information transmission being transmitted on the second component carrier associated with code block group level feedback.

Aspect 46: The method of aspect 45, wherein the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a code block group based acknowledgment feedback codebook for reporting acknowledgment feedback of the first downlink transmission group, the second downlink transmission group, or both.

Aspect 47: The method of any of aspects 44 through 46, further comprising: transmitting the downlink control information on the first component carrier, wherein the downlink control information transmission indicates group-based acknowledgment feedback is to be provided for the first downlink transmission group, the second downlink transmission group, or both; and receiving a transport block level feedback report for the first downlink transmission group, the second downlink transmission group, or both, based at least in part on the downlink control information transmission being transmitted on the first component carrier associated with transport block level feedback.

Aspect 48: The method of aspect 47, wherein the downlink control information transmission includes a total downlink assignment indicator (tDAI) value and a new acknowledgment feedback indicator (NFI) for the first downlink transmission group, the second downlink transmission group, or both, and the tDAI value and the NFI correspond to a transport block based acknowledgment feedback codebook for reporting acknowledgment feedback of the first downlink transmission group, the second downlink transmission group, or both.

Aspect 49: A method for wireless communications at base station, comprising: transmitting, to a UE, configuration information for group-based acknowledgment feedback for at least a first downlink transmission group and a second downlink transmission group; transmitting a downlink control information transmission to the UE that schedules a first uplink transmission in which acknowledgment feedback for one or more of the first downlink transmission group or the second downlink transmission group is to be multiplexed with uplink data in the first uplink transmission; and receiving an acknowledgment feedback report from the UE having acknowledgment feedback information for at least one of the first downlink transmission group or the second downlink transmission group, wherein an acknowledgment feedback format of the acknowledgment feedback report is based at least in part on the configuration information for the group-based acknowledgment feedback and one or more of a downlink assignment indicator value or a new acknowledgment feedback indicator provided in the downlink control information.

Aspect 50: The method of aspect 49, wherein the downlink assignment indicator value in the downlink control information indicates a number of feedback acknowledgments to be reported in the acknowledgment feedback report, and the downlink control information includes a single downlink assignment indicator value that is associated with one of the first downlink transmission group or the second downlink transmission group.

Aspect 51: The method of aspect 50, further comprising: determining which of the first downlink transmission group or the second downlink transmission group is scheduled to have acknowledgment feedback provided in the first uplink transmission, and wherein the downlink assignment indicator value is associated with the determined downlink transmission group.

Aspect 52: The method of any of aspects 49 through 51, wherein the downlink control information includes a first downlink assignment indicator value that is associated with the first downlink transmission group and a second downlink assignment indicator value that is associated with the second downlink transmission group, and the first downlink assignment indicator value is used to determine a payload of the acknowledgment feedback report and multiplexing of the acknowledgment feedback report with the first uplink transmission.

Aspect 53: The method of aspect 52, wherein a predetermined value of the second downlink assignment indicator value indicates that acknowledgment feedback information of the second downlink transmission group is not to be included in the acknowledgment feedback report.

Aspect 54: The method of aspect 53, wherein when the second downlink assignment indicator value has a value other than the predetermined value, one or more negative acknowledgment indications are provided in the acknowledgment feedback report to provide a report length that is based at least in part on the second downlink assignment indicator value.

Aspect 55: The method of any of aspects 49 through 54, wherein the acknowledgment feedback report is to include acknowledgment feedback for both the first downlink transmission group and the second downlink transmission group, and the configuration information further indicates that a first downlink assignment indicator value for the first downlink transmission group and a second downlink assignment indicator value for the second downlink transmission group are provided in the downlink control information; a first acknowledgment feedback codebook for the first downlink transmission group based at least in part on the first downlink assignment indicator value; and a second acknowledgment feedback codebook for the second downlink transmission group based at least in part on the second downlink assignment indicator value.

Aspect 56: The method of any of aspects 49 through 55, further comprising: transmitting one or more of a first new acknowledgment feedback indicator (NFI) value of the first downlink transmission group or a second NFI value of the second downlink transmission group in the downlink control information, wherein each of the first NFI value or the second NFI value indicates whether an associated downlink assignment indicator (DAI) counter is reset for the first downlink transmission group or the second downlink transmission group.

Aspect 57: The method of aspect 56, further comprising: determining that the UE missed a downlink assignment based on each bit in the acknowledgment feedback report associated with the first downlink transmission group indicating negative acknowledgment.

Aspect 58: The method of any of aspects 56 through 57, wherein the first NFI value in the downlink control information transmission is set to a predetermined value when acknowledgment feedback for the first downlink transmission group is to be skipped when generating the acknowledgment feedback report.

Aspect 59: The method of any of aspects 56 through 58, wherein the first NFI value in the downlink control information transmission is set to a predetermined value when each acknowledgment feedback bit for the first downlink transmission group in the acknowledgment feedback report is to be set to indicate negative acknowledgment.

Aspect 60: The method of any of aspects 49 through 59, wherein a number of new acknowledgment feedback indicator (NFI) fields in the downlink control information is configured in RRC signaling.

Aspect 61: The method of aspect 60, wherein the downlink control information includes only a single NFI field, and the single NFI field is applied to the first downlink transmission group or the second downlink transmission group based at least in part on which of the first downlink transmission group or the second downlink transmission group is scheduled to have acknowledgment feedback transmitted in the first uplink transmission.

Aspect 62: The method of any of aspects 60 through 61, wherein the downlink control information includes a first NFI field and a second NFI field, and a payload and multiplexing parameters for the acknowledgment feedback report are based at least on part of the first NFI field.

Aspect 63: The method of aspect 62, wherein the second NFI field is ignored by the UE when generating the acknowledgment feedback report.

Aspect 64: The method of any of aspects 62 through 63, wherein a set of negative acknowledgments for the second downlink transmission group is included in the acknowledgment feedback report, and a number of negative acknowledgments is based at least in part on the second NFI field and a downlink assignment indicator (DAI) counter value for the second downlink transmission group.

Aspect 65: The method of any of aspects 60 through 64, wherein an acknowledgment feedback codebook for each downlink transmission group is based at least in part on an associated NFI value for each downlink transmission group.

Aspect 66: An apparatus for wireless communications at a UE, comprising a processor; memory coupled with the processor; and instructions stored in the memory and executable by the processor to cause the apparatus to perform a method of any of aspects 1 through 6.

Aspect 67: An apparatus for wireless communications at a UE, comprising at least one means for performing a method of any of aspects 1 through 6.

Aspect 68: A non-transitory computer-readable medium storing code for wireless communications at a UE, the code comprising instructions executable by a processor to perform a method of any of aspects 1 through 6.

Aspect 69: An apparatus for wireless communications at a UE, comprising a processor; memory coupled with the processor; and instructions stored in the memory and executable by the processor to cause the apparatus to perform a method of any of aspects 7 through 11.

Aspect 70: An apparatus for wireless communications at a UE, comprising at least one means for performing a method of any of aspects 7 through 11.

Aspect 71: A non-transitory computer-readable medium storing code for wireless communications at a UE, the code comprising instructions executable by a processor to perform a method of any of aspects 7 through 11.

Aspect 72: An apparatus for wireless communications at a UE, comprising a processor; memory coupled with the processor; and instructions stored in the memory and executable by the processor to cause the apparatus to perform a method of any of aspects 12 through 38.

Aspect 73: An apparatus for wireless communications at a UE, comprising at least one means for performing a method of any of aspects 12 through 38.

Aspect 74: A non-transitory computer-readable medium storing code for wireless communications at a UE, the code comprising instructions executable by a processor to perform a method of any of aspects 12 through 38.

Aspect 75: An apparatus for wireless communications at a base station, comprising a processor; memory coupled with the processor; and instructions stored in the memory and executable by the processor to cause the apparatus to perform a method of any of aspects 39 through 43.

Aspect 76: An apparatus for wireless communications at a base station, comprising at least one means for performing a method of any of aspects 39 through 43.

Aspect 77: A non-transitory computer-readable medium storing code for wireless communications at a base station, the code comprising instructions executable by a processor to perform a method of any of aspects 39 through 43.

Aspect 78: An apparatus for wireless communications at a base station, comprising a processor; memory coupled with the processor; and instructions stored in the memory and executable by the processor to cause the apparatus to perform a method of any of aspects 44 through 48.

Aspect 79: An apparatus for wireless communications at a base station, comprising at least one means for performing a method of any of aspects 44 through 48.

Aspect 80: A non-transitory computer-readable medium storing code for wireless communications at a base station, the code comprising instructions executable by a processor to perform a method of any of aspects 44 through 48.

Aspect 81: An apparatus for wireless communications at base station, comprising a processor; memory coupled with the processor; and instructions stored in the memory and executable by the processor to cause the apparatus to perform a method of any of aspects 49 through 65.

Aspect 82: An apparatus for wireless communications at base station, comprising at least one means for performing a method of any of aspects 49 through 65.

Aspect 83: A non-transitory computer-readable medium storing code for wireless communications at base station, the code comprising instructions executable by a processor to perform a method of any of aspects 49 through 65.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network device, configuration information for group-based acknowledgment feedback for one or more of a first downlink transmission group or a second downlink transmission group;
   receiving downlink control information from the network device, wherein the downlink control information schedules a first uplink transmission in which acknowledgment feedback for one or more of the first downlink transmission group or the second downlink transmission group is to be multiplexed with uplink data in the first uplink transmission, and wherein the downlink control information provides a first downlink assignment indicator value;
   determining, based at least in part on the configuration information for the group-based acknowledgment feedback and the first downlink assignment indicator value, an acknowledgment feedback format for an acknowledgment feedback report associated with the first downlink transmission group, the second downlink transmission group, or both;
   formatting the acknowledgment feedback report with an acknowledgment feedback codebook associated with a fixed downlink transmission group associated with the first downlink assignment indicator value; and
   transmitting the acknowledgment feedback report to the network device in the first uplink transmission.

2. The method of claim 1, wherein the first downlink assignment indicator value indicates a number of feedback acknowledgments to be reported in the acknowledgment feedback report, and the first downlink assignment indicator value is a single downlink assignment indicator value that is associated with one of the first downlink transmission group or the second downlink transmission group.

3. The method of claim 2, wherein:
   the first downlink transmission group comprises a group g and the second downlink transmission group comprises a group (g+1)mod2; and
   the first downlink assignment indicator value is associated with the group g and the first uplink transmission does not include hybrid automatic repeat request acknowledgment (HARQ-ACK) information for the group (g+1)mod2.

4. The method of claim 1, further comprising:
   determining which of the first downlink transmission group or the second downlink transmission group is scheduled to have the acknowledgment feedback provided in the first uplink transmission, and wherein the first downlink assignment indicator value is associated with the determined downlink transmission group.

5. The method of claim 1, wherein a predetermined value of a second downlink assignment indicator value indicates that acknowledgment feedback information of the second downlink transmission group is not to be included in the acknowledgment feedback report.

6. The method of claim 5, wherein the predetermined value of the second downlink assignment indicator value is four.

7. The method of claim 1, wherein
   the configuration information further indicates that the first downlink assignment indicator value is a single downlink assignment indicator value provided in the downlink control information.

8. The method of claim 1, further comprising:
   determining, based at least in part on identifying an error case, to refrain from multiplexing the acknowledgment feedback report in the first uplink transmission, refrain from transmitting the first uplink transmission entirely, or transmit the acknowledgment feedback report with preconfigured feedback information.

9. The method of claim 1, wherein the first downlink transmission group comprises the fixed downlink transmission group associated with the first downlink assignment indicator value.

10. The method of claim 1, wherein the first downlink assignment indicator value comprises a total downlink assignment indicator value.

11. An apparatus for wireless communications at a user equipment (UE), comprising:
    means for receiving, from a network device, configuration information for group-based acknowledgment feedback for one or more of a first downlink transmission group or a second downlink transmission group;
    means for receiving downlink control information from the network device, wherein the downlink control information schedules a first uplink transmission in which acknowledgment feedback for one or more of the first downlink transmission group or the second downlink transmission group is to be multiplexed with uplink data in the first uplink transmission, wherein the downlink control information provides a first downlink assignment indicator value;
    means for determining, based at least in part on the configuration information for the group-based acknowledgment feedback and the first downlink assignment indicator value, an acknowledgment feedback format for an acknowledgment feedback report associated with at the first downlink transmission group, the second downlink transmission group, or both;

means for formatting the acknowledgment feedback report with an acknowledgment feedback codebook associated with a fixed downlink transmission group associated with the first downlink assignment indicator value; and means for transmitting the acknowledgment feedback report to the network device in the first uplink transmission.

12. The apparatus of claim 11, wherein the first downlink assignment indicator value indicates a number of feedback acknowledgments to be reported in the acknowledgment feedback report, and the first downlink assignment indicator value is a single downlink assignment indicator value that is associated with one of the first downlink transmission group or the second downlink transmission group.

13. The apparatus of claim 12, wherein:
the first downlink transmission group comprises a group g and the second downlink transmission group comprises a group (g+1)mod2; and
the first downlink assignment indicator value is associated with the group g and the first uplink transmission does not include hybrid automatic repeat request acknowledgment (HARQ-ACK) for the group (g+1)mod2.

14. The apparatus of claim 11, further comprising:
means for determining which of the first downlink transmission group or the second downlink transmission group is scheduled to have the acknowledgment feedback provided in the first uplink transmission, and wherein the first downlink assignment indicator value is associated with the determined downlink transmission group.

15. The apparatus of claim 11, wherein a predetermined value of a second downlink assignment indicator value indicates that acknowledgment feedback information of the second downlink transmission group is not to be included in the acknowledgment feedback report.

16. The apparatus of claim 15, wherein the predetermined value of the second downlink assignment indicator value is four.

17. The apparatus of claim 11, wherein
the configuration information further indicates that the first downlink assignment indicator value is a single downlink assignment indicator value provided in the downlink control information.

18. The apparatus of claim 11, further comprising:
means for determining, based at least in part on identifying an error case, to refrain from multiplexing the acknowledgment feedback report in the first uplink transmission, refrain from transmitting the first uplink transmission entirely, or transmit the acknowledgment feedback report with preconfigured feedback information.

19. The apparatus of claim 11, wherein the first downlink transmission group comprises the fixed downlink transmission group associated with the first downlink assignment indicator value.

20. The apparatus of claim 11, wherein the first downlink assignment indicator value comprises a total downlink assignment indicator.

21. An apparatus for wireless communications at a user equipment (UE), comprising:

one or more processors,
one or more memories coupled with the one or more processors; and
instructions stored in the one or more memories and executable by the one or more processors to cause the apparatus to:
receive, from a network device, configuration information for group-based acknowledgment feedback for one or more of a first downlink transmission group or a second downlink transmission group;
receive downlink control information from the network device that schedules a first uplink transmission in which acknowledgment feedback for one or more of the first downlink transmission group or the second downlink transmission group is to be multiplexed with uplink data in the first uplink transmission, wherein the downlink control information provides a first downlink assignment indicator value;
determine, based at least in part on the configuration information for the group-based acknowledgment feedback and the first downlink assignment indicator value, an acknowledgment feedback format for an acknowledgment feedback report associated with at least one of the first downlink transmission group or the second downlink transmission group;
format the acknowledgment feedback report with an acknowledgment feedback codebook associated with a fixed downlink transmission group associated with the first downlink assignment indicator value; and
transmit the acknowledgment feedback report to the network device in the first uplink transmission.

22. A non-transitory computer-readable medium storing code for wireless communications at a user equipment (UE), the code comprising instructions executable by one or more processors to:
receive, from a network device, configuration information for group-based acknowledgment feedback for one or more of a first downlink transmission group or a second downlink transmission group;
receive downlink control information from the network device, wherein the downlink control information schedules a first uplink transmission in which acknowledgment feedback for one or more of the first downlink transmission group or the second downlink transmission group is to be multiplexed with uplink data in the first uplink transmission, wherein the downlink control information provides a first downlink assignment indicator value;
determine, based at least in part on the configuration information for the group-based acknowledgment feedback and the first downlink assignment indicator value, an acknowledgment feedback format for an acknowledgment feedback report associated with at least one of the first downlink transmission group or the second downlink transmission group;
format the acknowledgment feedback report with an acknowledgment feedback codebook associated with a fixed downlink transmission group associated with the first downlink assignment indicator value; and
transmit the acknowledgment feedback report to the network device in the first uplink transmission.

* * * * *